(12) United States Patent
Minobe et al.

(10) Patent No.: US 7,304,791 B2
(45) Date of Patent: Dec. 4, 2007

(54) OPTICAL MICROSCOPE APPARATUS USING CONVERGENT BEAM AS ILLUMINATION LIGHT

(75) Inventors: Masao Minobe, Tsuchiura (JP); Noboru Shiraga, Niihama (JP); Shinya Utsumi, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 09/810,523

(22) Filed: Mar. 19, 2001

(65) Prior Publication Data
US 2003/0043458 A1    Mar. 6, 2003

(30) Foreign Application Priority Data
Mar. 17, 2000  (JP)  ............................ P2000-076454

(51) Int. Cl.
G02B 21/06 (2006.01)
G02B 21/00 (2006.01)

(52) U.S. Cl. ...................... 359/385; 359/368; 359/371; 359/386

(58) Field of Classification Search ........ 359/368–390, 359/558–580, 728–730, 483–502, 577–590
See application file for complete search history.

(56) References Cited

U.S. PATENT DOCUMENTS

| | | | | |
|---|---|---|---|---|
| 2,601,175 | A * | 6/1952 | Smith | 359/371 |
| 3,646,608 | A * | 2/1972 | Rowland | 359/386 |
| 3,658,405 | A * | 4/1972 | Pluta | 359/386 |
| 3,947,123 | A | 3/1976 | Carlson et al. | |
| 4,213,036 | A | 7/1980 | Kopp et al. | |
| 4,255,014 | A * | 3/1981 | Ellis | 359/368 |
| 4,947,413 | A * | 8/1990 | Jewell et al. | 378/34 |
| 5,303,082 | A * | 4/1994 | Obuchi et al. | 359/371 |
| 5,305,139 | A * | 4/1994 | Greenberg | 359/390 |
| 5,440,426 | A * | 8/1995 | Sandstrom | 359/559 |
| 5,592,328 | A * | 1/1997 | Greenberg | 359/389 |
| 5,684,626 | A * | 11/1997 | Greenberg | 359/388 |
| 5,854,710 | A | 12/1998 | Rao et al. | 359/559 |
| 6,043,475 | A * | 3/2000 | Shimada et al. | 250/201.3 |
| 6,396,628 | B1 * | 5/2002 | Osa et al. | 359/385 |
| 6,600,598 | B1 * | 7/2003 | Piekos | 359/385 |

FOREIGN PATENT DOCUMENTS

| | | |
|---|---|---|
| DE | 26 34 832 A | 2/1977 |
| DE | 19718909 A1 | 11/1997 |
| JP | 4-26812 A | 1/1992 |
| JP | 2588473 | 2/1994 |
| JP | 07-244241 | 9/1995 |
| JP | 10-268197 | 10/1998 |
| JP | 11-118668 A | 7/1999 |
| WO | WO 95/29419 | 11/1995 |

OTHER PUBLICATIONS

"Optical Optimization of Binary Phase Fan-Out Elements" Weible et al., Elsevier Science B.V..

(Continued)

*Primary Examiner*—Thong Q Nguyen
(74) *Attorney, Agent, or Firm*—Sughrue Mion, PLLC

(57) ABSTRACT

The optical microscope apparatus comprises an illuminating element for emitting as illumination light a convergent beam converging at a point in space; a sample mounting table for mounting a sample in front of the converging point of illumination light; and an objective lens disposed such that the illumination light is incident thereon after light transmitted through or reflected by the sample is once converged at the converging point. The texture and state of orientation of the sample can easily be analyzed by use of the optical microscope apparatus in accordance with the present invention.

31 Claims, 38 Drawing Sheets

OTHER PUBLICATIONS optics Communication, North-Holland Publ. Co vol. 113, No. 1 Dec. 1994, pp. 9-14.

"Introduction to Fourier Optics", J. W. Goodman, Charles, 1988.

"Optical Physics", S. G. Lipson, Chapter 12, 1995; pp. 101-107.

Santamaria J. et al.: "Noise-fee contrast improvement with a low frequency polarizing filter: a practical evaluation" Applied Optics, Jun. 1977, vol. 16, No. 6, pp. 1513-1520, XP002267543.

Goodman, J.W.: "Introduction a l'optique de fourier et a l'holographie", Masson Et Cie, Paris XP002267544.

* cited by examiner

OPTICAL MICROSCOPE APPARATUS USING CONVERGENT BEAM AS ILLUMINATION LIGHT

BACKGROUND OF THE INVENTION

1. Field of the Invention

The present invention relates to an optical microscope apparatus and an observing method by microscope, which are suitable for observing textures of various materials. Materials which can be observed in the optical microscope apparatus and observing method of the present invention by microscope include polymer materials such as phase contrast films, polarization films, and oriented films; biological materials such as plants and pathological tissues; suspensions such as coating liquids and emulsions; semiconductor materials; and the like.

2. Related Background Art

Since physical properties of various materials are closely correlated with their textures, it is important to evaluate and analyze the textures accurately. While many techniques have been developed and used therefor, optical microscopy, among others, have become the most commonly utilized technique as a method of observing textures of materials because of their easiness to utilize, the variety of information available, and the like.

Usually employed as the illumination method for a sample in the conventional optical microscope apparatus is Koehler illumination method in which a parallel beam is made incident thereon in order to illuminate the sample uniformly and to enhance the resolution of images.

In the observation by conventional optical microscope apparatus, however, an enlarged real image of the sample is formed by an objective lens, and is further enlarged by an eyepiece. Namely, an image resulting from the intensity of light reflected by or transmitted through the sample is viewed, whereby textures such as whether anisotropy exists or not and the degree of orientation cannot be observed.

SUMMARY OF THE INVENTION

For solving such a problem, the optical microscope and observing method by microscope in accordance with the present invention are provided.

The first optical microscope apparatus in accordance with the present invention comprises illuminating means for emitting as illumination light a convergent beam converging at a point in a space; a sample mounting table for mounting a sample in front of the converging point of illumination light; and an objective lens disposed such that the illumination light is incident thereon after light transmitted through or reflected by the sample is once converged at the converging point.

When a convergent beam is used as illumination light in place of the parallel beam as such, an observation image having a very high contrast and a great focal depth can be obtained.

In this case, a Fourier-transformed image of the sample, i.e., diffraction image of the sample, is formed on a plane, orthogonal to the optical axis of illumination light, including the converging point of illumination light. Since this diffraction image can be formed in front of the objective lens, the optical microscope apparatus can observe the diffraction image itself and manipulate the diffraction image, so as to carry out desirable processing.

In the conventional optical microscope apparatus, the diffraction image is formed at the image-side focal plane of objective lens, i.e., within the lens barrel, so that it cannot be observed unless the eyepiece is detached therefrom, and it cannot be manipulated as a matter of course.

The structural information of a sample is concentrated on its diffraction image. In other words, a diffraction image corresponding to the texture of a sample is formed, whereas the diffraction image varies when the sample has a different texture. Therefore, if the relationship between the texture and diffraction image is known, the texture of a sample can conversely be seen from the diffraction image.

Preferably, in the present invention the objective lens is adapted to be focused on each of the diffraction image plane and the sample. As a consequence, both of the optical image and diffraction image of the sample can be observed, whereby the acquisition of structural information of sample can be enhanced.

Preferably, the optical microscope apparatus in the present invention further comprises a spatial filter, disposed nearly at a position of the diffraction image plane, for selectively blocking a part of the illumination light transmitted through or reflected by the sample.

This is because of the fact that desirable diffracted light can be selectively made incident on the objective lens by the spatial filter. When the objective lens is focused on the sample, the optical image (dark-field image) of sample formed by the selected diffracted light alone can be observed. Also, since the diffracted light can be selected freely, various dark-field images corresponding to desirable diffracted lights can be observed for the same sample. Here, a bright-field image is obtained when direct light, that is, not diffracted light, is included.

Preferably, the optical microscope apparatus further comprises an adjusting mechanism adapted to arbitrarily change the distance between the diffraction image plane and the sample. Normally, the position of a condenser lens acting as the exit of the convergent illumination light is changed, so as to alter the position of converging point, i.e., the position of diffraction image plane. The diffraction image alters its size when the distance between the diffraction image plane and the sample is changed. As the distance is longer, the diffraction image can be made greater.

Preferably, the optical microscope apparatus further comprises an adjusting mechanism for substantially aligning a direction of light transmitted through the spatial filter and an optical axis of the objective lens with each other. Though the quantity of light is reduced by the spatial filter, a bright image with less distortion can be obtained when the two optical axes are substantially aligned with each other.

The optical microscope apparatus may use monochromatic light as the illumination light. When monochromatic light is used, images important for studying a texture, which have been unavailable with white light, can be obtained.

The second optical microscope apparatus in accordance with the present invention is a convergent beam polarization microscope apparatus. The convergent beam polarization microscope apparatus of the present invention comprises illuminating means for emitting as illumination light a convergent beam converging at a point in a space; a sample mounting table for mounting a sample in front of the converging point of illumination light; an objective lens disposed such that the illumination light is incident thereon after light transmitted through or reflected by the sample is once converged at the converging point; a polarizer disposed between the illuminating means and sample mounting table; and an analyzer disposed between the sample mounting table and eyepiece.

Each of the polarizer and analyzer is a polarizing device for converting incident white light into linearly polarized light or circularly polarized light.

Here, the linearly polarized light and circularly polarized light refer to, among the loci formed by the trailing end of an electric field vector representing the direction and magnitude of vibration of an electric field at a predetermined site when opposed to an advancing light wave, those becoming lines and circles, respectively, and their states. In the case of linearly polarized light, the surface including the vibrating direction and propagating direction of the magnetic field vibrating with the electric field becomes a plane, which is referred to as plane of polarization here. As for the polarizer and analyzer converting the incident light into linearly polarized light, the plane of polarization of converted light may be referred to as the plane of polarization of polarizer and analyzer. In the case of circularly polarized light, on the other hand, there is a difference between rightward polarization and leftward polarization depending on the loci formed by the electric field vector, which are referred to as rightward circularly polarized light and leftward circularly polarized light, respectively, here. Light can be polarized when transmitted through the polarizer or analyzer.

In this convergent beam polarizing microscope apparatus, a Fourier-transformed image of the sample caused by the polarized illumination light, i.e., diffraction image of the sample, is formed on a plane (hereinafter referred to as diffraction image plane), orthogonal to the optical axis of illumination light, including the converging point of illumination light. Since this diffraction image can be formed in front of the objective lens, the convergent beam polarizing microscope apparatus can observe the diffraction image itself and manipulate the diffraction image, so as to carry out desirable processing.

Since the incident light is a parallel beam in the conventional polarizing microscope apparatus, the diffraction image is formed at the image-side focal plane of objective lens, i.e., within the lens barrel, so that it cannot be observed unless the eyepiece is detached therefrom, and it cannot be manipulated as a matter of course.

The structural information of a sample is concentrated on its diffraction image. In other words, a diffraction image corresponding to the texture of a sample is formed, whereas the diffraction image varies when the sample has a different texture. Therefore, if the relationship between the texture and diffraction image is known, the texture of a sample can conversely be seen from the diffraction image. One of important characteristic features of the convergent beam polarizing microscope apparatus lies in that the diffraction image under polarized light can be obtained together with the polarizing microscope image.

Preferably, the objective lens is adapted to be focused on each of the diffraction image plane and the sample. As a consequence, both of the optical image and diffraction image of the sample under polarized illumination light can be observed, whereby the acquisition of structural information of sample can be enhanced.

Preferably, the convergent beam polarizing microscope apparatus further comprises a spatial filter, disposed nearly at a position of the diffraction image plane, for selectively blocking a part of the illumination light transmitted through or reflected by the sample.

This is because of the fact that desirable diffracted light and direct light can be selectively made incident on the objective lens by the spatial filter. When the objective lens is focused on the sample, and only the selected diffracted light is transmitted through the spatial filter, the optical image (dark-field image) of sample formed by the selected diffracted light alone can be observed. Also, since the diffracted light can be selected freely, various dark-field images corresponding to desirable diffracted lights can be observed for the same sample. Since the polarizer and analyzer are used at this time, a dark-field image indicative of the state of polarization of diffracted light can be observed. Here, a bright-field image is obtained when direct light is also included.

Preferably, the convergent beam polarizing microscope apparatus further comprises an adjusting mechanism adapted to arbitrarily change the distance between the diffraction image plane and the sample. Normally, the position of a condenser lens acting as the exit of the convergent illumination light is changed, so as to alter the position of converging point, i.e., the position of diffraction image plane. The diffraction image alters its size when the distance between the diffraction image plane and the sample is changed. As the distance is longer, the diffraction image can be made greater, whereby the diffraction image can be observed in more detail.

Preferably, the polarizer and analyzer in the convergent beam polarizing microscope apparatus are rotatable about the optical axis of incident light. This is because of the fact that the optimal angle for each of the polarizer and analyzer for the target structure among structures yielding birefringence with various directions in the sample can be selected while the direction of sample is kept constant.

Preferably, the sample mounting table in the convergent beam polarizing microscope apparatus is rotatable about the optical axis of incident light. This is because of the fact that the optimal angle of the sample for the target structure among structures yielding birefringence with various directions in the sample can be selected while the angles of polarizer and analyzer are kept constant.

Here, when the polarizer and analyzer are linearly polarizing devices whereas the respective planes of polarization of these devices are parallel to each other, an image in which the region where the planes of polarization are rotated in the sample is darker than the region where the planes of polarization are not rotated can be observed. When the respective planes of polarization of these devices are perpendicular to each other, by contrast, an image in which the region where the planes of polarization are rotated in the sample is brighter than the region where the planes of polarization are not rotated can be observed. From these, a distribution of structures yielding birefringence can be seen.

In general, birefringence refers to a phenomenon in which two refracted beams occur when light is incident on a medium having an optical anisotropy. Since the two refracted beams become linearly polarized light, structures yielding birefringence can be observed when polarized light is used as the incident light.

When the polarizer and analyzer are circularly polarizing devices whereas the directions of respective planes of polarization of these devices are the same (the analyzer is rightward and leftward circularly polarizing when the polarizer is rightward and leftward circularly polarizing, respectively), an image in which the region where the planes of polarization are rotated in the sample is darker than the region where the planes of polarization are not rotated can be observed. When the directions of respective planes of polarization of these devices are opposite to each other (the analyzer is leftward and rightward circularly polarizing when the polarizer is rightward and leftward circularly polarizing, respectively), by contrast, an image in which the region where the planes of polarization are rotated in the sample is brighter than the region where the planes of polarization are not rotated can be observed. From these, a distribution of structures yielding birefringence can be seen.

When the polarizer is a circularly polarizing device whereas the analyzer is a linearly polarizing device, a distribution of structures yielding minute birefringence in the sample can be detected.

When both of the polarizer and analyzer convert illumination light into linearly polarized light in the case where structures yielding birefringence in the sample have a small distribution, the intensity of light hardly changes due to structures yielding an orientation or birefringence, so that these structures are hard to observe. When the polarizer converts the illumination light into circularly polarized light whereas the analyzer converts the light transmitted through or reflected by the sample into linearly polarized light, the intensity of light based on birefringence becomes higher, so that the above-mentioned structures can be observed. Therefore, the case where the polarizer converts the illumination light into circularly polarized light whereas the analyzer converts the illumination light into linearly polarized light is advantageous for identifying a distribution of structures yielding minute birefringence in the sample.

Preferably, the convergent beam polarizing microscope apparatus further comprises an adjusting mechanism for substantially aligning a direction of light transmitted through the spatial filter and an optical axis of the objective lens with each other. Though the quantity of light is reduced by the spatial filter, a bright image with less distortion can be obtained when the two optical axes are substantially aligned with each other.

The convergent beam polarizing microscope apparatus may use monochromatic light as the illumination light. When monochromatic light is used, images important for studying a texture, which have been unavailable with white light, can be obtained.

Preferably, the polarizer and analyzer in the convergent beam polarizing microscope apparatus are detachable. In this case, various observations such as those using the polarizer or analyzer alone and those using none of the polarizer and analyzer can be carried out.

The third optical microscope apparatus in accordance with the present invention is a convergent beam phase contrast microscope apparatus. The convergent beam phase contrast microscope apparatus of the present invention comprises illuminating means for emitting as illumination light a convergent beam converging at a point in a space; a sample mounting table for mounting a sample in front of the converging point of illumination light; an objective lens disposed such that the illumination light is incident thereon after light transmitted through or reflected by the sample is once converged at the converging point; and a phase plate, disposed on a diffraction image plane, for causing light incident on and near the converging point or light incident on the other region to shift its optical phase from one of being incident, the diffraction image plane being orthogonal to an optical axis of the illumination light and including the converging point; wherein the illuminating means emits monochromatic light.

Since a contrast is provided by the interference of direct light and diffracted light at the diffraction image plane, a clear phase contrast microscopic image can be obtained for a sample (phase matter) having a low refractive index as well. Also, since a convergent beam is used as illumination light in place of the parallel beam, a phase contrast microscopic image having a very high contrast and a great focal depth can be obtained.

Here, the phase matter refers to one which generates no intensity difference but an optical phase difference (difference in advancing stages of light waves) among respective light beams transmitted through or reflected by individual parts of the matter. Since no intensity difference is generated, individual parts of the matter cannot be observed as a difference in brightness as they are. In this case, if direct light is caused to interfere with diffracted light after changing its optical phase by use of a phase plate or diffracted light is caused to interfere with direct light after changing its optical phase, then an intensity difference occurs among the respective light beams transmitted through or reflected by individual parts of the matter, whereby the latter can be observed. This is the principle of phase contrast microscope.

In the conventional phase contrast microscope apparatus, the diffraction image is formed at the image-side focal plane of objective lens, i.e., within the lens barrel, so that it cannot be observed unless the eyepiece is detached therefrom, and it cannot be manipulated as a matter of course. Also, the phase plate in the conventional phase contrast microscope apparatus is attached to the objective lens, so that various kinds of objective lenses for phase contrast must be prepared and exchanged. Further, while the phase plate and stop plate are required to be conjugate with each other in terms of their forms and sizes in order to observe the phase matter, condensers for phase contrast must be prepared and exchanged in the conventional phase contrast microscope apparatus since the stop plate is attached to a condenser. In addition, it is disadvantageous in that the stop plate of the condenser must be changed every time the magnification of objective lens is altered.

In the convergent beam phase contrast microscope apparatus of the present invention, by contrast, a Fourier-transformed image of the sample, i.e., diffraction image, is formed on a plane, orthogonal to the optical axis of illumination light, including the converging point of illumination light. Since this diffraction image can be formed in front of the objective lens, the optical microscope apparatus can observe the diffraction image itself and manipulate the diffraction image, so as to carry out desirable processing. Further, for observing the phase matter, the optical phase of direct light or that of diffracted light incident on the areas other than the vicinity of the center of diffraction image can be retarded by the phase plate. Here, since the phase plate is disposed in front of the objective lens, it is not necessary to prepare and exchange objective lenses for phase contrast which are always necessary for the conventional phase contrast microscope apparatus. Also, even when the magnification of objective lens is altered, it is unnecessary to change the phase plate or the stop plate used together with the phase plate. Further, since the stop plate is not attached to a condenser, it is not necessary to prepare and exchange condensers for phase contrast which are always necessary for the conventional phase contrast microscope apparatus.

The structural information of a sample is concentrated on its diffraction image. In other words, a diffraction image corresponding to the texture of a sample is formed, whereas the diffraction image varies when the sample has a different texture. Therefore, if the relationship between the texture and diffraction image is known, the texture of a sample can be seen conversely from the diffraction image. The convergent beam phase contrast microscope apparatus of the present invention yields the diffraction image and phase contrast image of a phase matter having only a minute refractive index difference at the same time.

Preferably, the objective lens is adapted to be focused on each of the diffraction image plane and the sample. As a consequence, both of the optical image and diffraction image of the sample can be observed, whereby the acquisition of structural information of sample can be enhanced.

Preferably, the optical microscope apparatus further comprises a spatial filter, disposed nearly at a position of the diffraction image plane, for selectively blocking a part of the illumination light transmitted through or reflected by the sample. In this case, since it is adjusted such that the diffracted light can freely be selected, various phase contrast images corresponding to desirable diffracted lights can be observed for the same sample. Also, since the phase plate is provided, a minute refractive index distribution in the optical image of sample formed by the selected diffracted light and direct light can be observed.

The spatial filter is used for selectively making desirable diffracted light incident on the objective lens. When the objective lens is focused on the sample, the phase contrast image formed by interference between the selected diffracted light and direct light can be observed. Also, since the diffracted light can be selected freely, various images corresponding to desirable diffracted lights can be observed for the same sample.

Preferably, the convergent beam phase contrast microscope apparatus further comprises an adjusting mechanism adapted to arbitrarily change the distance between the diffraction image plane and the sample. Normally, the position of a condenser lens acting as the exit of the convergent illumination light is changed, so as to alter the position of converging point, i.e., the position of diffraction image plane. The diffraction image alters its size when the distance between the diffraction image plane and the sample is changed. As the distance is longer, the diffraction image can be made greater, whereby finer patterns of the diffraction image can be studied.

In the convergent beam phase contrast microscope apparatus, the phase plate preferably retards the phase of direct light or diffracted light so that an optical phase difference between them is about $\pi/2$, i.e., a quarter wavelength. It can yield a higher contrast caused by the refractive index distribution as compared with the case where the phase of light is retarded by an amount other than $\pi/2$.

More preferably, the phase plate also has a function of attenuating the intensity of direct light. This is because of the fact that the interference between the direct light and diffracted light can be adjusted thereby, so as to enhance the contrast of phase contrast image further.

The fourth optical microscope apparatus in accordance with the present invention is a convergent beam bright- and dark-field microscope apparatus. The convergent beam bright- and dark-field microscope apparatus of the present invention comprises illuminating means for emitting as illumination light a convergent beam converging at a point in a space; a sample mounting table for mounting a sample in front of the converging point of illumination light; an objective lens disposed such that the illumination light is incident thereon after light transmitted through or reflected by the sample is once converged at the converging point; a linearly polarizing device disposed near the converging point on a diffraction image plane, orthogonal to an optical axis of the illumination light, including the converging point; and a linear polarization analyzer disposed between the diffraction image plane and eyepiece so as to be rotatable about an optical axis of the incident light.

When a convergent beam is used as illumination light in place of the parallel beam as such, not only a convergent beam microscope image having a very high contrast and a great focal depth can be obtained, but also a diffraction image of the sample is formed at a plane (diffraction image plane), orthogonal to the optical axis of the illumination light, including the converging point, so that this diffraction image can be observed as well. Further, since a linearly polarizing device which converts only the direct light incident on the diffraction image near the center thereof into linearly polarized light (hereinafter simply referred to as linearly polarizing device), and an analyzer, disposed between the diffraction image plane and eyepiece, for converting the incident light into linearly polarized light are provided, images can be formed while rotating the analyzer about the optical axis of incident light so as to completely block or transmit the direct light or continuously change the quantity of direct light. By utilizing this, relationships between minute defects/foreign matters and large textures can be seen accurately.

Here, the direct light transmitted through the linearly polarizing device and converted into linearly polarized light is only partly transmitted through the analyzer. At this time, as the angle of planes of polarization of the linearly polarizing device and analyzer is changed from their vertical state to parallel state, they can continuously be changed from a state where the incident light is hardly transmitted to a state where it is substantially completely transmitted.

Therefore, an image formed by diffracted light (dark-field image) and an image including direct light (bright-field image), which are obtained only separately in the conventional optical microscope apparatus, can be observed at the same time. By utilizing this, relationships between minute defects/foreign matters and large textures can be seen accurately.

If a shielding plate which blocks direct light alone is used in place of the linearly polarizing device and analyzer, there are only two states of completely blocking and transmitting the direct light, whereby only one of the dark-field image and bright-field image can be obtained at once.

In the convergent beam bright- and dark-field microscope apparatus, a Fourier-transformed image of the sample, i.e., diffraction image, is formed on the diffraction image plane. In this case, since this diffraction image can be formed in front of the objective lens, the microscope apparatus can observe the diffraction image itself and manipulate the diffraction image, so as to carry out desirable processing.

In the conventional optical microscope apparatus, the diffraction image is formed at the image-side focal plane of objective lens, i.e., within the lens barrel, so that it cannot be observed unless the eyepiece is detached therefrom, and it cannot be manipulated as a matter of course.

The structural information of a sample is concentrated on its diffraction image. In other words, a diffraction image corresponding to the texture of a sample is formed, whereas the diffraction image varies when the sample has a different texture. Therefore, if the relationship between the texture and diffraction image is known, the texture of a sample can conversely be seen from the diffraction image. Hence, observing/analyzing the diffraction image in addition to the optical image is quite important for analyzing physical properties of materials.

Preferably, in the present invention, the objective lens is adapted to be focused on each of the diffraction image plane and the sample. As a consequence, both of the optical image and diffraction image of the sample can be observed, whereby the acquisition of structural information of sample can be enhanced.

Preferably, the convergent beam bright- and dark-field microscope apparatus further comprises a spatial filter, disposed nearly at a position of the diffraction image plane, for selectively blocking a part of the diffracted light diffracted or scattered by the sample.

This is because of the fact that desirable diffracted light can be selectively made incident on the objective lens by the spatial filter. When the objective lens is focused on the sample, the optical image of sample formed by the selected diffracted light can be observed. Also, since the diffracted light can be selected freely, various dark-field images corresponding to desirable diffracted lights can be observed for the same sample. Further, while the diffracted light is selected, the analyzer can be rotated about the optical axis of incident light, so as to change the intensity of direct light arbitrarily, whereby various dark- and bright-field images can be observed continuously.

Preferably, the convergent beam bright- and dark-field microscope apparatus further comprises an adjusting mechanism adapted to arbitrarily change the distance between the diffraction image plane and the sample. Normally, the position of a condenser lens acting as the exit of the convergent illumination light is changed, so as to alter the position of converging point, i.e., the position of diffraction image plane. The diffraction image alters its size when the distance between the diffraction image plane and the sample is changed. As the distance is longer, the diffraction image can be made greater, whereby the diffraction image can be observed in more detail.

When the planes of linear polarization of the linearly polarizing device and analyzer in the convergent beam bright- and dark-field microscope apparatus are arranged parallel to each other, a bright-field image of the sample is obtained.

When the planes of linear polarization of linearly polarizing device and analyzer are arranged perpendicular to each other, by contrast, a dark-field image of the sample is obtained. As a consequence, the bright- and dark-field images can easily switch from each other. In the conventional optical microscope apparatus, it has been necessary to exchange condensers upon switching between the bright- and dark-field images, whereby the field of view has disappeared in the course of switching. In the convergent beam bright- and dark-field microscope apparatus, it is needless to exchange condensers, so that no field of view disappears in the course of switching. Therefore, the bright- and dark-field images can easily be compared with each other.

Preferably, the convergent beam bright- and dark-field microscope apparatus further comprises an adjusting mechanism for substantially aligning a direction of light transmitted through the spatial filter and an optical axis of the objective lens with each other. Though the quantity of light is reduced by the spatial filter, a bright image with less distortion can be obtained when the two optical axes are substantially aligned with each other.

The convergent beam bright- and dark-field microscope apparatus may use monochromatic light as the illumination light. When monochromatic light is used, images important for studying a texture, which have been unavailable with white light, can be obtained.

The first observing method by microscope in accordance with the present invention uses an optical microscope apparatus comprising illuminating means for emitting as illumination light a convergent beam converging at a point in a space; a sample mounting table for mounting a sample in front of the converging point of illumination light; an objective lens disposed such that the illumination light is incident thereon after light transmitted through or reflected by the sample is once converged at the converging point; and a spatial filter, disposed at a position of a diffraction image plane, for selectively blocking a part of the illumination light transmitted through or reflected by the sample, the diffraction image plane being orthogonal to an optical axis of the illumination light and including the converging point; the objective lens being adapted to be focused on each of the diffraction image plane and the sample;

the method comprising the steps of focusing the objective lens onto the diffraction image plane so as to observe a diffraction image of the sample formed on the diffraction image plane by the illumination light and adjusting the spatial filter such that only light from a desirable region of the diffraction image is transmitted therethrough; and then focusing the objective lens onto the sample so as to observe the sample with the light transmitted through the spatial filter.

The second observing method by microscope in accordance with the present invention uses an optical microscope apparatus comprising illuminating means for emitting as illumination light a convergent beam converging at a point in a space; a sample mounting table for mounting a sample in front of the converging point of illumination light; an objective lens disposed such that the illumination light is incident thereon after light transmitted through or reflected by the sample is once converged at the converging point; a polarizer disposed between the illuminating means and sample mounting table; an analyzer disposed between sample mounting table and eyepiece; and a spatial filter, disposed at a position of a diffraction image plane, for selectively blocking a part of the illumination light transmitted through or reflected by the sample, the diffraction image plane being orthogonal to an optical axis of the illumination light and including the converging point; the objective lens being adapted to be focused on each of the diffraction image plane and the sample;

the method comprising the steps of focusing the objective lens onto the diffraction image plane so as to observe a diffraction image of the sample formed on the diffraction image plane by the illumination light and adjusting the spatial filter such that only light from a desirable region of the diffraction image is transmitted therethrough; and then focusing the objective lens onto the sample so as to observe the sample with the light transmitted through the spatial filter.

The third observing method by microscope in accordance with the present invention uses an optical microscope apparatus comprising illuminating means for emitting as illumination light a monochromatic convergent beam converging at a point in a space; a sample mounting table for mounting a sample in front of the converging point of illumination light; an objective lens disposed such that the illumination light is incident thereon after light transmitted through or reflected by the sample is once converged at the converging point; a phase plate, disposed on a diffraction image plane, for causing light incident on and near the converging point or light incident on the other region to shift its optical phase from one of being incident, the diffraction image plane being orthogonal to an optical axis of the illumination light and including the converging point; and a spatial filter for selectively blocking a part of the illumination light transmitted through or reflected by the sample; the objective lens being adapted to be focused on each of the diffraction image plane and the sample wherein the illuminating means emits monochromatic light;

the method comprising the steps of focusing the objective lens onto the diffraction image plane so as to observe a diffraction image of the sample formed on the diffraction image plane by the illumination light and adjusting the spatial filter such that only light from a desirable region of the diffraction image is transmitted therethrough; and then focusing the objective lens onto the sample so as to observe the sample with the light transmitted through the spatial filter.

The fourth observing method by microscope in accordance with the present invention uses an optical microscope apparatus comprising illuminating means for emitting as illumination light a convergent beam converging at a point in a space; a sample mounting table for mounting a sample in front of the converging point of illumination light; an objective lens disposed such that the illumination light is incident thereon after light transmitted through or reflected by the sample is once converged at the converging point; a linearly polarizing device disposed near the converging point on a diffraction image plane, the diffraction image plane being orthogonal to an optical axis of the illumination light and including the converging point; a linear polarization analyzer disposed between diffraction image plane and eyepiece so as to be rotatable about an optical axis of the incident light; and a spatial filter, disposed nearly at a position of the diffraction image plane, for selectively blocking a part of the illumination light transmitted through or reflected by the sample; the objective lens being adapted to be focused on each of the diffraction image plane and the sample;

the method comprising the steps of focusing the objective lens onto the diffraction image plane so as to observe a diffraction image of the sample formed on the diffraction image plane by the illumination light and adjusting the spatial filter such that only light from a desirable region of the diffraction image is transmitted therethrough; and then focusing the objective lens onto the sample so as to observe the sample with the light transmitted through the spatial filter.

The first to fourth microscope observing methods observe the normal optical image, polarized image, phase contrast image, and bright- and dark-field images of the sample by using a convergent beam optical microscope apparatus, a convergent beam polarization microscope apparatus, a convergent beam phase contrast microscope apparatus, and a convergent beam bright- and dark-field microscope apparatus, respectively.

Since the diffracted light to be restricted by the spatial filter can freely be selected while observing the diffraction image, various images corresponding to diffracted lights can be observed for the normal optical image, polarization image, phase contrast image, and bright- and dark-field images of the sample, whereby the texture of sample can be seen in more detail.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
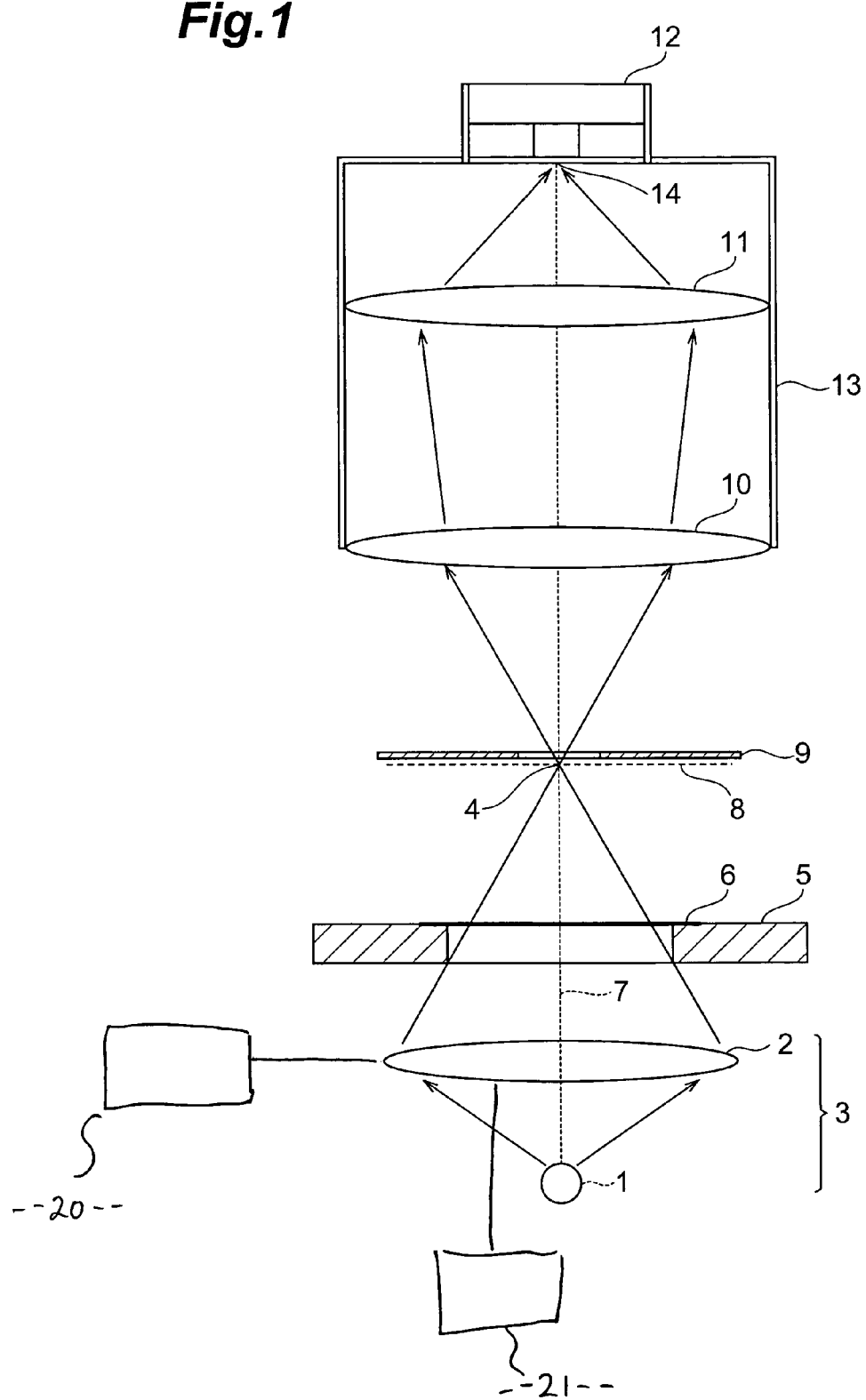
FIG. 1 is a view showing the configuration of an optical microscope apparatus which is an embodiment of the present invention.

FIG. 1 is a view showing the basic configuration of an optical microscope apparatus which is an embodiment of the present invention. A light source 1 and a condenser lens 2 constitute an illuminating means 3 which emits as illumination light a convergent beam converging at a point 4 in a space. The light emitted from the light source 1 may be either white light or monochromatic light.

Disposed above the illuminating means 3 is a sample mounting table (stage) 5 for mounting a sample (specimen) 6. Formed at the center of stage 5 is an opening for transmitting therethrough the illumination light from the illuminating means 3, whereas the illumination light passes through the opening and converges at the converging point 4 thereabove. As a consequence, a Fourier-transformed image of the sample 6, i.e., diffraction image of the sample 6, is formed at a plane 8, perpendicular to the optical axis 7 of illumination light, including the converging point 4. This plane 8 will be referred to as diffraction image plane here.

The condenser lens 2 is movable in the direction of optical axis 7 against the position of the stage 5. By the condenser lens 2 moved in the direction of optical axis 7, the distance between the sample 6 mounted on the stage 5 and the converging point 4, i.e., the distance between the sample 6 and the diffraction image plane 8, can be changed im one embodiment, a mechanism 20 can be coupled to the condenser lens 2 to aid in moving the lens 2 in the direction of the optical axis 7 so as to adjust the distance between the sample 6 and the diffraction image plane 8.

Figure 2:
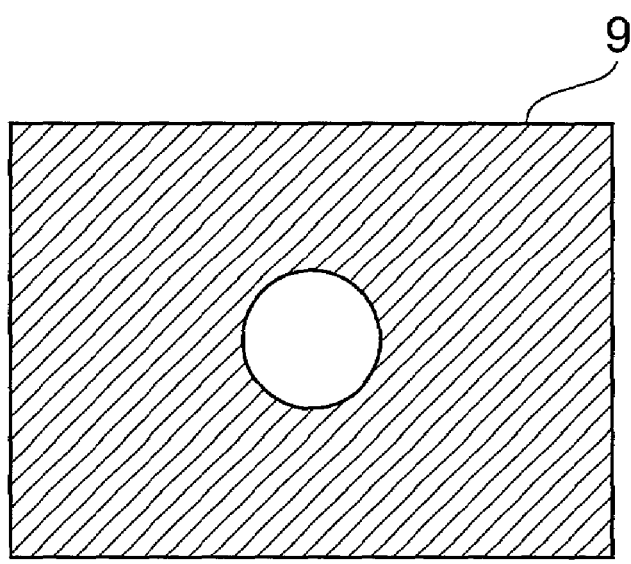
FIG. 2 is a plan view showing a spatial filter 9.

At a position on or near the diffraction image plane 8, a spatial filter 9 is disposed parallel to the diffraction image plane 8. FIG. 2 is a plan view of the spatial filter 9, in which a circular opening having a diameter of several hundreds of microns, for example, is formed at the center of a light-shielding plate. The spatial filter 9 is movable in directions orthogonal to the optical axis 7, whereby the observation field of view of a diffraction image formed on the diffraction image plane 8 can be selected. Also, the spatial filter 9 is easily detachable even during the observation.

The opening formed in the spatial filter, i.e., observation field of view, may not always be circular. Square forms, semicircular forms, sector forms, and the like can be selected as appropriate depending on the aimed object.

Disposed further above the spatial filter 9 is a lens barrel 13 comprising an objective lens 10, an imaging lens 11, and an eyepiece 12. The inner configuration of the lens barrel 13 itself has conventionally been known in general, and the lens barrel 13 enables focusing when moved in the direction of optical axis 7.

The movable range of lens barrel for focusing is required to be sufficiently longer than that in a conventional typical microscope. Namely, this lens barrel is adapted to be focused on at least both of the sample 6 and diffraction image plane 8.

The objective lens 10 has such a focal length that its position is behind (above) the spatial filter 9 when focused on the sample 6. Therefore, the spatial filter 9 does not hinder focusing operations.

Figure 3:
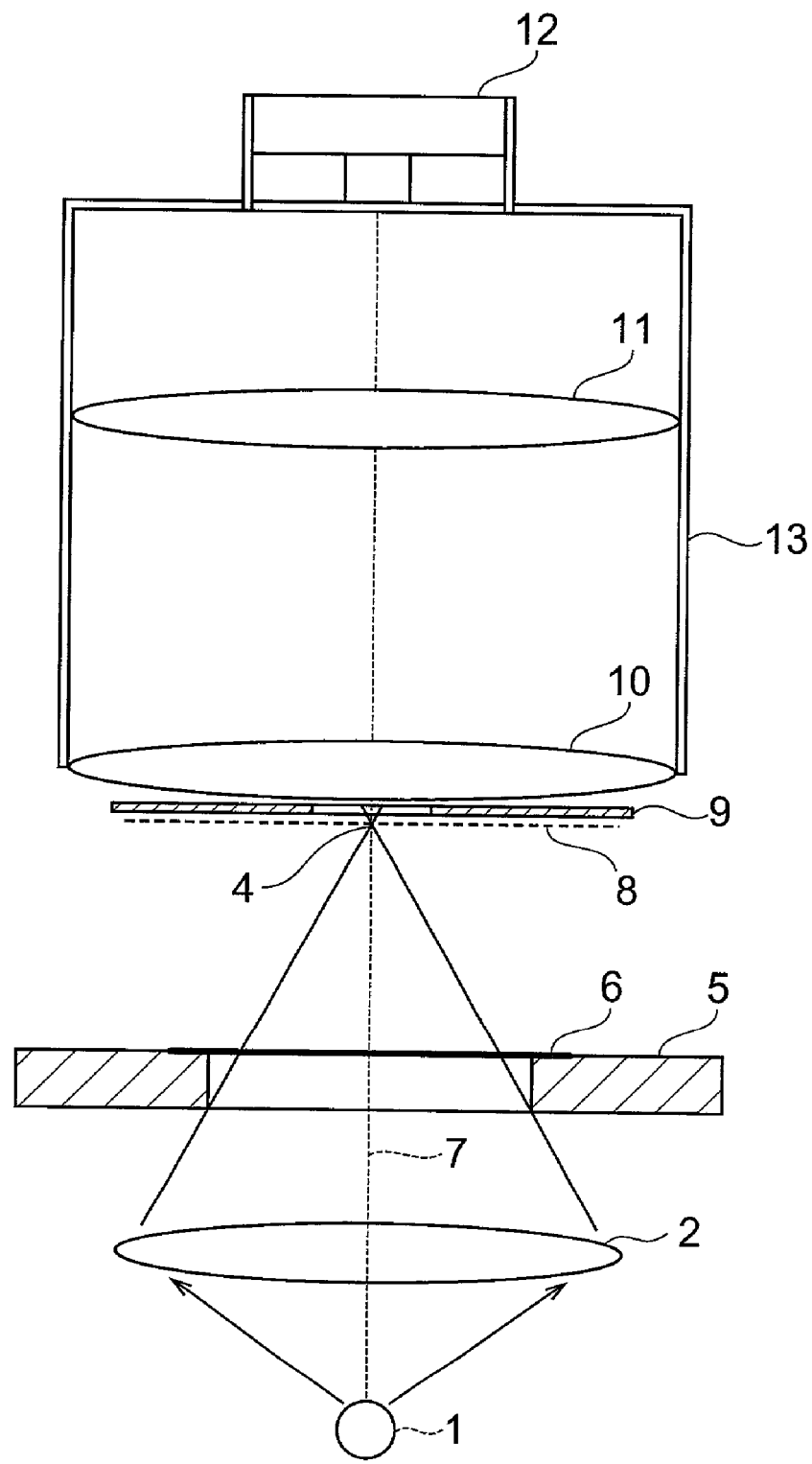
FIG. 3 is a view showing the optical microscope apparatus in a state where an objective lens 10 is disposed close to the spatial filter 9.

If the position of diffraction image plane 8 is adjusted such that the objective lens 10 is focused on the sample 6 when located closest to the spatial filter 9 as shown in FIG. 3, then the brightest image can be obtained.

The image captured by the objective lens 10 is formed at an intermediate image position 14 behind the imaging lens 11, whereas the eyepiece 12 has a focus adjusted such that this image can be observed.

Figure 4:
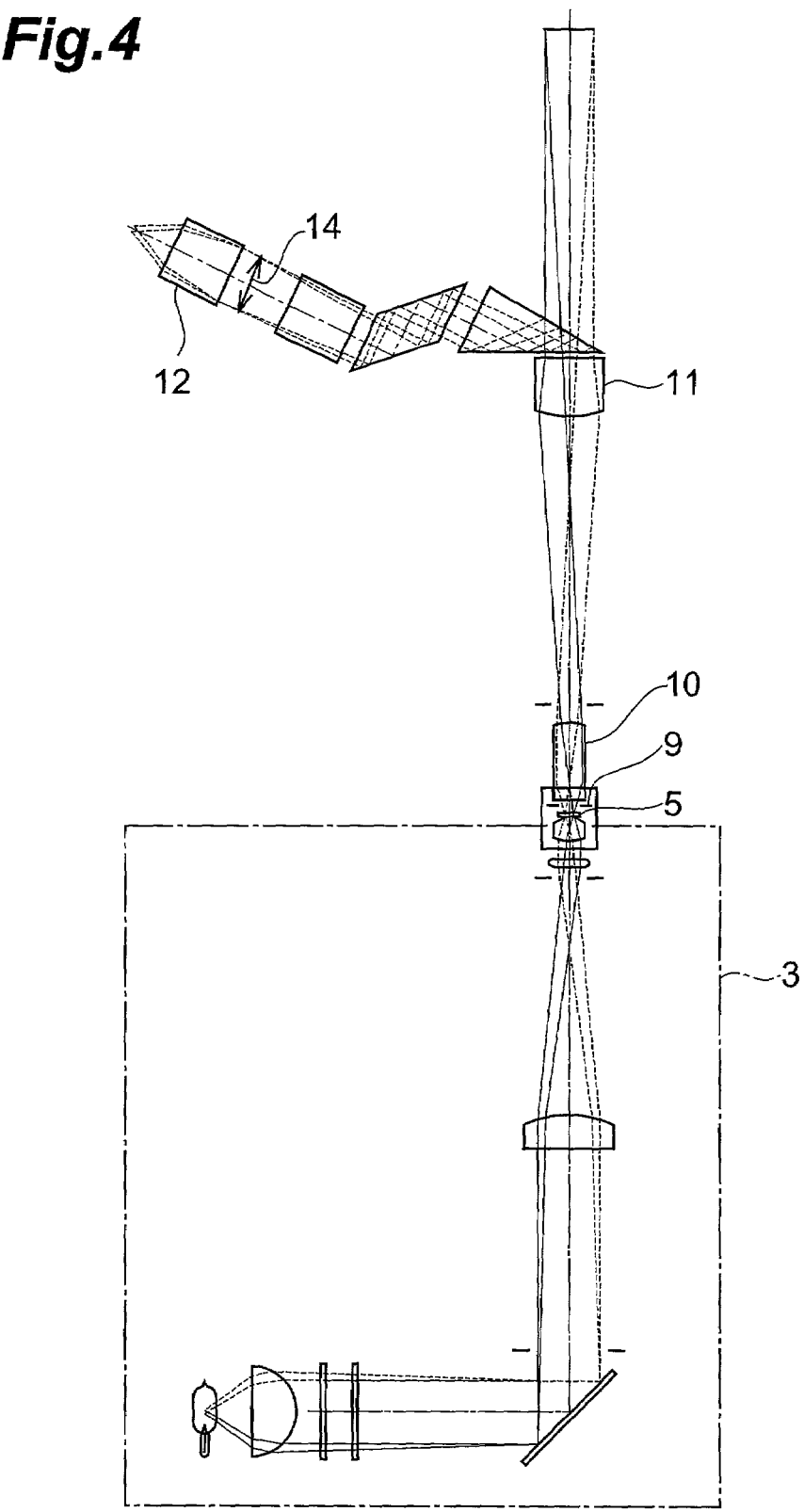
FIG. 4 is a view showing a more specific configuration of the optical microscope apparatus that is an embodiment of the present invention.

FIG. 4 is a view showing a more practical configuration of this optical microscope apparatus, in which constituents identical to those in FIG. 1 are referred to with numerals identical thereto, so as to omit detailed explanations.

In one of observing methods by microscope of this embodiment using such an optical microscope apparatus, a sample is observed while the objective lens is focused on the sample. Since a convergent beam is used as illumination light, an observation image having a very high contrast and a great focal depth can be obtained.

In another observing method by microscope of this embodiment using such an optical microscope apparatus, a spatial filter is used for transmitting therethrough only light of a desirable region on the diffraction image plane, and the sample is observed while the objective lens is focused on the sample for the light transmitted through the spatial filter.

The optical image (dark-field image) of sample formed by only the diffracted light selected by the spatial filter can be observed. Since the diffracted light can be selected freely, various dark-field images corresponding to desirable diffracted lights can be observed for the same sample. As a consequence, the texture of sample can be seen in more detail.

In still another observing method by microscope of this embodiment, the objective lens is focused on the diffraction image plane, orthogonal to the optical axis of the objective lens, including the converging point, so as to observe the diffraction image of sample formed on the diffraction image plane by the illumination light.

If the relationship between the diffraction image and texture concerning a sample is acquired beforehand, then the texture of sample can be seen from a characteristic of the pattern of diffraction image when the diffraction image is directly observed.

In still another observing method by microscope of this embodiment, the objective lens is focused on the diffraction image plane, so as to observe the diffraction image of sample formed on the diffraction image plane by the illumination light; and, after the spatial filter is adjusted so as to transmit therethrough only the light of a desirable region of the diffraction image, the objective lens is focused on the sample, so as to observe the sample with the light transmitted through the spatial filter.

Since the diffracted light used for observing an optical image (dark-field image) is selected according to the diffraction image, it can be seen which diffracted light the dark-field image is based on. As a consequence, the texture of sample can be seen in more detail.

Preferably, in the observing methods by microscope of this embodiment, the sample is observed while the position of diffraction image plane is adjusted such that the objective lens is focused on the sample when positioned near the diffraction image plane. It is because of the fact that, since the diffraction image plane is a position where the illumination light converges, the image becomes brightest with no loss in diffracted light when the objective lens is positioned there.

By either the form of the spatial filter, the position thereof on the diffraction image plane, or the angle of optical axis of illumination light with respect to the optical axis of objective lens changed, diffracted light can be selected with which the optical image of the sample which was to be seen is formed.

Preferably, in the observing methods by microscope of this embodiment, the sample is observed with the direction of light transmitted through the spatial filter and the optical axis of objective lens substantially aligning with each other. Though the quantity of light is reduced by the spatial filter, a bright image with less distortion can be obtained when the two optical axes are substantially aligned with each other.

Preferably, in the observing methods by microscope of this embodiment, the size of diffraction image is adjustable by changing the position of diverging point of illumination light in the optical axis direction of objective lens. As the distance is longer, the diffraction image can be made greater, whereby the diffraction image can be observed in more detail.

In the observing methods by microscope of this embodiment, monochromatic light may be used as the illumination light. When monochromatic light is used, images important for studying a texture, which have been unavailable with white light, can be obtained.

One of the microscope observing methods using this optical microscope apparatus will now be explained. The sample 6 is mounted on the stage 5, and the illuminating means 3 irradiates the sample 6 with the illumination light converging at the point 4.

Figure 5:
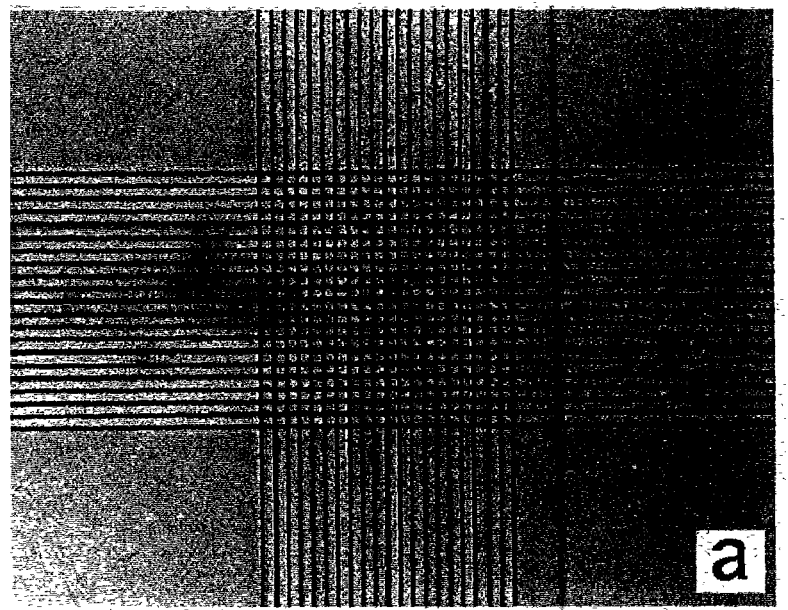
FIG. 5 is a micrograph showing a real image of a test pattern used as a sample.

For simplifying the following explanation, a test pattern in which a plurality of lines are arranged vertically and horizontally at equally-spaced intervals, such as one shown in the micrograph of FIG. 5, is used as the sample 6.

Figure 6:
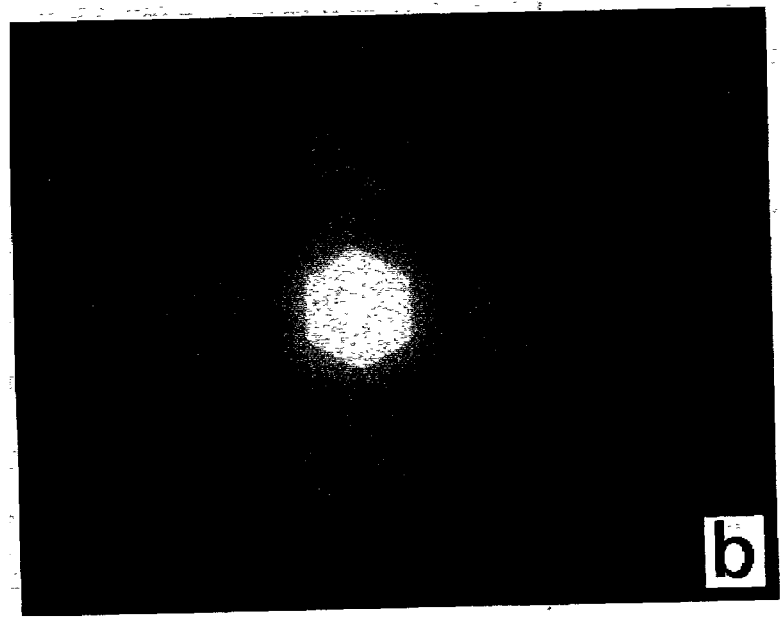
FIG. 6 is a micrograph showing a diffraction image of a test pattern used as a sample.

First, in the state where the spatial filter 9 is removed, the objective lens 10 is focused on the diffraction image plane 8. The micrograph of FIG. 6 shows the image obtained at this time. Namely, it is the diffraction image of test pattern of FIG. 5 formed at the diffraction image plane 8.

While FIG. 5 shows a photograph taken when the objective lens 10 is focused on the sample 6 in the state where the spatial filter 9 is removed, an image with a higher contrast is obtained as compared with the case where a parallel beam is used as the illumination light as in the conventional optical microscope apparatus.

Subsequently, with the spatial filter 9 attached, the observation field of view of diffraction image is selected. In FIG. 6, a hexagonal higher-luminance region exists at the center, whereas somewhat darker regions (diffraction spots) each having a form substantially the same as that of the center higher-luminance region are dimly seen at four positions on the upper, lower, left, and right sides thereof.

Figure 7:
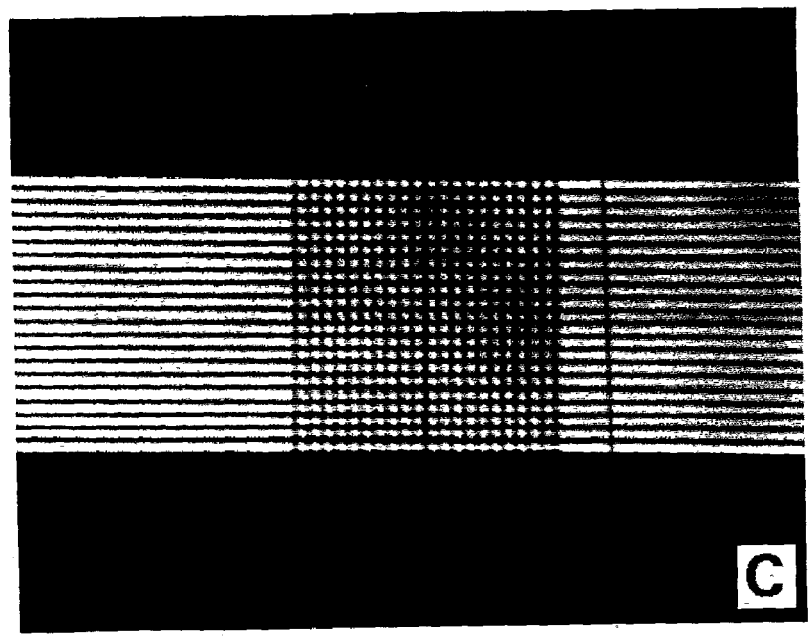
FIG. 7 is a micrograph showing an optical image of a test pattern formed by a selected part of diffracted light.
Figure 8:
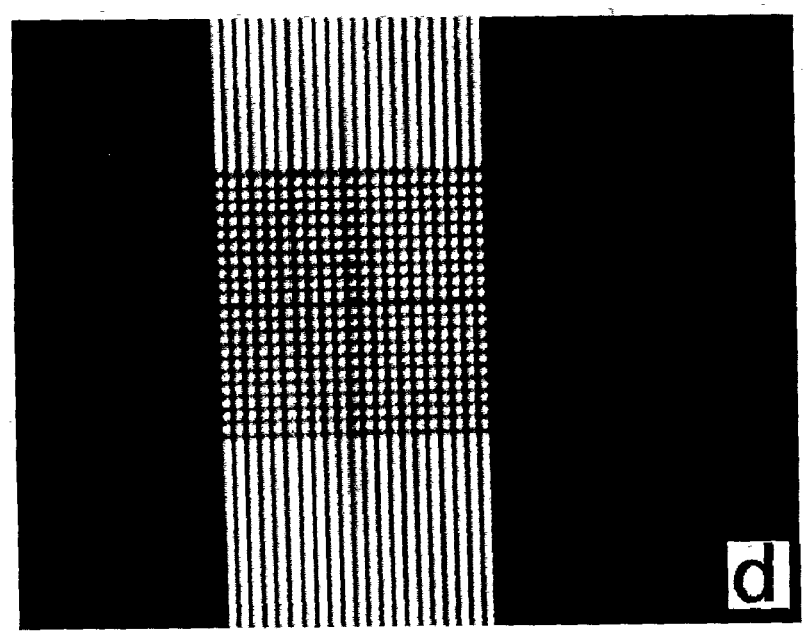
FIG. 8 is a micrograph showing an optical image of a test pattern formed by a selected part of diffracted light.
Figure 9:
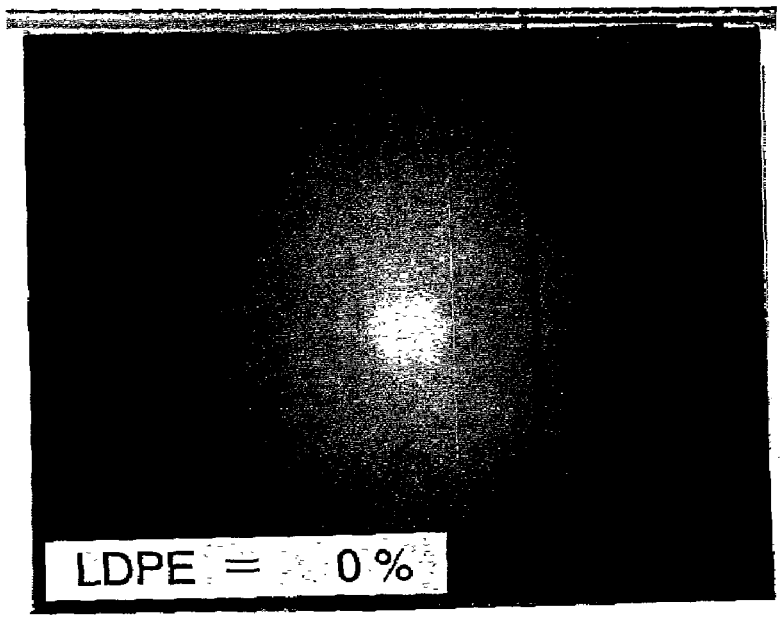
FIG. 9 is a micrograph showing a diffraction image of polymer film (1)
Figure 10:
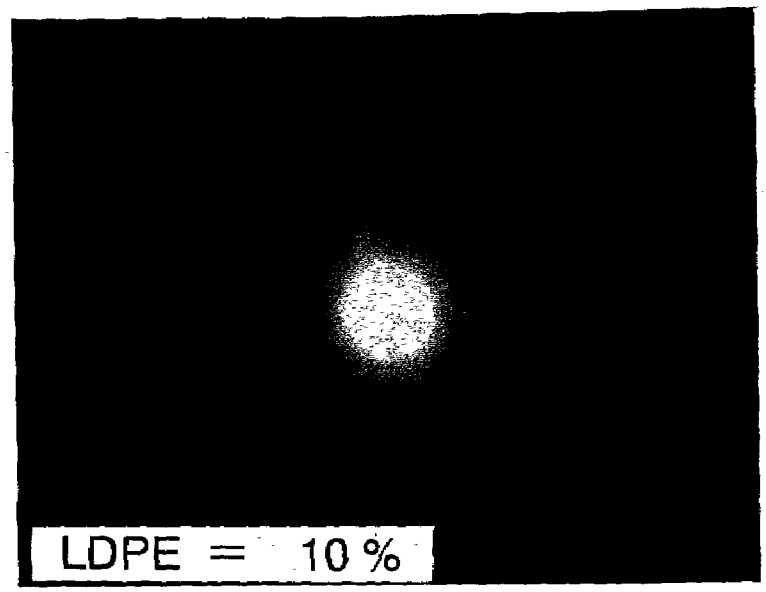
FIG. 10 is a micrograph showing a diffraction image of polymer film (2)
Figure 11:
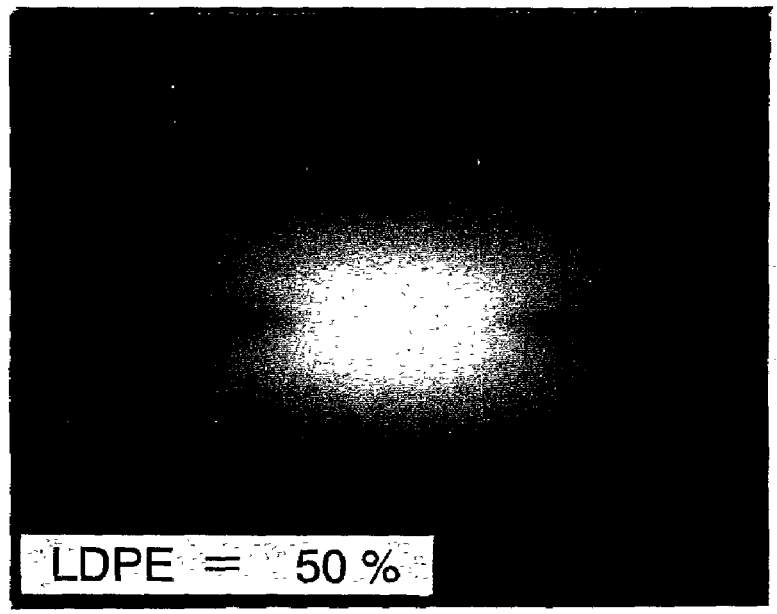
FIG. 11 is a micrograph showing a diffraction image of polymer film (3)
Figure 12:
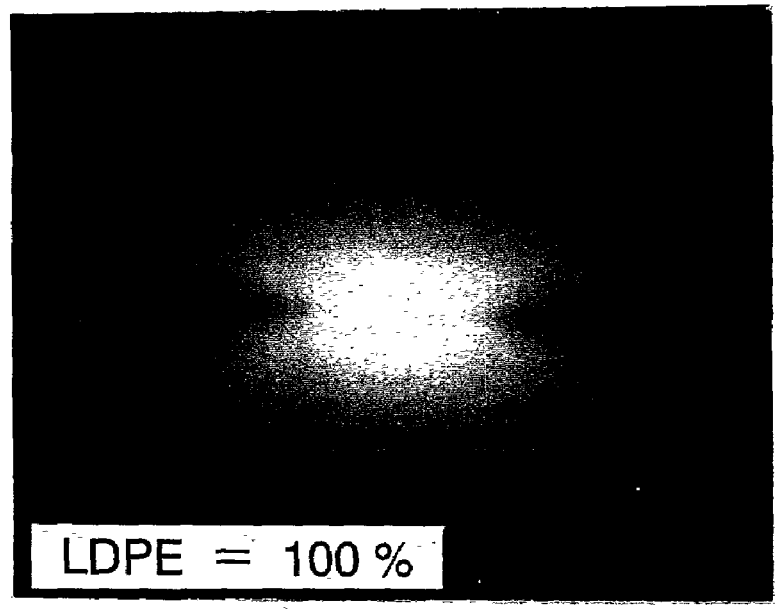
FIG. 12 is a micrograph showing a diffraction image of polymer film (4)

Then, the spatial filter 9 is moved, so that the observation field of view is narrowed to one of the four diffraction spots. Thereafter, in this observation field of view, the objective lens 10 is focused on the sample 6. The micrographs of FIGS. 7 and 8 are obtained at this time. Thus, the image of sample 6 varies depending on how the observation field of view is selected. This is because of the fact that the image is formed by use of a part of diffracted light.

Here, horizontally extending lines such as those shown in FIG. 7 can selectively be observed when the observation field of view is narrowed to a somewhat darker region on the upper or lower side of the higher-luminance region in the diffraction image, whereas vertically extending lines such as those shown in FIG. 8 can selectively be observed when the observation field of view is narrowed to a somewhat darker region on the left or right side of the higher-luminance region in the diffraction image.

When an image is to be formed by use of higher-order diffracted light, the light participating in the imaging deviates greatly from the optical axis of objective lens, whereby thus obtained image yields a greater distortion. Consequently, in such a case, favorable results will be obtained if the selected diffracted light is disposed as close as possible to the optical axis by adjusting the condenser lens, for example.

Though a test pattern is used as the sample 6 in order to simplify the explanation, images emphasizing textures and states of orientation can be observed in the case of actual samples when the observation field of view of diffraction image is selected as appropriate.

Though the sample is observed by use of the transmitted light in this embodiment, reflected light may be observed as well. The latter is suitable for observing the surface texture of a sample having a very low transmissivity, and the like.

Though the optical axis of condenser lens 2 and the optical axis of objective lens 10 are held parallel in this embodiment, they may be configured such that the angle of optical axis of condenser lens 2 with respect to the optical axis of objective lens 10 is made variable. When the angle of optical axis of condenser lens 2 is changed, the diffracted light participating in observation can be altered, whereby the image information for seeing the texture and orientation can be enhanced. In one embodiment, a mechanism 21 can be coupled to the condenser lens 2 to aid in adjusting or aligning the direction of the diffracted light participating in the observation.

While examples of the sample in the present invention include polymer materials (e.g., polymer films such as polyethylene and polypropylene), biological materials, ceramics, and metals, polymer films are the most typical target materials in that their textures can be observed.

Hence, specific examples in the case where polymer films are observed as a sample will be explained.

Behind a point light source 1 constituted by a 100-W halogen lamp and a circular pinhole having a diameter of 100 μm, a condenser lens 2 having a numerical aperture of 0.4 was disposed, whereby convergent illumination light was obtained. The condenser lens 2 was allowed to move by 25 mm or more at the maximum in the direction parallel to the optical axis 7. Here, no filter for yielding monochromatic light was attached to the light source.

The stage 5 was disposed behind the condenser lens 2, whereas a glass slide to which a polymer film was secured was mounted thereon. The stage 5 was made stationary in the direction parallel to the optical axis 7. On the other hand, it was made movable in the direction perpendicular to the optical axis 7 in order to select the observation field of view.

Further, as the spatial filter 9, a light-shielding plate provided with a circular pinhole having a diameter of 800 μm was disposed behind the stage 5. For selecting the direct light or scattered light to be blocked in the light transmitted through the sample (polymer film), the light-shielding plate was allowed to move by 5 mm at the maximum in each of two directions, perpendicular to the optical axis 7, intersecting each other at right angles. Also, it was allowed to move by 5 mm at the maximum in the direction parallel to the optical axis 7 in order to make the converging plane (diffraction image plane) 8 and the pinhole plane coincide with each other.

Behind the spatial filter 9, an objective lens 10 having a longer working distance (CF IC EPI Plan5x having a working distance of 22.5 mm, a numerical aperture of 0.13, and a power of 5×, manufactured by Nikon Corp.) and a three-element lens barrel 13 (TI manufactured by Nikon Corp.) were arranged in this order.

To the three-element lens barrel 13, a photographing apparatus (H-3 manufactured by Nikon Corp.), which is not depicted, and an eyepiece 12 (CFWN10x having a power of 10×, manufactured by Nikon Corp.) were attached, so as to enable observation by the naked eye and photographing. The objective lens 10 and three-element lens barrel 13 were allowed to be focused on a specimen image or diffraction image by moving together in the direction parallel to the optical axis 7.

Results of observation were photographed with a predetermined exposure time for each of the diffraction image and specimen image by use of a high-sensitivity instant monochrome film (FP-3000B SUPER SPEEDY, ISO 3200, manufactured by Fuji Photo Film Co., Ltd.).

Specimen (Sample)

For four kinds of linear low-density polyethylene (LLDPE)/low-density polyethylene (LDPE) blend system having respective blending ratios shown in Table 1, polymer films (1) to (4) processed by inflation method under the condition shown in Table 2 were prepared. A piece of about 1 cm×1 cm cut out from each of thus obtained films by scissors was attached to a glass slide with an adhesive tape such that the machine direction of film aligned with the vertical direction of the photograph, which will be explained later, without yielding any wrinkles, so as to yield a specimen. The sample image of thus obtained specimen was observed with the optical microscope apparatus of the present invention.

TABLE 1

LLDPE/LDPE Blending Ratio and Haze

| BLENDING RATIO (wt %/wt %) | HAZE (%) |
| --- | --- |
| (1) LLDPE/LDPE = 100/0 | 55.3 |
| (2) LLDPE/LDPE = 90/10 | 4.3 |
| (3) LLDPE/LDPE = 50/50 | 6.7 |
| (4) LLDPE/LDPE = 0/100 | 9.5 |

(LLDPE: melt flow ratio of 4, density of 0.923, gas-processed LLDPE, ethylene/hexene copolymer, metallocene type catalyst; LDPE: melt flow ratio of 5, density of 0.924, high-pressure-processed LDPE, tubular; Method of measuring haze was in conformance with the standard of JIS K7361-1.)

TABLE 2

Polymer Film Processing Condition by Inflation Method

| | |
| --- | --- |
| PROCESSING MACHINE | 50 mm dia. PROCESSING MACHINE MADE BY TOMY |
| Die/Up | 120 mm dia. |
| PROCESSING TEMP | 150° C. |
| BUR | 1.8(SPREAD WIDTH:340 mm) |
| TAKE-UP RATE | 25 m/min |
| FILM THICKNESS | 20 μm |
| CORONA PROCESSING | NONE |

OBSERVATION EXAMPLE 1

After the spatial filter 9 was removed from the optical axis 7, the specimen 6 was irradiated with convergent illumination light, and the diameter of the transmitted luminous flux was verified with tracing paper or the like, so as to adjust the position of condenser lens 2 such that the position of the converging plane, i.e., diffraction image plane 8, was located between the specimen 6 and the objective lens 10. Subsequently, the objective lens 10 was focused on the diffraction image plane 8, whereby a diffraction image was obtained. FIGS. 9 to 12 are micrographs of the diffraction images corresponding to polymer films (1) to (4), respectively. As the haze was greater in the specimens, the scattering light widened greater, and the intensity of direct light became lower. FIGS. 13 to 16 are micrographs taken when the objective lens 10 was focused on polymer films (1) to (4) at that time, respectively. Nonuniform structures were not seen in the specimen images at this time.

OBSERVATION EXAMPLE 2

After the diffraction images of FIGS. 9 to 12 were obtained, the spatial filter 9 with a circular pinhole having a diameter of 800 μm was inserted as a spatial filter on the same plane as the diffraction image plane 8, so as to block the light other than the scattered light on the right side of direct light. FIGS. 17 to 20 are micrographs showing the diffraction images of polymer films (1) to (4) at this time, respectively. Thereafter, the focus of microscope was moved to the specimen position, whereby the image formed by the light transmitted through the spatial filter 9 alone was obtained as the specimen image. As a result, nonuniform structures parallel to the machine direction of the films at intervals of about 200 μm to 1 mm were observed in thus obtained specimen image. Micrographs of FIGS. 21 to 24 show the images of polymer films (1) to (4) at this time, respectively. These structures did not increase the haze greatly.

OBSERVATION EXAMPLE 3

Figure 31:
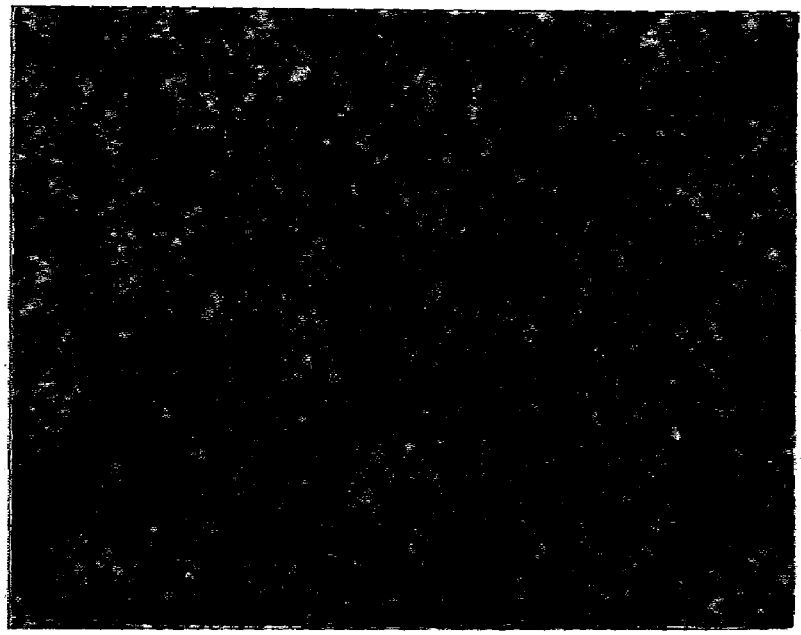
FIG. 31 is a micrograph showing an optical image of polymer film (3) formed by a selected part of diffracted light.
Figure 32:
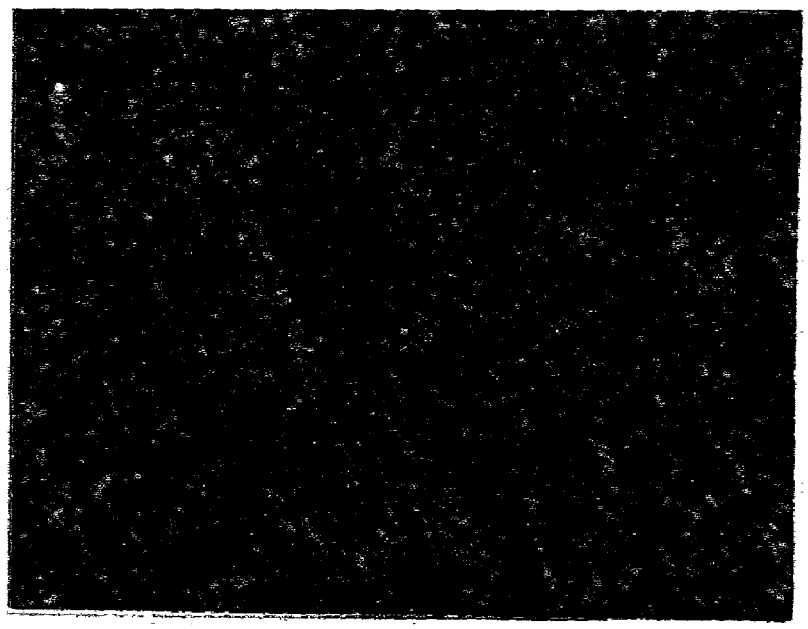
FIG. 32 is a micrograph showing an optical image of polymer film (4) formed by a selected part of diffracted light.
Figure 33:
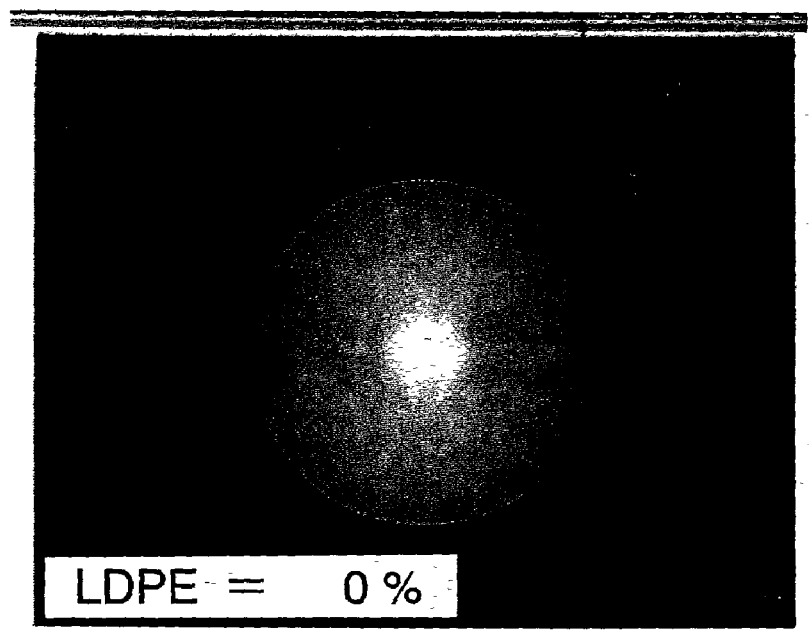
FIG. 33 is a micrograph showing a diffraction image of polymer film (1) formed by a selected part of diffracted light.
Figure 34:
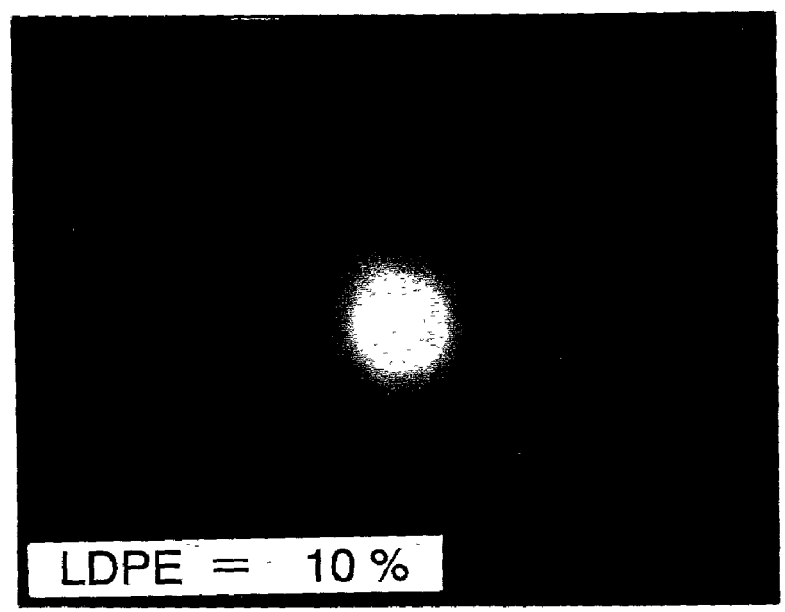
FIG. 34 is a micrograph showing a diffraction image of polymer film (2) formed by a selected part of diffracted light.
Figure 35:
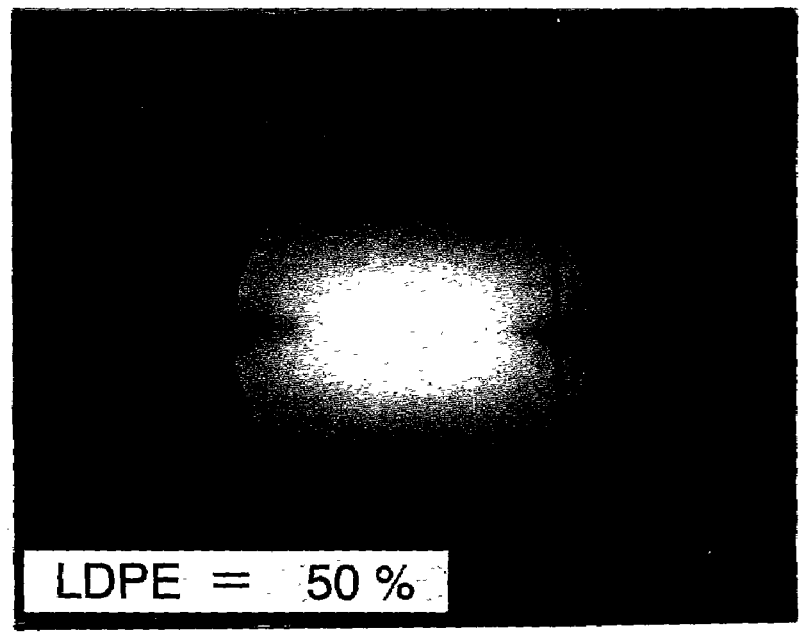
FIG. 35 is a micrograph showing a diffraction image of polymer film (3) formed by a selected part of diffracted light.
Figure 36:
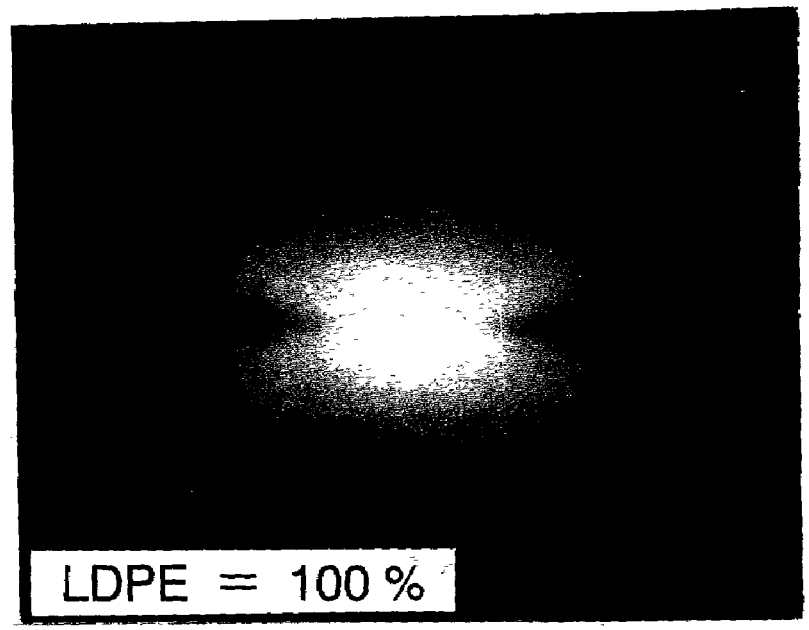
FIG. 36 is a micrograph showing a diffraction image of polymer film (4) formed by a selected part of diffracted light.
Figure 37:
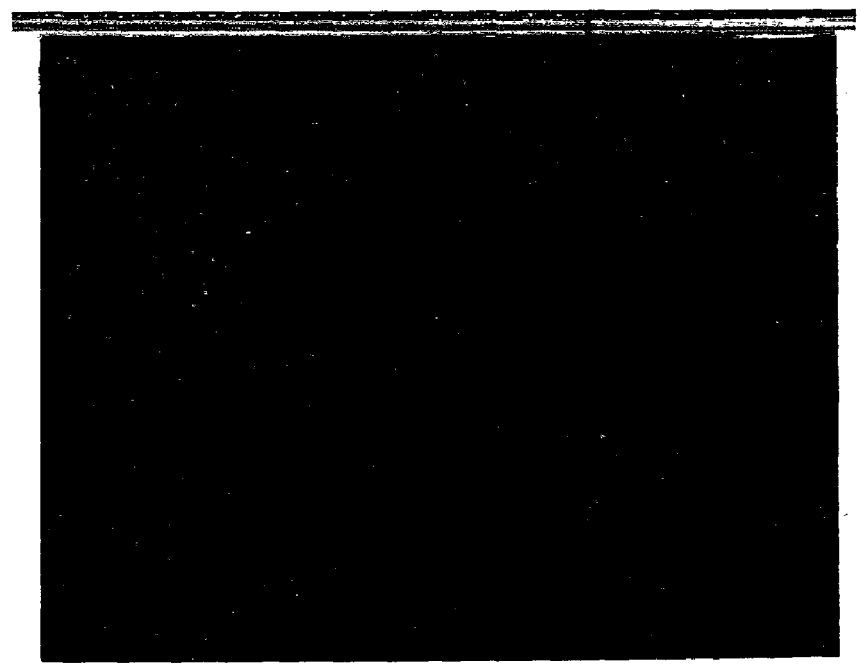
FIG. 37 is a micrograph showing a real image of polymer film (1) formed by a selected part of diffracted light.
Figure 38:
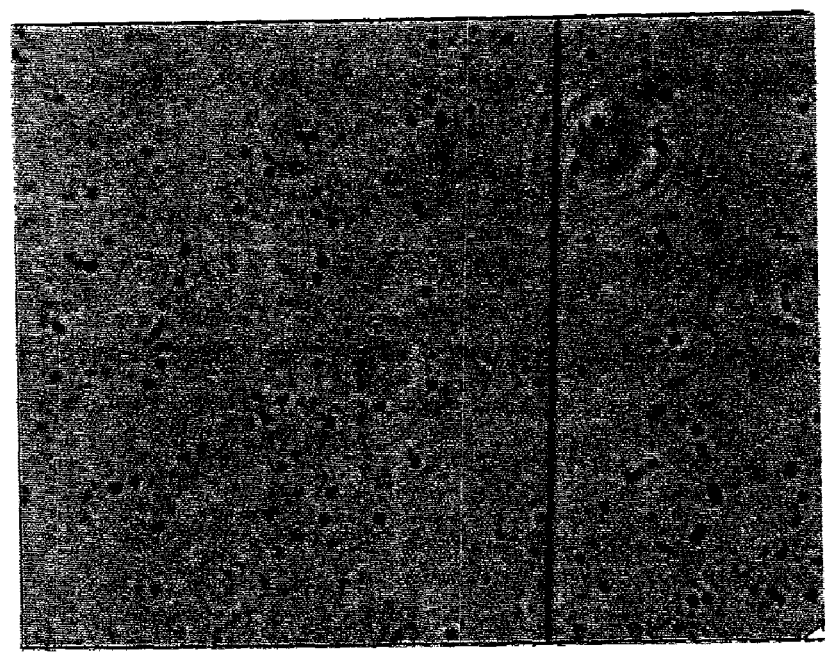
FIG. 38 is a micrograph showing a real image of polymer film (2) formed by a selected part of diffracted light.
Figure 39:
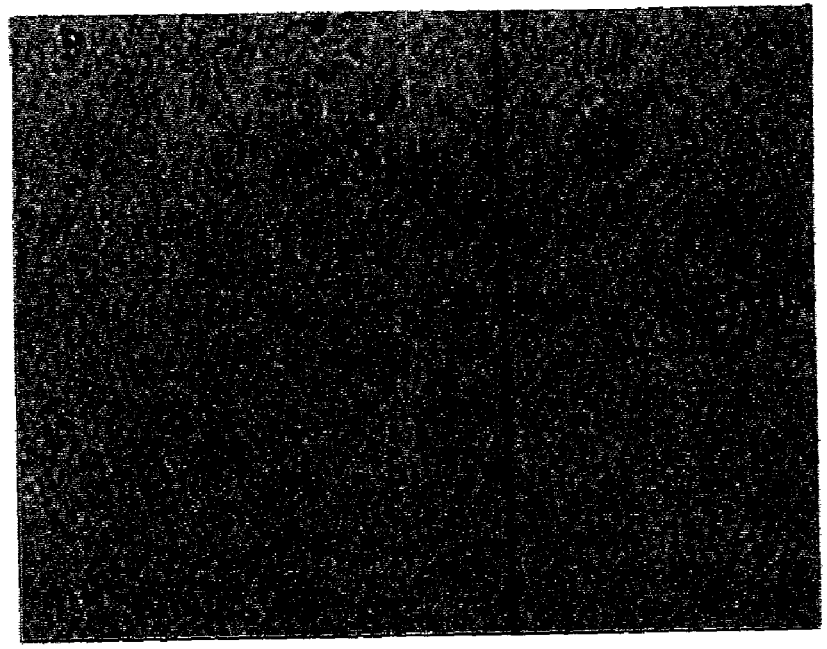
FIG. 39 is a micrograph showing a real image of polymer film (3) formed by a selected part of diffracted light.
Figure 40:
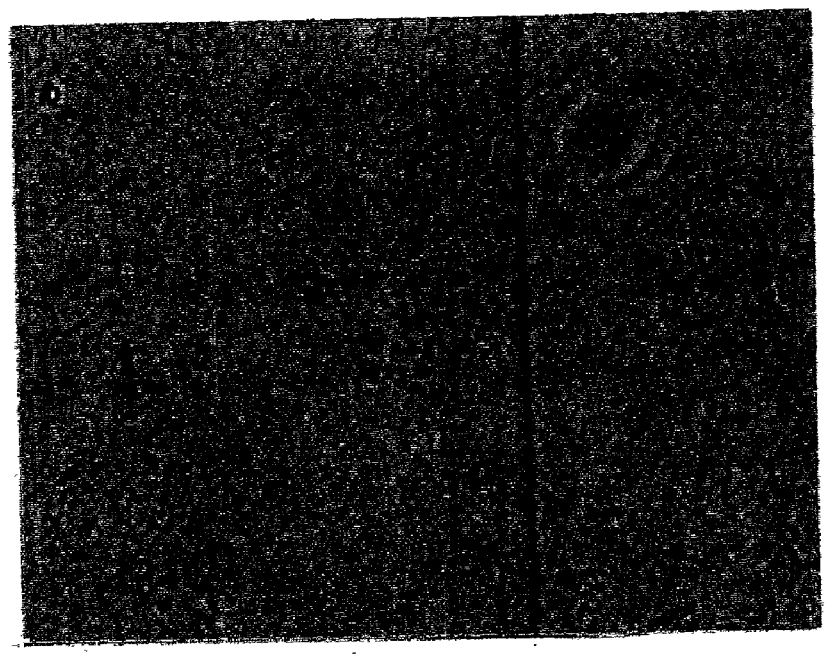
FIG. 40 is a micrograph showing an optical image of polymer film (4) formed by a selected part of diffracted light.

After the diffraction images of FIGS. 9 to 12 were obtained, the light-shielding plate with a circular pinhole having a diameter of 800 μm was inserted as the spatial filter 9 on the same plane as the diffraction image plane 8, so as to block the light other than the scattered light on the upper side of direct light. FIGS. 25 to 28 are micrographs showing the diffraction images of polymer films (1) to (4) at this time, respectively. Thereafter, the focus of microscope was moved to the specimen position, whereby the image formed by the light transmitted through the spatial filter 9 alone was obtained as the specimen image. Micrographs of FIGS. 29 to 32 show the images of polymer films (1) to (4) at this time, respectively. As a result, nonuniform structures inclined by about 30 degrees with respect to the machine direction of the films at intervals of about 10 μm were observed in polymer films (3) and (4), i.e., specimens having LLDPE/LDPE ratios of 50/50 and 0/100 (FIGS. 31 and 32). The direction of these structures corresponds to the direction of intense scattering light in the specimens having LLDPE/LDPE ratios of 50/50 and 0/100 (polymer films (3) and (4)), which is considered to be a main reason why the haze was greater therein than in the specimen having an LLDPE/LDPE ratio of 90/10, i.e., polymer film (2).

OBSERVATION EXAMPLE 4

After the diffraction images of FIGS. 9 to 12 were obtained, the spatial filter 9 identical to that of Observation Examples 2 and 3 was inserted on the same plane as the converging plane 8, so as to block the light other than the direct light and its nearby scattered light. FIGS. 33 to 36 are micrographs showing the diffraction images of polymer films (1) to (4) at this time, respectively. Thereafter, the microscope was focused on the specimen position, whereby the image formed by the light transmitted through the spatial filter 9 alone was obtained as the specimen image. As a result, differences in brightness/darkness corresponding to the differences in haze among specimens were seen. Micrographs of FIGS. 37 to 40 show the images of polymer films (1) to (4) at this time, respectively. In particular, it is seen that the specimen having an LLDPE/LDPE blending ratio of 100/0 (polymer film (1)) exhibits a high haze value, a regular structure of spherulite, and a remarkable darkness in the photograph.

COMPARATIVE EXAMPLE 1

Figure 13:
FIG. 13 is a micrograph showing an optical image of polymer film (1)
Figure 14:
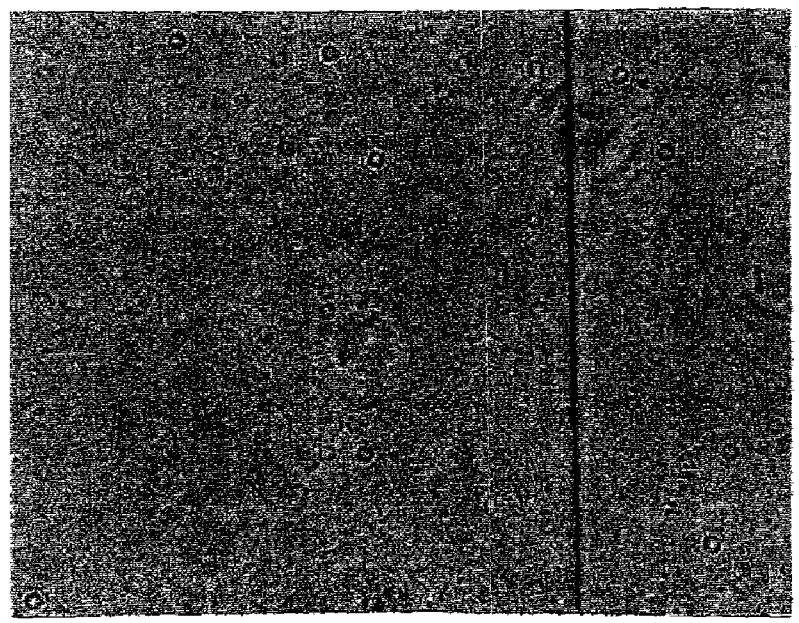
FIG. 14 is a micrograph showing an optical image of polymer film (2)
Figure 15:
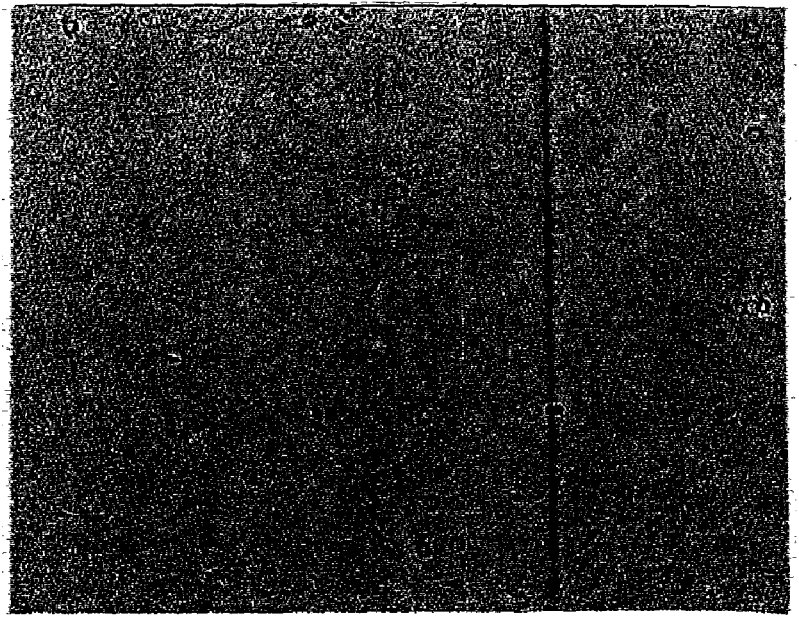
FIG. 15 is a micrograph showing an optical image of polymer film (3)
Figure 16:
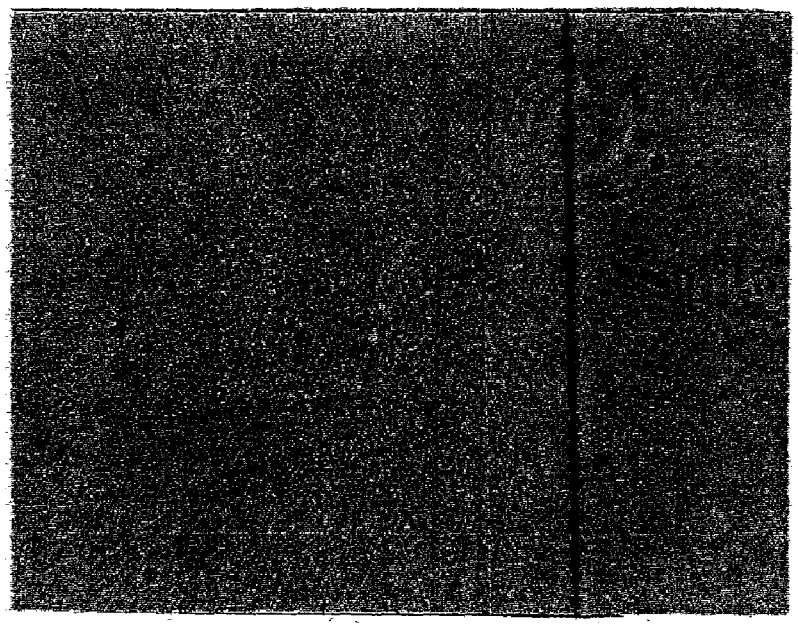
FIG. 16 is a micrograph showing an optical image of polymer film (4)
Figure 17:
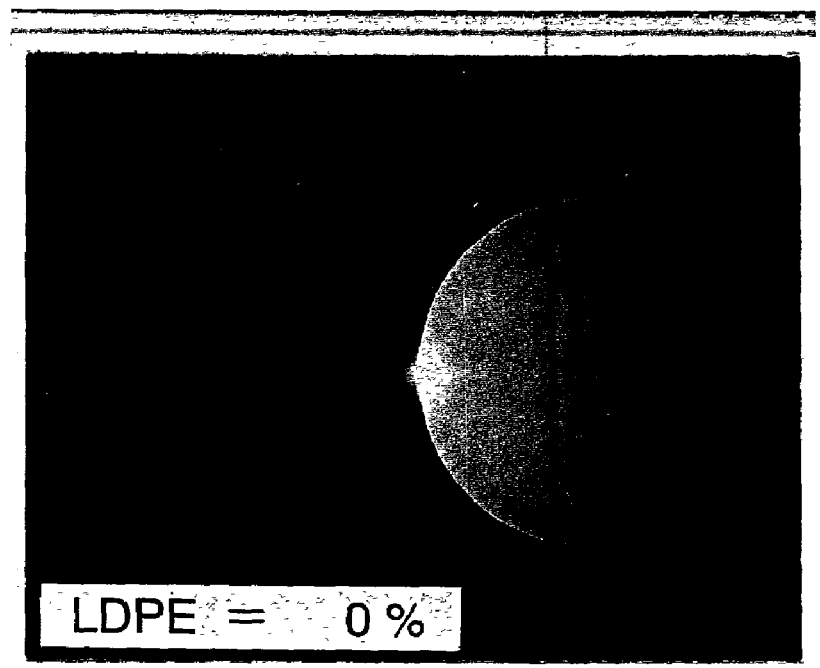
FIG. 17 is a micrograph showing a diffraction image of polymer film (1) formed by a selected part of diffracted light.
Figure 18:
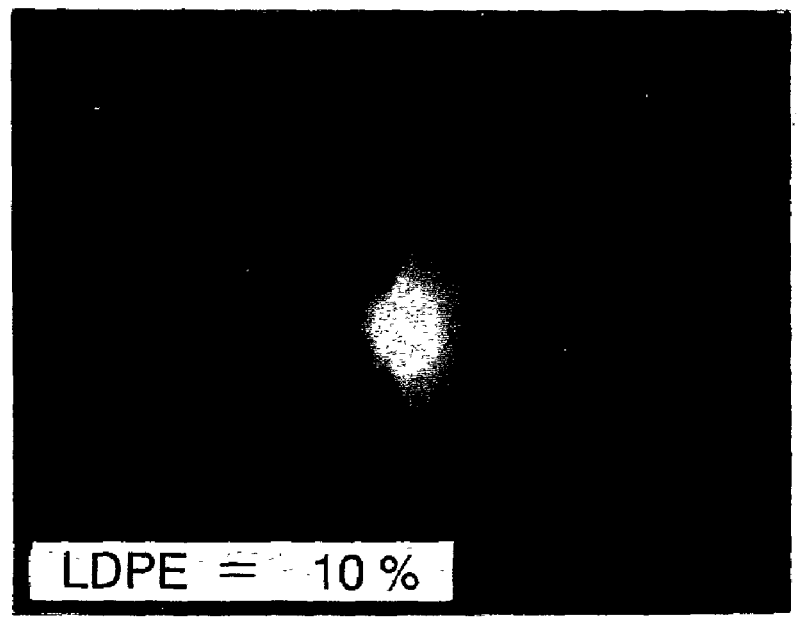
FIG. 18 is a micrograph showing a diffraction image of polymer film (2) formed by a selected part of diffracted light.
Figure 19:
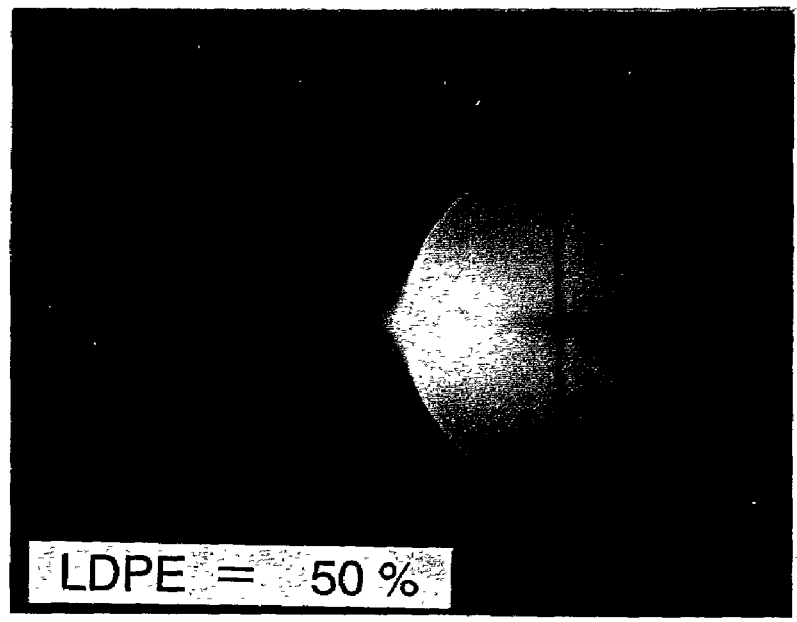
FIG. 19 is a micrograph showing a diffraction image of polymer film (3) formed by a selected part of diffracted light.
Figure 20:
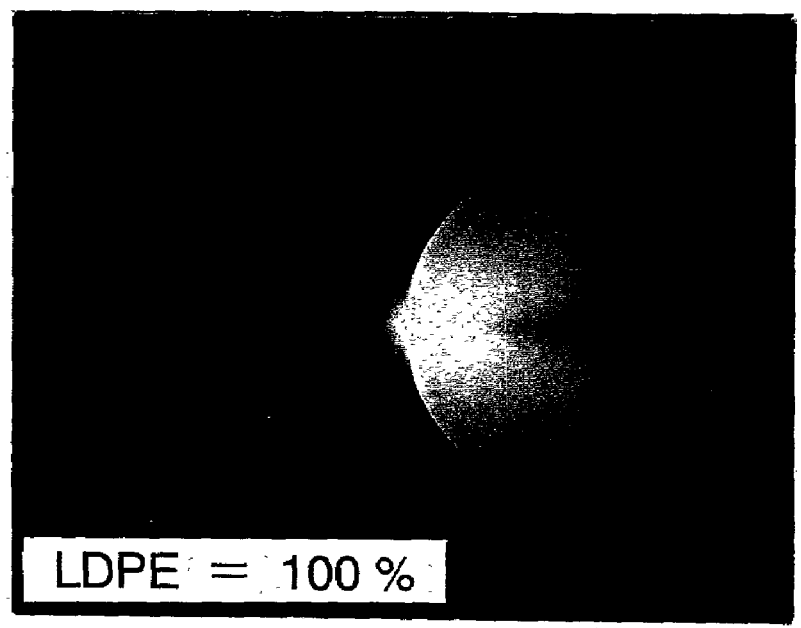
FIG. 20 is a micrograph showing a diffraction image of polymer film (4) formed by a selected part of diffracted light.
Figure 21:
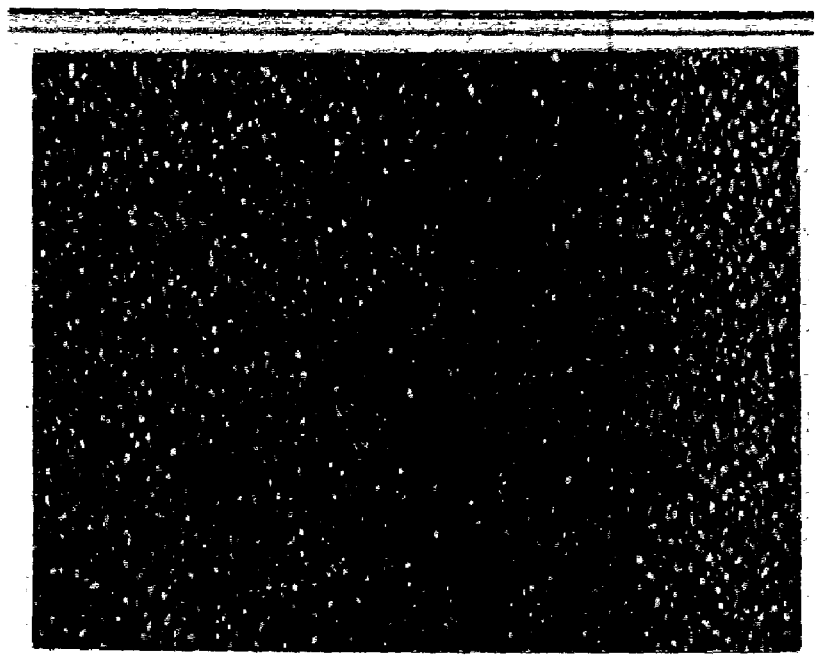
FIG. 21 is a micrograph showing an optical image of polymer film (1) formed by a selected part of diffracted light.
Figure 22:
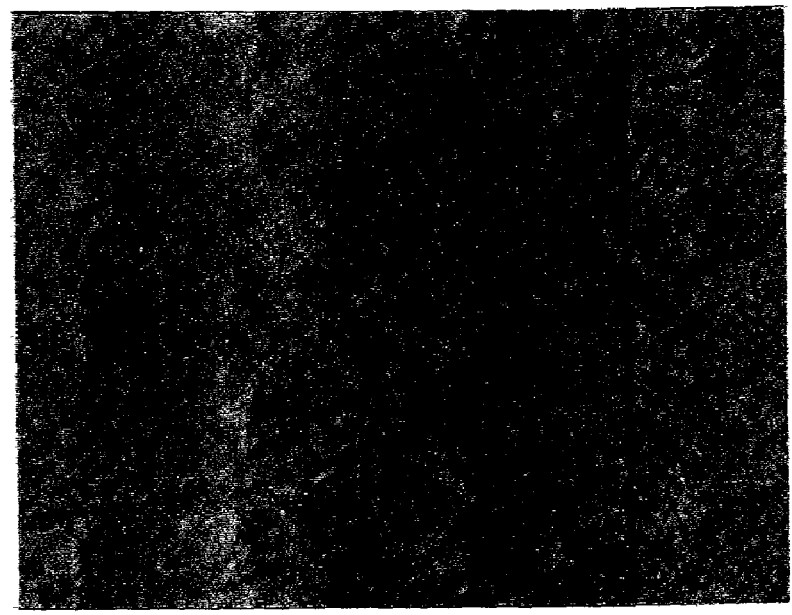
FIG. 22 is a micrograph showing an optical image of polymer film (2) formed by a selected part of diffracted light.
Figure 23:
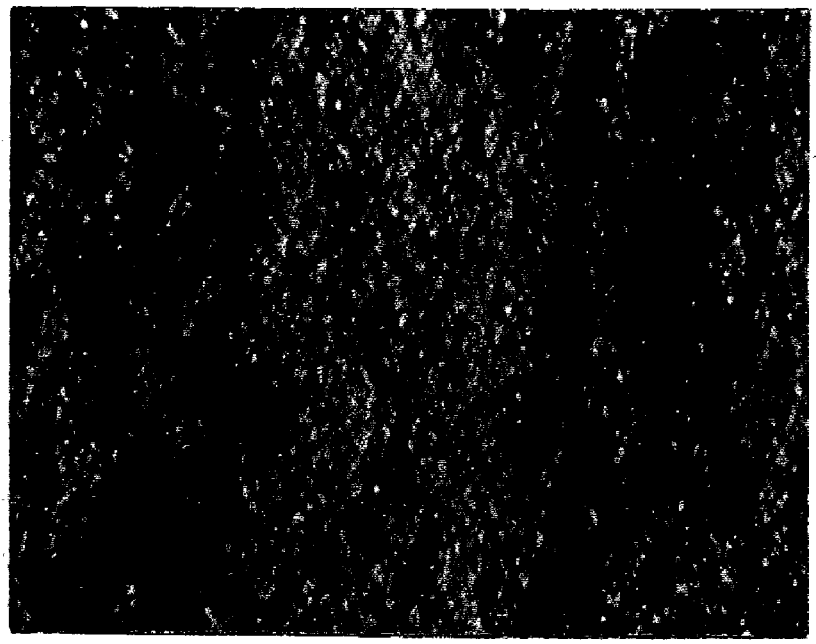
FIG. 23 is a micrograph showing an optical image of polymer film (3) formed by a selected part of diffracted light.
Figure 24:
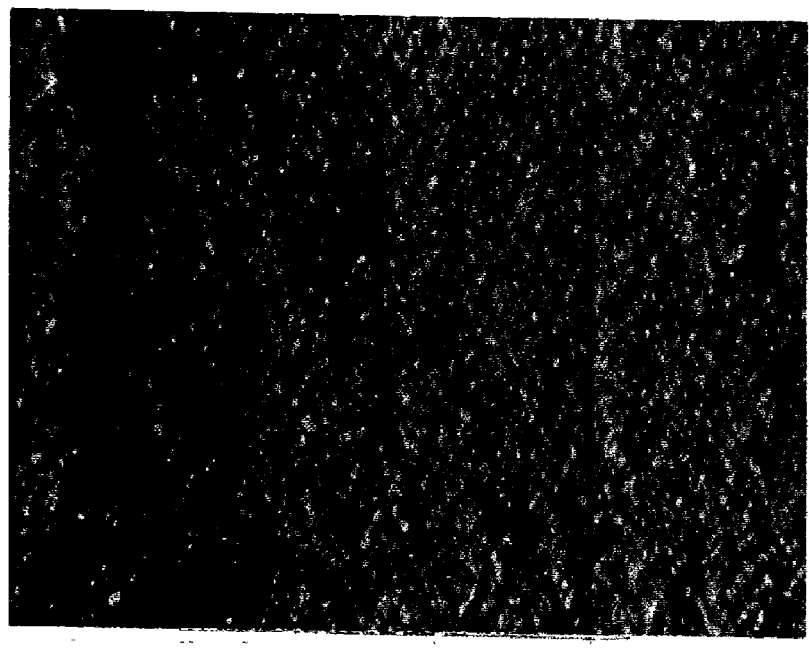
FIG. 24 is a micrograph showing an optical image of polymer film (4) formed by a selected part of diffracted light.
Figure 25:
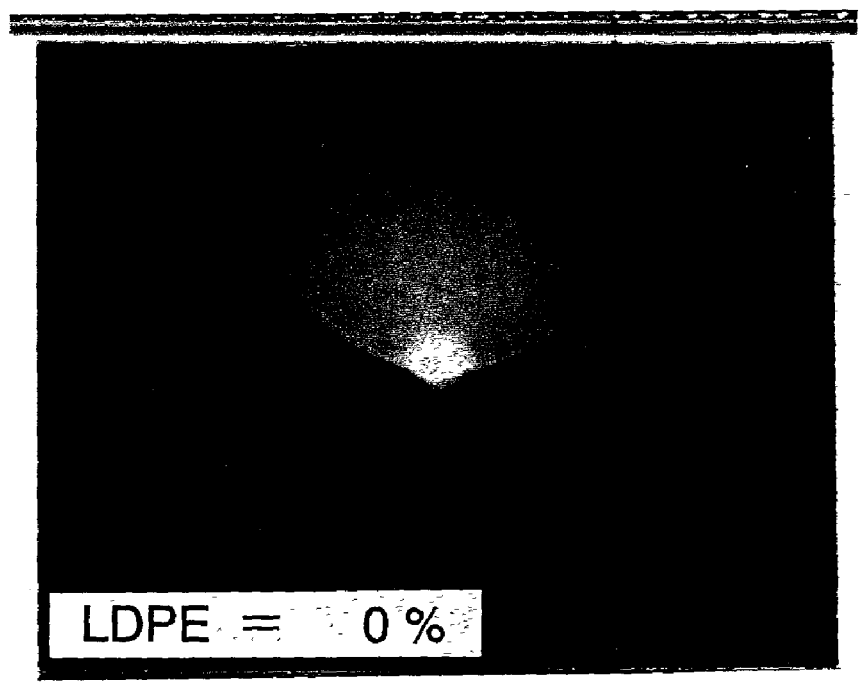
FIG. 25 is a micrograph showing a diffraction image of polymer film (1) formed by a selected part of diffracted light.
Figure 26:
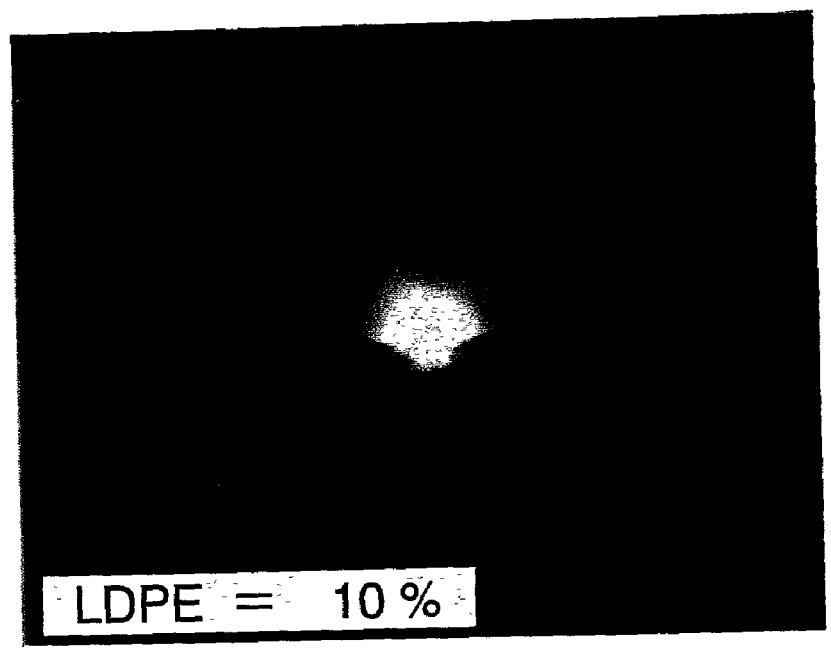
FIG. 26 is a micrograph showing a diffraction image of polymer film (2) formed by a selected part of diffracted light.
Figure 27:
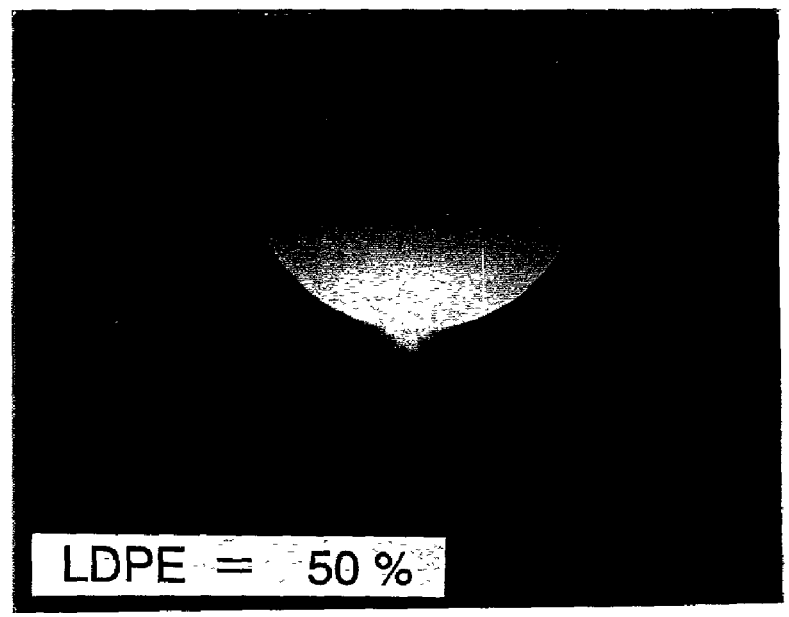
FIG. 27 is a micrograph showing a diffraction image of polymer film (3) formed by a selected part of diffracted light.
Figure 28:
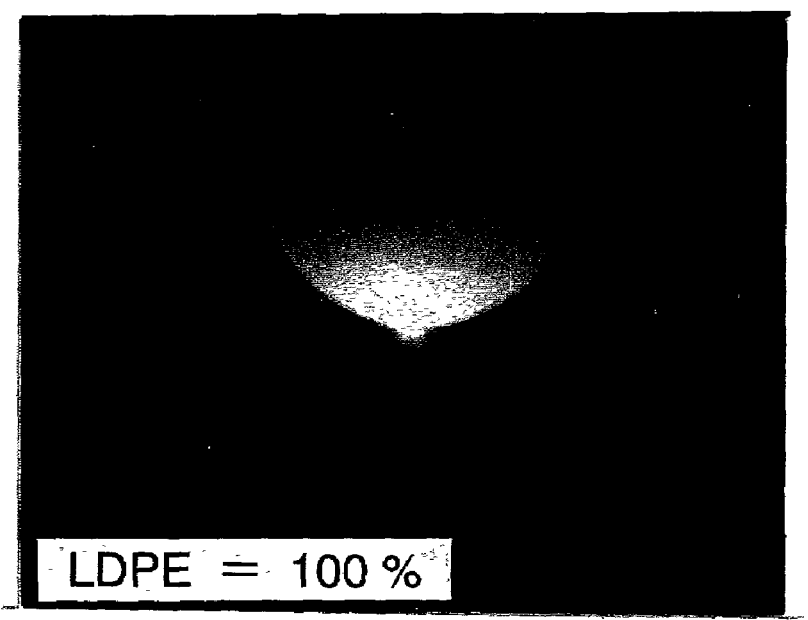
FIG. 28 is a micrograph showing a diffraction image of polymer film (4) formed by a selected part of diffracted light.
Figure 29:
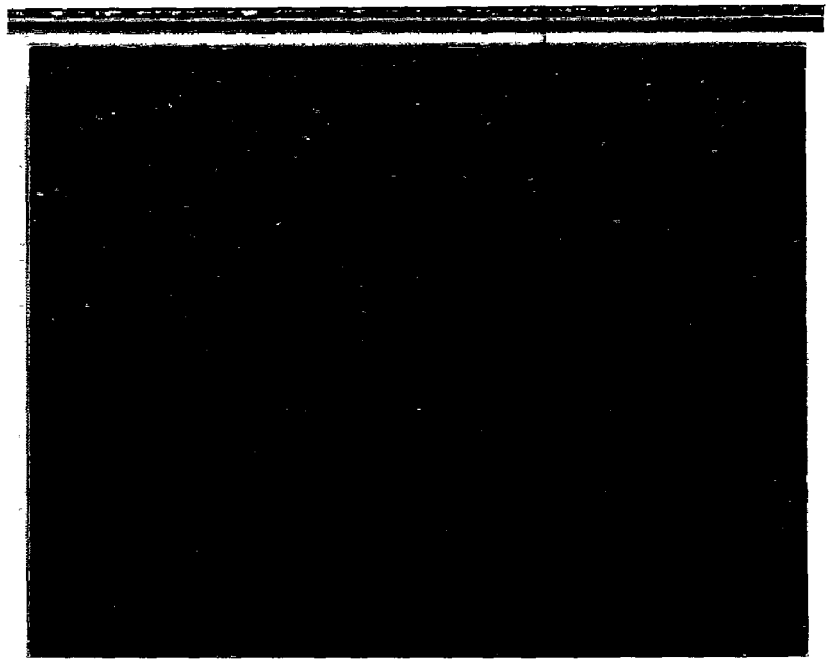
FIG. 29 is a micrograph showing an optical image of polymer film (1) formed by a selected part of diffracted light.
Figure 30:
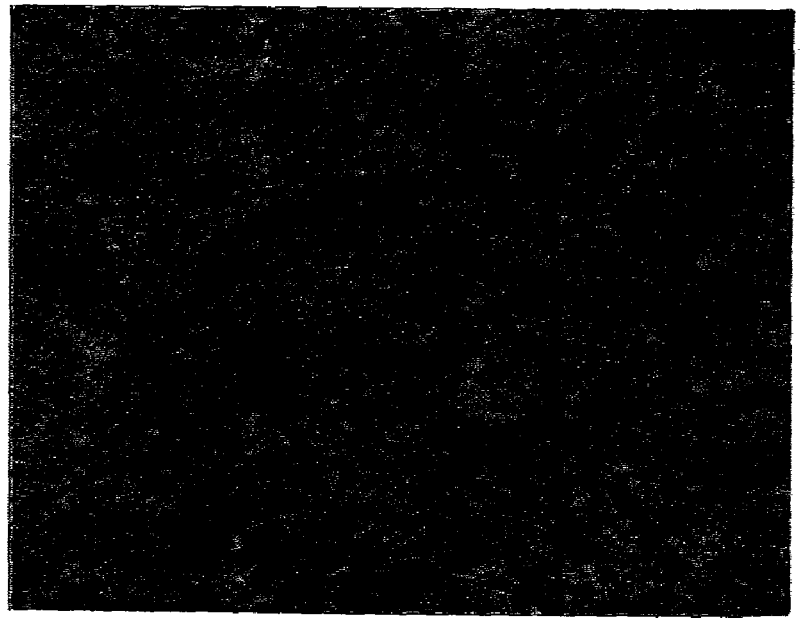
FIG. 30 is a micrograph showing an optical image of polymer film (2) formed by a selected part of diffracted light.

As mentioned in Observation Example 1, FIG. 13 is a micrograph taken when the objective lens 10 was focused on polymer film (1) in the state where the spatial filter 9 was removed, in which nonuniform structures were not seen. When compared with the micrograph of FIG. 41 obtained by a conventional optical microscope apparatus using a parallel beam as illumination light, however, it is seen that an image with a higher contrast is obtained.

Figure 41:
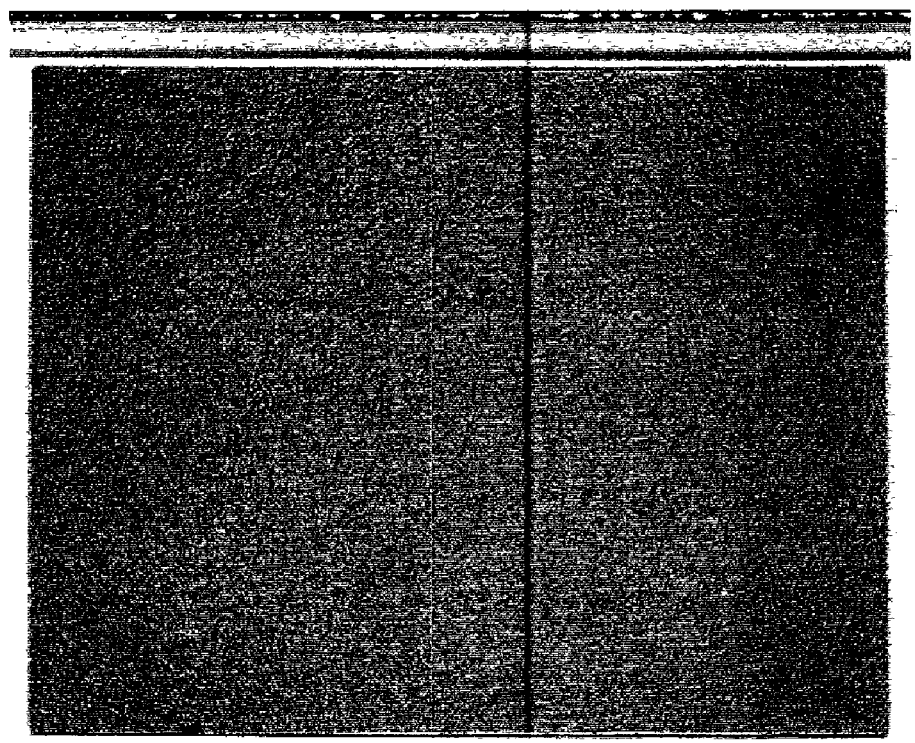
FIG. 41 is a micrograph showing an optical image of polymer film (1) formed by a conventional optical microscope apparatus.

The micrograph of FIG. 41 was obtained as a specimen image when polymer film (1) was observed with a conventional optical microscope apparatus (MICROPHOT FXA manufactured by Nikon Corp.) equipped with a transmission type polarizing device (manufactured by Nikon Corp.), a condenser lens (swing-out achromat condenser manufactured by Nikon Corp.), an objective lens (CFP4x having a numerical aperture of 0.10 and a power of 4x, manufactured by Nikon Corp.), and an eyepiece (CFW10x having a power of 10x, manufactured by Nikon Corp.), while its intermediate power-varying section was set to 1.25x. Here, no polarizers and no analyzers were inserted on the optical axis. Results of observation were photographed with a predetermined exposure time by use of a high-sensitivity instant monochrome film (FP-3000B SUPER SPEEDY, ISO 3200, manufactured by Fuji Photo Film Co., Ltd.). As a result, nonuniform structures corresponding to haze were not seen in thus obtained specimen image.

As in the foregoing, since illumination light converging at a point in front of the objective lens is used, a sample and its diffraction image can be observed selectively by the objective lens simply moved in the direction of optical axis in the optical microscope apparatus in accordance with the present invention and the microscope observing method using the same. Also, when the spatial filter is inserted or moved as appropriate, the optical image and diffraction image of sample formed by desirable diffracted light can be obtained. Therefore, texture information and orientation information which have not been available with the conventional optical microscope apparatus can be obtained as an optical image or diffraction image.

Figure 42:
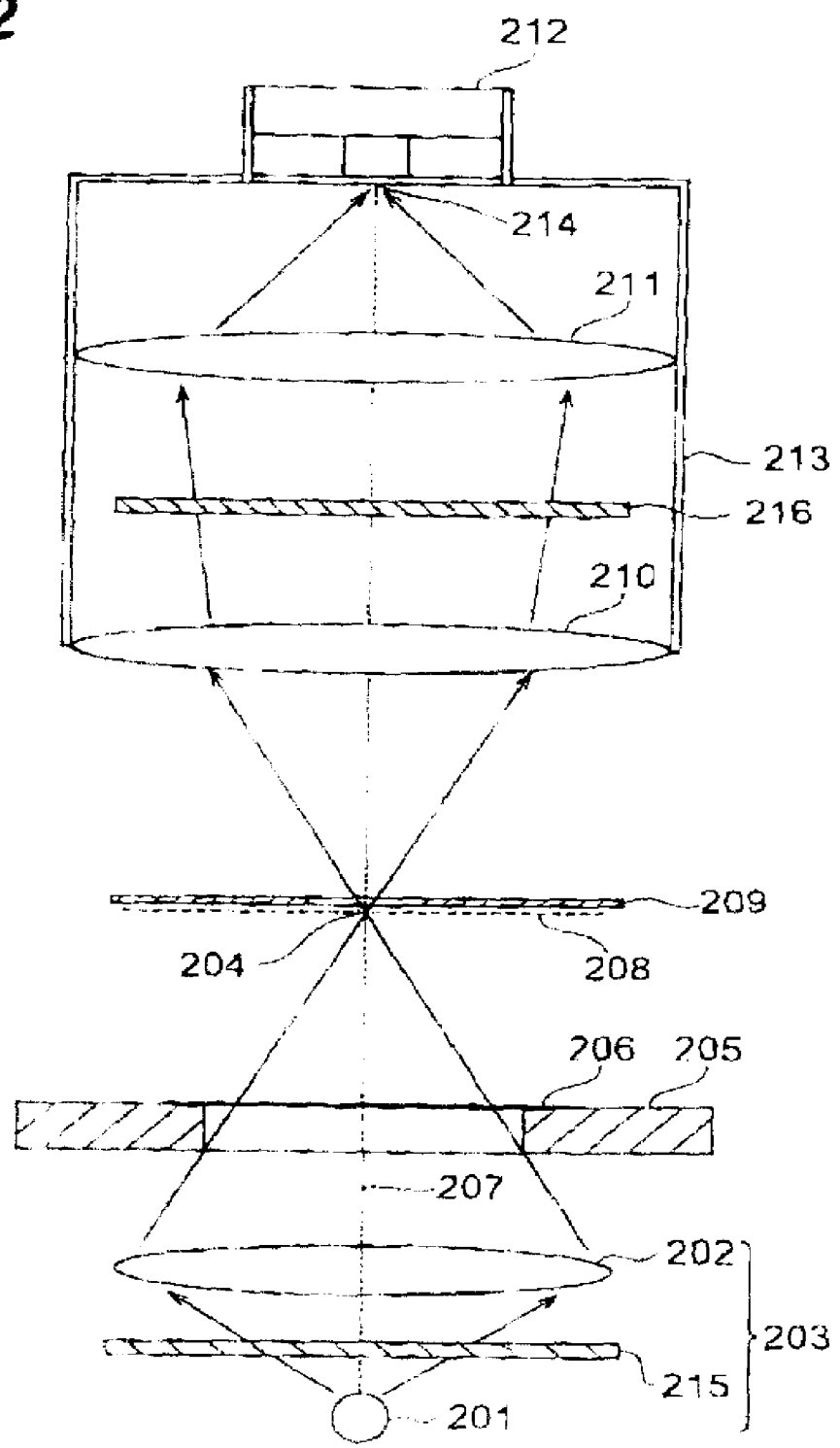
FIG. 42 is a view showing the configuration of a convergent beam polarizing microscope apparatus which is an embodiment of the present invention.

FIG. 42 is a view showing the basic configuration of a convergent beam polarizing microscope apparatus which is an embodiment of the present invention. A light source 201, a condenser lens 202, and a polarizer 215 constitute an illuminating means 203 which emits as illumination light a polarized convergent beam converging at a point 204 in the space. The light emitted from the light source 201 may be either white light or monochromatic light.

Disposed above the illuminating means 203 is a sample mounting table (stage) 205 for mounting a sample (specimen) 206. Formed at the center of stage 205 is an opening for transmitting therethrough the polarized illumination light from the illuminating means 203, whereas the illumination light passes through the opening and converges at the converging point 204 thereabove. As a consequence, a Fourier-transformed image of the sample 206 caused by the polarized illumination light, i.e., diffraction image of the sample 206 under polarization, is formed at a plane 208, perpendicular to the optical axis 207 of illumination light, including the converging point 204. This plane 208 will be referred to as diffraction image plane here.

The condenser lens 202 is movable in the direction of optical axis 207 against the position of the stage 205. By the condenser lens 202 moved in the direction of optical axis 207, the distance between the sample 206 mounted on the stage 205 and the converging point 204, i.e., the distance between the sample 206 and the diffraction image plane 208, can be changed.

Figure 43:
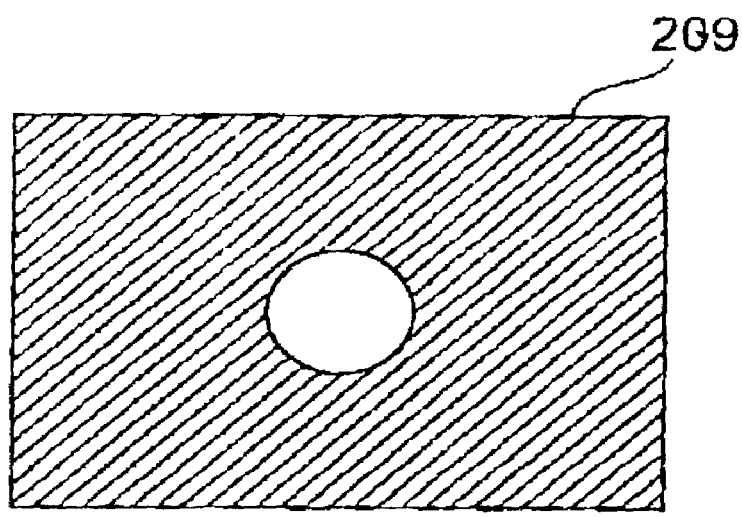
FIG. 43 is a plan view showing a spatial filter 209.

At a position on or near the diffraction image plane 208, a spatial filter 209 is disposed parallel to the diffraction image plane 208. FIG. 43 is a plan view of the spatial filter 209, in which a circular opening having a diameter of several hundreds of microns, for example, is formed at the center of a light-shielding plate. The spatial filter 209 is movable in directions orthogonal to the optical axis 207, whereby the observation field of view of a diffraction image formed on the diffraction image plane 208 can be selected. Also, the spatial filter 209 is easily detachable even during the observation.

The opening formed in the spatial filter 209, i.e., observation field of view, may not always be circular. Square forms, semicircular forms, sector forms, and the like can be selected as appropriate depending on the aimed object.

Disposed further above the spatial filter 209 is a lens barrel 213 comprising an objective lens 210, an analyzer 216, an imaging lens 211, and an eyepiece 212. The inner configuration of the lens barrel 213 itself has conventionally been known in general, and the lens barrel 213 enables focusing when moved in the direction of optical axis 207.

The movable range of lens barrel for focusing is required to be sufficiently longer than that in a conventional typical microscope. Namely, this lens barrel is adapted to be focused on at least both of the sample 206 and diffraction image plane 208.

The objective lens 210 has such a focal length that its position is behind (above) the spatial filter 209 when focused on the sample 206. Therefore, the spatial filter 209 does not hinder focusing operations.

Figure 44:
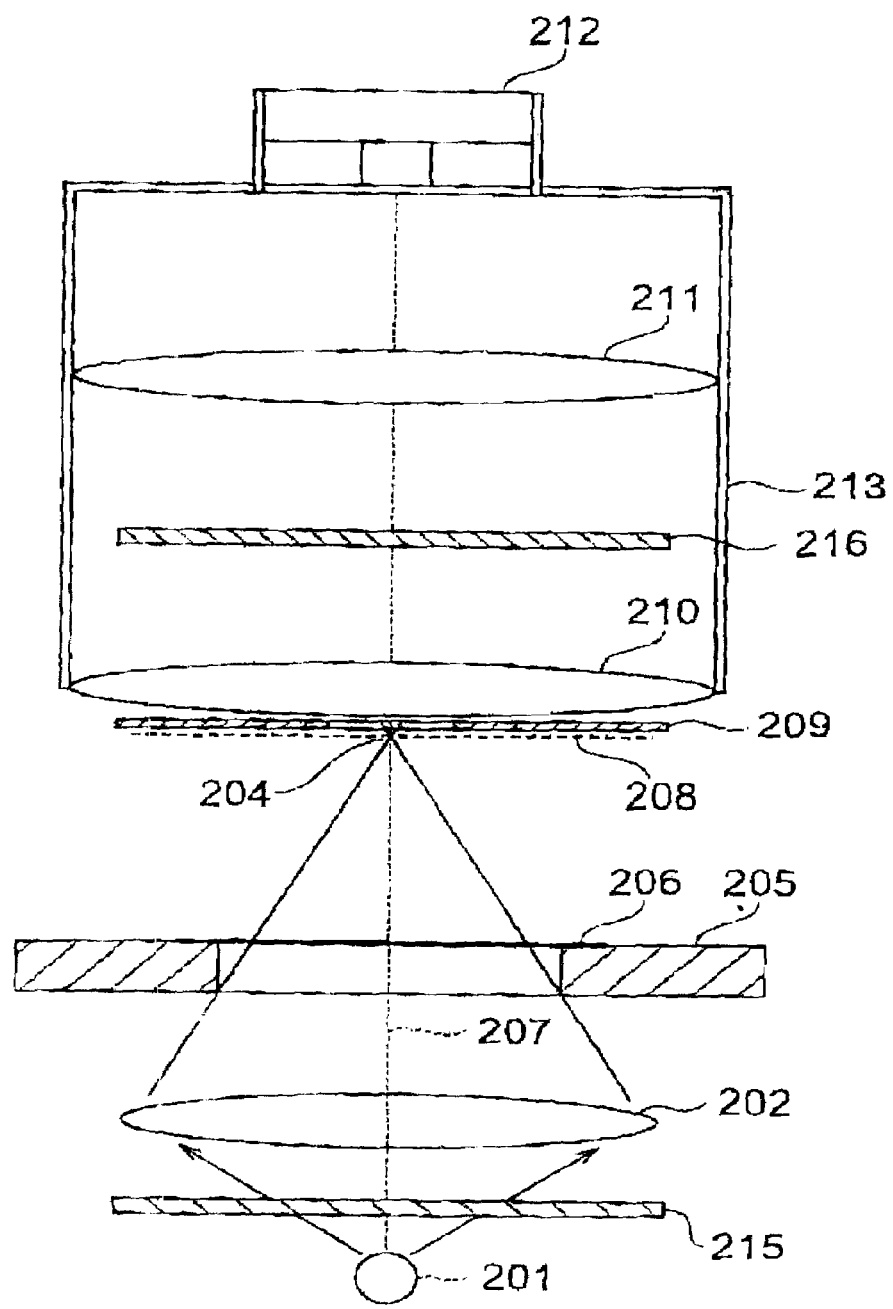
FIG. 44 is a view showing the convergent beam polarizing microscope apparatus in a state where an objective lens 210 is disposed close to the spatial filter 209.

If the position of diffraction image plane 208 is adjusted such that the objective lens 210 is focused on the sample 206 when located closest to the spatial filter 209 as shown in FIG. 44, then the brightest image can be obtained.

The image captured by the objective lens 210 is formed at an intermediate image position 214 behind the imaging lens 211 after being transmitted through the analyzer 216, whereas the eyepiece 212 has a focus adjusted such that this image can be observed.

In one of observing methods by microscope of this embodiment using such a convergent beam polarizing microscope apparatus, a sample is observed while the objective lens is focused on the sample. Since a convergent beam is used as illumination light, a polarizing microscope image having a very high contrast and a great focal depth can be obtained.

In another observing method by microscope, the objective lens is focused on the diffraction image plane, orthogonal to the optical axis of the objective lens, including the converging point, so as to observe the diffraction image of sample formed on the diffraction image plane by the polarized incident light with the analyzer.

If the relationship between the diffraction image and texture concerning a sample is acquired beforehand, then the texture of sample can be seen from a characteristic of the pattern of diffraction image when the diffraction image is directly observed.

In still another observing method by microscope, the sample is initially observed with the objective lens being focused on the sample and then the diffraction image is observed with the objective lens being focused on the diffraction image formed on the diffraction image plane, or the diffraction image is initially observed with the objective lens being focused on the diffraction image formed on the diffraction image plane and then the sample is observed with the objective lens being focused on the sample.

As a consequence, an overall characteristic of a texture which has been hard to discern upon the observation of optical image alone can be grasped, and details of a texture yielding the diffraction image which has been hard to discern upon the observation of diffraction image alone can be seen.

In still another observing method by microscope, a spatial filter is used for transmitting therethrough only light of a desirable region on the diffraction image plane, and the sample is observed while the objective lens is focused on the sample for the light transmitted through the spatial filter.

Since the light (direct light and diffracted light) transmitted through the spatial filter can be selected freely, various dark- and bright-field images corresponding to desirable diffracted lights can be observed for the same sample under polarization. As a consequence, the texture of sample can be seen in more detail.

In still another observing method by microscope, the objective lens is focused on the diffraction image plane, so as to observe the diffraction image of sample formed on the diffraction image plane by the polarized incident light; and, after the spatial filter is adjusted so as to transmit therethrough only the light of a desirable region of the diffraction image, the objective lens is focused on the sample, so as to observe the sample with the light transmitted through the spatial filter and the analyzer.

Since the image observation is carried out after diffracted light is selected according to the diffraction image, it can be seen which diffracted light the optical image is based on. As a consequence, the texture of sample can be seen in more detail.

Preferably, in the observing methods by microscope of this embodiment, the sample is observed while the position of diffraction image plane is adjusted such that the objective lens is focused on the sample when positioned near the diffraction image plane. It is because of the fact that, since the diffraction image plane is a position where the illumination light converges, the image becomes brightest with no loss in diffracted light when the objective lens is positioned there.

By either the form of the spatial filter, the position thereof on the diffraction image plane, or the angle of optical axis of illumination light with respect to the optical axis of objective lens changed, diffracted light can be selected with which the optical image of the sample which was to be seen is formed.

Preferably, in the observing methods by microscope of this embodiment, the sample is observed with the direction of light transmitted through the spatial filter and the optical axis of objective lens substantially aligning with each other. Though the quantity of light is reduced by the spatial filter, a bright image with less distortion can be obtained when the two optical axes are substantially aligned with each other.

Preferably, in the observing methods by microscope of this embodiment, the size of diffraction image is adjustable by changing the position of diverging point of illumination light in the optical axis direction of objective lens. As the distance is longer, the diffraction image can be made greater, whereby the diffraction image can be observed in more detail.

In the observing methods by microscope of this embodiment, monochromatic light may be used as the illumination light. When monochromatic light is used, images important for studying a texture, which have been unavailable with white light, can be obtained.

The observing methods by microscope of this embodiment are suitably usable for polymer materials. For important textures of polymer materials, detailed findings which have been unavailable with conventional microscope observing methods can be obtained.

While examples of the sample in the present invention include polymer materials (e.g., polymer films such as polyethylene and polypropylene), biological materials, ceramics, and metals, polymer films are the most typical target materials in that their textures can be observed.

Hence, specific examples in the case where a polymer film is observed as a sample will be explained.

Behind a point light source 201 constituted by a 100-W halogen lamp and a circular pinhole having a diameter of 100 μm, a condenser lens 202 having a numerical aperture of 0.4 was disposed, whereby convergent illumination light was obtained. The condenser lens 202 was allowed to move by 25 mm or more at the maximum in the direction parallel to the optical axis 207. Here, no filter for yielding monochromatic light was attached to the light source.

The stage 205 was disposed behind the condenser lens 202, whereas a glass slide to which a polymer film was secured was mounted thereon. The stage 205 was made stationary in the direction parallel to the optical axis 207. On the other hand, it was made movable in the direction perpendicular to the optical axis 207 in order to select the observation field of view.

Further, as the spatial filter 209, a light-shielding plate provided with a circular pinhole having a diameter of 800 μm was disposed behind the stage 205. For selecting the direct light or scattered light to be blocked in the light transmitted through the specimen (polymer film), the light-shielding plate was allowed to move by 5 mm at the maximum in each of two directions, perpendicular to the optical axis 207, intersecting each other at right angles. Also, it was allowed to move by 5 mm at the maximum in the direction parallel to the optical axis 207 in order to make the converging plane (diffraction image plane) 208 and the pinhole plane coincide with each other.

Behind the spatial filter 209, an objective lens 210 having a longer working distance (CF IC EPI Plan5x having a working distance of 22.5 mm, a numerical aperture of 0.13, and a power of 5x, manufactured by Nikon Corp.) and a three-element lens barrel 213 (TI manufactured by Nikon Corp.) were arranged in this order.

To the three-element lens barrel 213, a photographing apparatus (H-3 manufactured by Nikon Corp.), which is not depicted, and an eyepiece 212 (CFWN10x having a power of 10x, manufactured by Nikon Corp.) were attached, so as to enable observation by the naked eye and photographing. The objective lens 210 and three-element lens barrel 213 were allowed to be focused on a sample image or diffraction image by moving together in the direction parallel to the optical axis 207.

Results of observation were photographed with a predetermined exposure time for each of the diffraction image and specimen image by use of a high-sensitivity instant monochrome film (FP-3000B SUPER SPEEDY, ISO 3200, manufactured by Fuji Photo Film Co., Ltd.).

Specimen (Sample)

Polypropylene with a melt flow rate of 1.2 g/10 minutes was held between a glass slide and a cover glass sheet, melt at 230°°C. for 5 minutes, and then isothermally crystallized at 130°°C., so as to form a film (referred to as polymer film), which was used as a specimen. The sample image of thus obtained specimen was observed with the convergent beam polarizing microscope apparatus of the present invention.

OBSERVATION EXAMPLE 2-1

Figure 45:
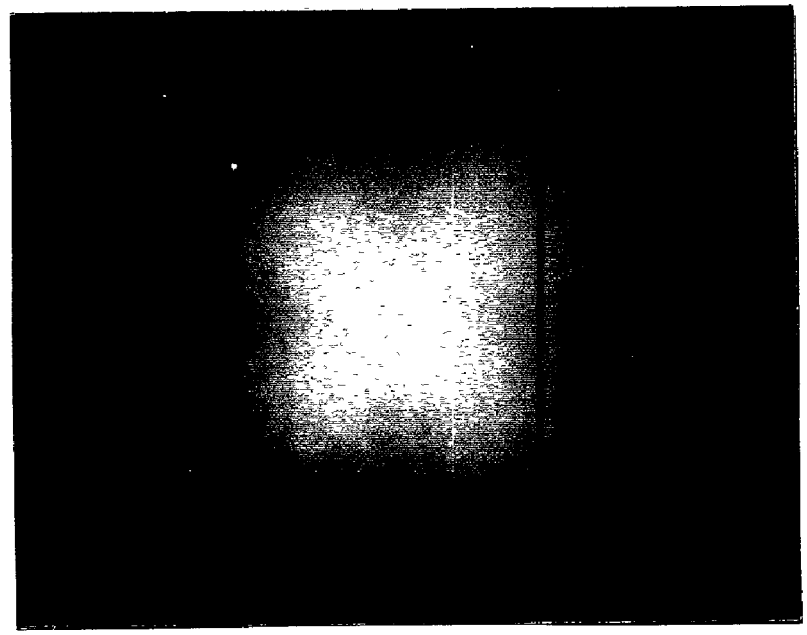
FIG. 45 is a micrograph showing a diffraction image of a polymer film.
Figure 46:
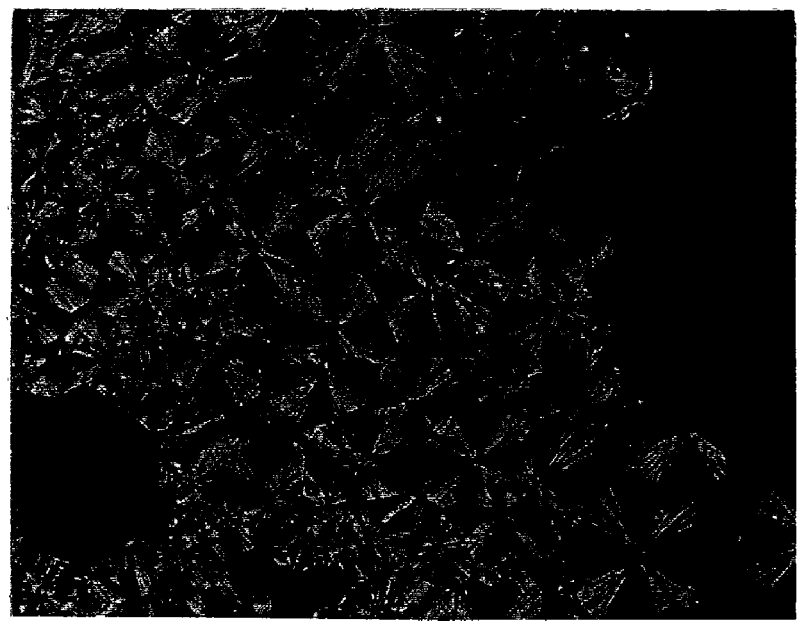
FIG. 46 is a micrograph showing an optical image of the polymer film.

After the spatial filter 209 was removed from the optical axis 207, the specimen 206 was irradiated with convergent illumination light, and the diameter of the transmitted luminous flux was verified with tracing paper or the like, so as to adjust the position of condenser lens 202 such that the position of the converging plane, i.e., diffraction image plane 208, was located between the specimen 206 and the objective lens 210. Subsequently, the objective lens 210 was focused on the diffraction image plane 208, whereby a diffraction image was obtained. FIG. 45 is a micrograph of the diffraction image of polymer film under polarization. Here, the plane of linear polarization of polarizer was aligned with the vertical direction of FIG. 45, whereas the plane of linear polarization of analyzer was aligned with the horizontal direction of FIG. 45. The state where the planes of linear polarization of polarizer and analyzer are arranged perpendicular to each other as such will be referred to as crossed Nicols. FIG. 45 indicated an image shaped like four-leaf clover. Its characteristics coincided with those of a light scattering image of a texture known as a spherulite which is composed of a structure yielding birefringence. Since FIG. 45 is not distorted in any particular direction, it is seen that the spherulite as a whole is not oriented in any particular direction. Though the findings concerning the orientation of spherulite are obtained in FIG. 45, the orientation of structures other than those yielding birefringence can also be seen when the diffraction image is observed while the polarizer and analyzer are offset from the optical path. FIG. 46 is a micrograph taken when the objective lens 210 was focused on the polymer film under crossed Nicols. Observed in FIG. 46 was an assembly of structures having a dark cross-like contrast. These characteristics coincide with those of microscopic images of spherulite under crossed Nicols, whereby it is seen that spherulite constituted by structures yielding birefringence are observed with a high contrast.

OBSERVATION EXAMPLE 2-2

Figure 47:
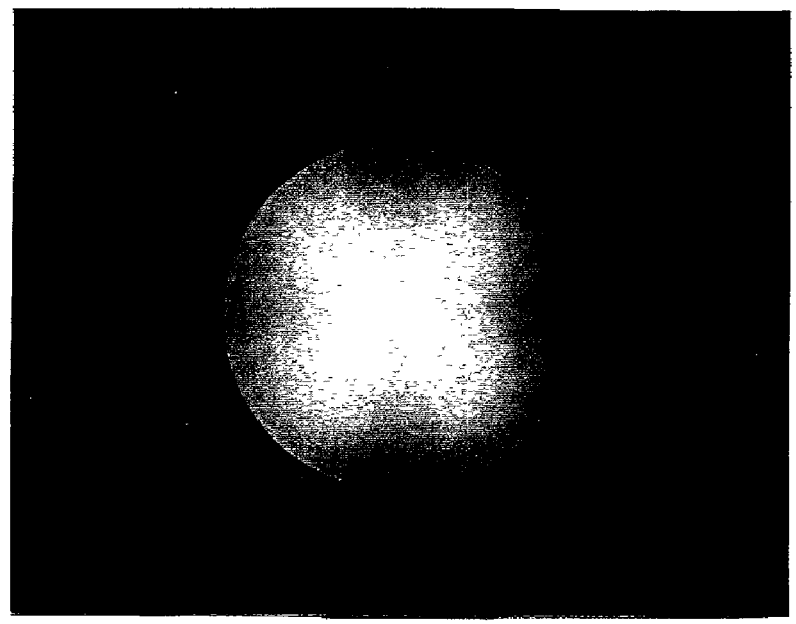
FIG. 47 is a micrograph showing a diffraction image of the polymer film formed by a selected part of diffracted light.
Figure 48:
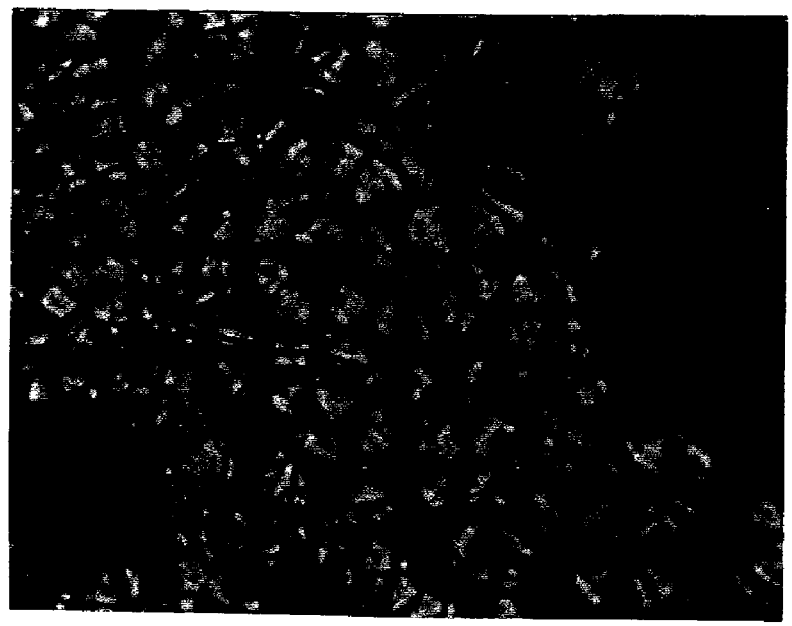
FIG. 48 is a micrograph showing an optical image of the polymer film formed by a selected part of diffracted light.

After the diffraction image of FIG. 45 was obtained, the light-shielding plate with a circular pinhole having a diameter of 800 μm was inserted as a spatial filter on the same plane as the diffraction image plane 208, so as to block the light other than the direct light and its nearby scattering light. FIG. 47 is a micrograph showing the diffraction image of polymer film at this time. Thereafter, the focus of microscope apparatus was moved to the specimen position, whereby the image formed by the light transmitted through the spatial filter 209 alone was obtained as the specimen image. FIG. 48 is a micrograph showing the image of polymer film at this time. As a result, a circular structure was seen to exist inside the boundary of spherulite. This structure was not seen in FIG. 46 using no spatial filter.

OBSERVATION EXAMPLE 2-3

Figure 49:
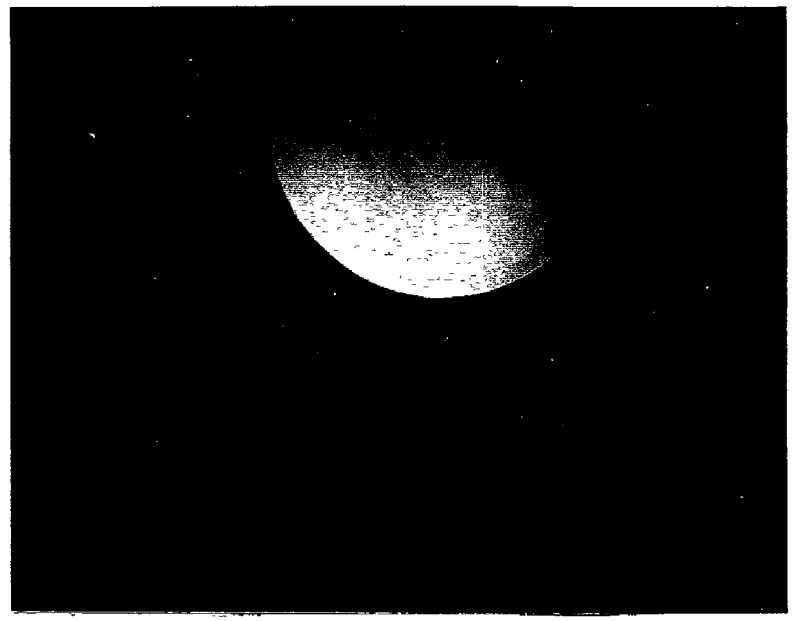
FIG. 49 is a micrograph showing a diffraction image of the polymer film formed by a selected part of diffracted light.
Figure 50:
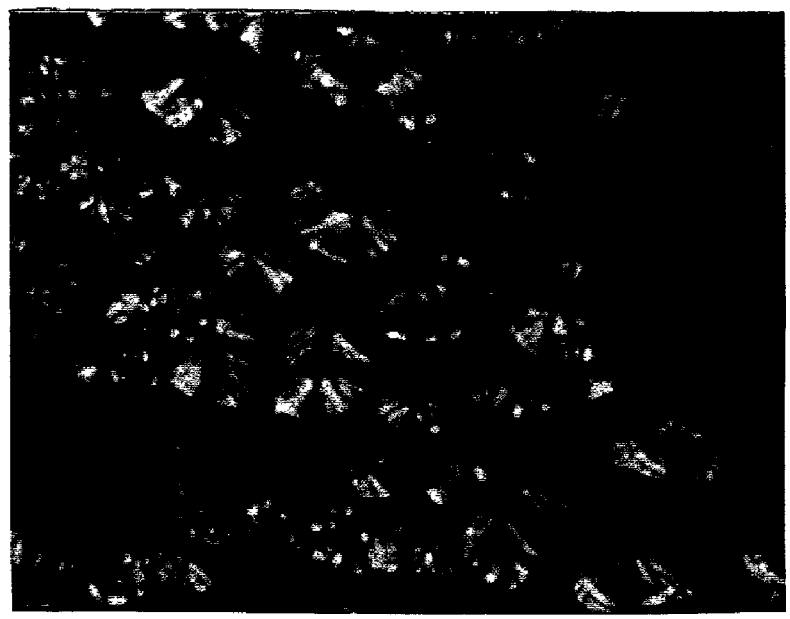
FIG. 50 is a micrograph showing an optical image of the polymer film formed by a selected part of diffracted light.

After the diffraction image of FIG. 45 was obtained, a light-shielding plate with a circular pinhole having a diameter of 800 µm was inserted as the spatial filter 209 on the same plane as the diffraction image plane 208, so as to block the light other than the scattered light on the upper side of direct light. FIG. 49 is a micrograph showing the diffraction image of polymer film at this time. Thereafter, the microscope apparatus was focused on the specimen position, whereby the image formed by the light transmitted through the spatial filter 209 alone was obtained as the specimen image. FIG. 50 is a micrograph showing the image of polymer film at this time. As a result, the upper structure of spherulite was discriminated from the lower structure thereof. The ability to extract such a structure has not been known in the conventional optical microscope apparatus.

OBSERVATION EXAMPLE 2-4

Figure 51:
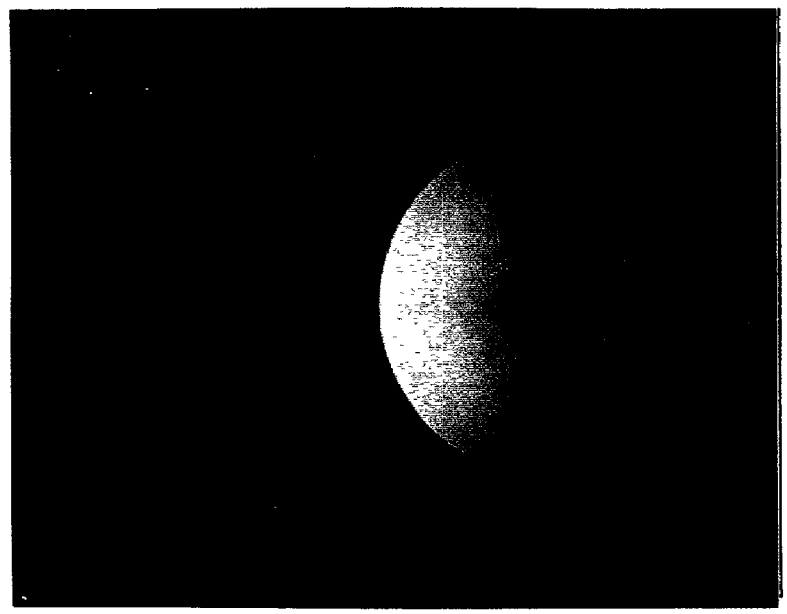
FIG. 51 is a micrograph showing a diffraction image of the polymer film formed by a selected part of diffracted light.
Figure 52:
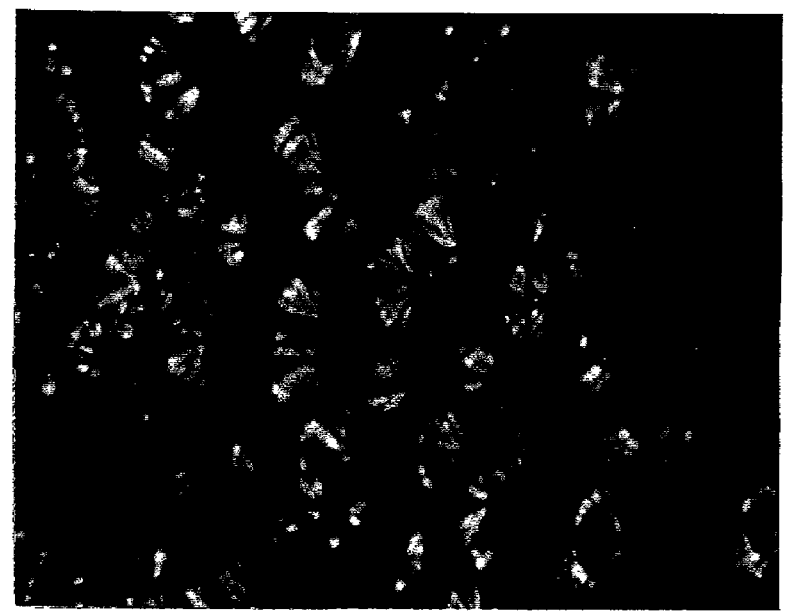
FIG. 52 is a micrograph showing an optical image of the polymer film formed by a selected part of diffracted light.

After the diffraction image of FIG. 45 was obtained, the spatial filter 209 identical to that of Observation Examples 2-2 and 2-3 was inserted on the same plane as the diffraction image plane 208, so as to block the light other than the scattering light on the right side of direct light. FIG. 51 is a micrograph showing the diffraction image of polymer film at this time. Thereafter, the microscope apparatus was focused on the specimen position, whereby the image formed by the light transmitted through the spatial filter 209 alone was obtained as the specimen image. FIG. 52 is a micrograph showing the image of polymer film at this time. As a result, the difference of spherulite in the rightward and leftward directions was also identified.

OBSERVATION EXAMPLE 2-5

Figure 53:
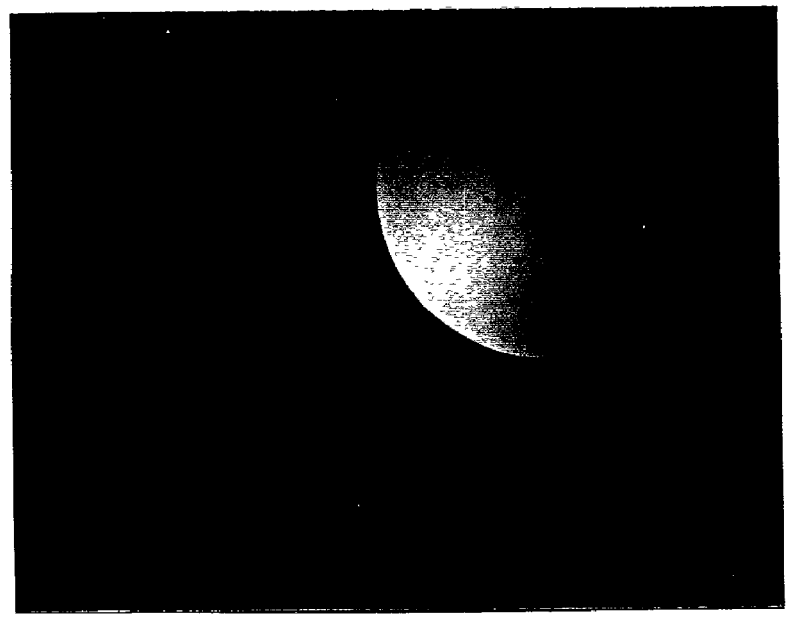
FIG. 53 is a micrograph showing a diffraction image of the polymer film formed by a selected part of diffracted light.
Figure 54:
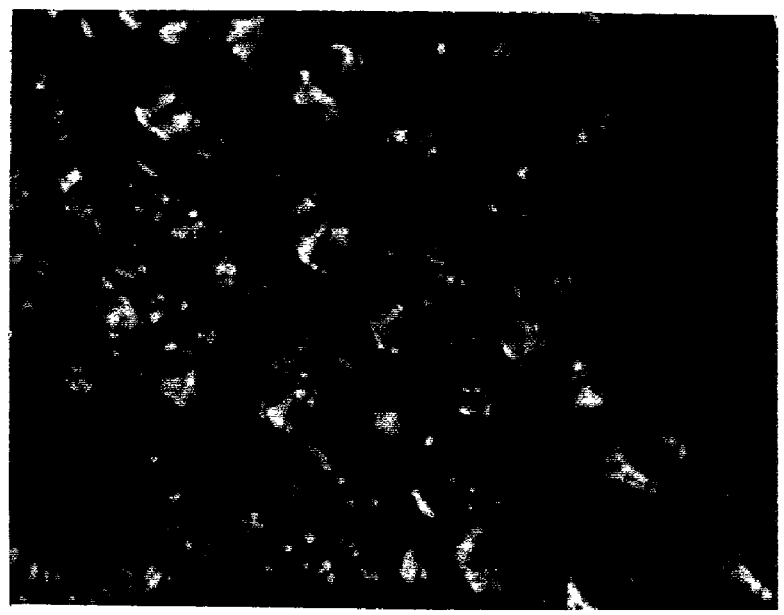
FIG. 54 is a micrograph showing an optical image of the polymer film formed by a selected part of diffracted light.

After the diffraction image of FIG. 45 was obtained, the spatial filter 209 identical to that of Observation Examples 2-2 to 2-4 was inserted on the same plane as the diffraction image plane 208, so as to block the light other than the scattering light on the upper right side of direct light. FIG. 53 is a micrograph showing the diffraction image of polymer film at this time. Thereafter, the microscope apparatus was focused on the specimen position, whereby the image formed by the light transmitted through the spatial filter 209 alone was obtained as the specimen image. FIG. 54 is a micrograph showing the image of polymer film at this time. As a result, on the upper right side of spherulite was discriminated from the other structures. The range selected by the spatial filter was made smaller, whereby it was possible to reduce the range of structure to be extracted.

OBSERVATION EXAMPLE 2-6

Figure 55:
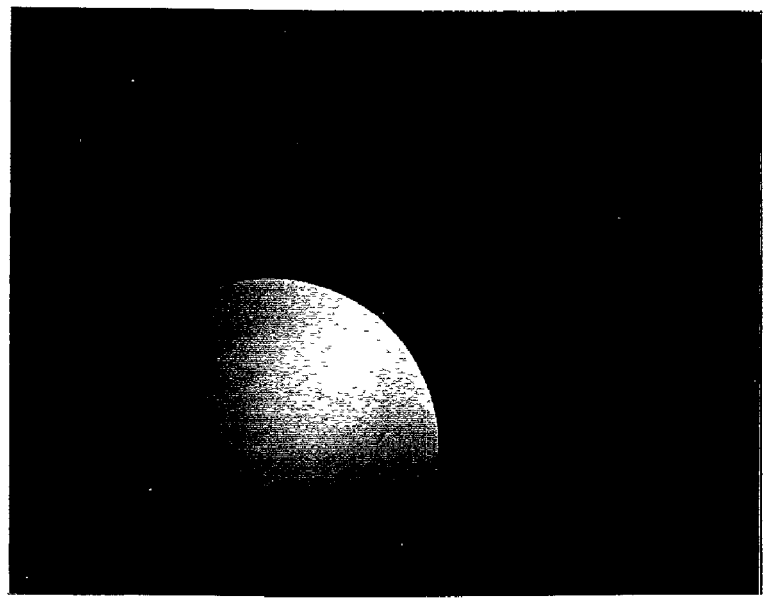
FIG. 55 is a micrograph showing a diffraction image of the polymer film formed by a selected part of diffracted light.
Figure 56:
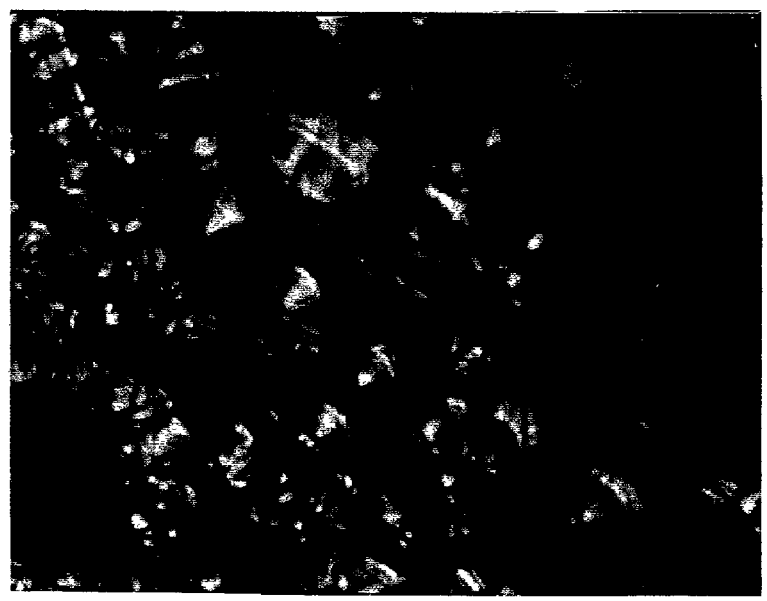
FIG. 56 is a micrograph showing an optical image of the polymer film formed by a selected part of diffracted light.

After the diffraction image of FIG. 45 was obtained, the spatial filter 209 identical to that of Observation Examples 2-2 to 2-5 was inserted on the same plane as the diffraction image plane 208, so as to block the light other than the scattering light on the lower left side of direct light. FIG. 55 is a micrograph showing the diffraction image of polymer film at this time. Thereafter, the microscope apparatus was focused on the specimen position, whereby the image formed by the light transmitted through the spatial filter 209 alone was obtained as the specimen image. FIG. 56 is a micrograph showing the image of polymer film at this time. As a result, the structure on the lower left side of spherulite was discriminated from the other structures. From FIGS. 49 to 56, given parts in the spherulite were extractable according to the size and position of the diffraction image selected by the spatial filter. From these, it was clarified which part of the diffraction image each part of the diffraction image derived from.

As in the foregoing, since illumination light converging at a point in front of the objective lens is used, a sample and its diffraction image can be observed selectively by simply moving the objective lens in the direction of the optical axis under polarization in the optical microscope apparatus in accordance with the present invention and the microscope observing method using the same. Also, when the spatial filter is inserted or moved as appropriate, the optical image and diffraction image of sample formed by desirable diffracted light under polarization can be obtained. Therefore, detailed findings concerning a distribution of structures yielding orientation and birefringence which have not been available with the conventional optical microscope apparatus can fully be obtained.

Figure 57:
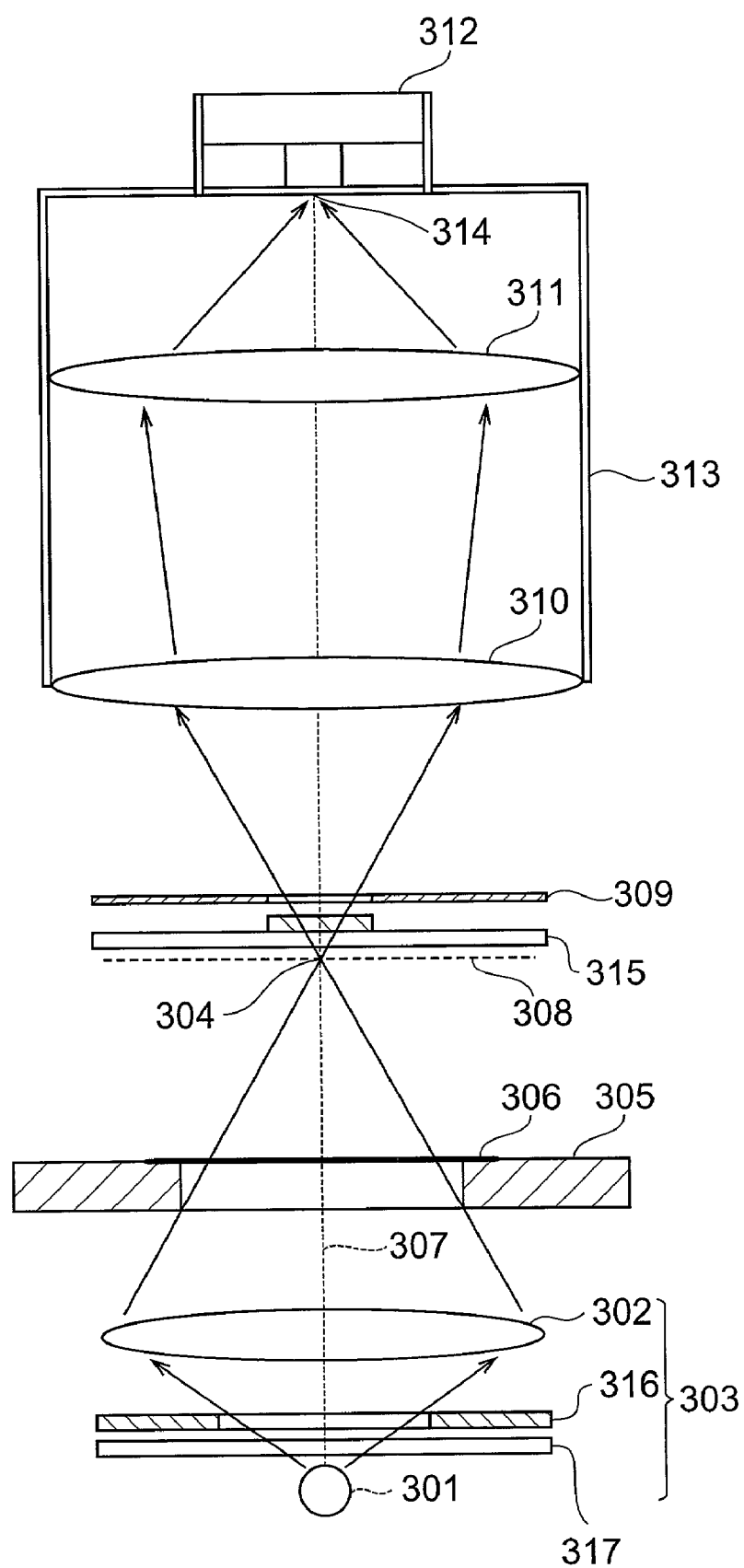
FIG. 57 is a view showing the configuration of a convergent beam phase contrast microscope apparatus which is an embodiment of the present invention.

FIG. 57 is a view showing the basic configuration of a convergent beam phase contrast microscope apparatus which is an embodiment of the present invention. A light source 301, a monochromating device 317, and a condenser lens 302 constitute an illuminating means 303 which emits as illumination light a convergent beam converging at a point 304 in the space. The light emitted from the light source 301 is turned into monochromatic light by the monochromating device 317 disposed behind the light source 301. Employed as the monochromating device 317 is a green filter which is available at a relatively low cost.

Though the light source 301 emitting white light and the monochromating device 317 constitute the illuminating means 303 for emitting monochromatic light in this embodiment, a light source which emits monochromatic light by itself may also be used in place thereof.

The light emitted by the illuminating means 303 having a higher coherence is more preferable.

Disposed above the illuminating means 303 is a sample mounting table (stage) 305 for mounting a sample (specimen) 306. Formed at the center of stage 305 is an opening for transmitting therethrough the illumination light from the illuminating means 303, whereas the illumination light passes through the opening and converges at the converging point 304 thereabove. As a consequence, a Fourier-transformed image of the sample 306, i.e., diffraction image of the sample 306, is formed at a plane 308, perpendicular to the optical axis 307 of illumination light, including the converging point 304. This plane 308 will be referred to as diffraction image plane here.

Figure 58:
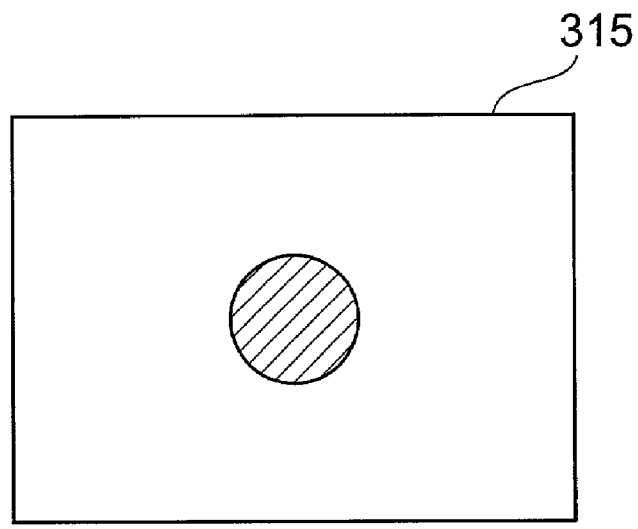
FIG. 58 is a plan view showing a phase plate 315.

A phase plate 315 is disposed near the converging point 304. FIG. 58 is a plan view of the phase plate 315, in which a disk-shaped material with a diameter of 45 to 50 µm for changing the phase, for example, is attached to the center of a silica plate or the like which transmits diffracted light therethrough. This phase plate 315 is easily detachable even during the observation.

The material for changing the phase on the phase plate 315 may not always be shaped like a disk. As a stop plate 316 is inserted near the position at which image of the light source 301 is formed between the light source 301 and condenser lens 302, square forms, semicircular forms, sector forms, ring-like forms, and the like can be selected as appropriate corresponding to the form of a hole in the stop plate 316.

The condenser lens 302 is movable in the direction of optical axis 307 against the position of the stage 305. By the condenser lens 302 moved in the direction of optical axis 307, the distance between the sample 306 mounted on the stage 305 and the converging point 304, i.e., the distance between the sample 306 and the diffraction image plane 308, can be changed.

Figure 59:
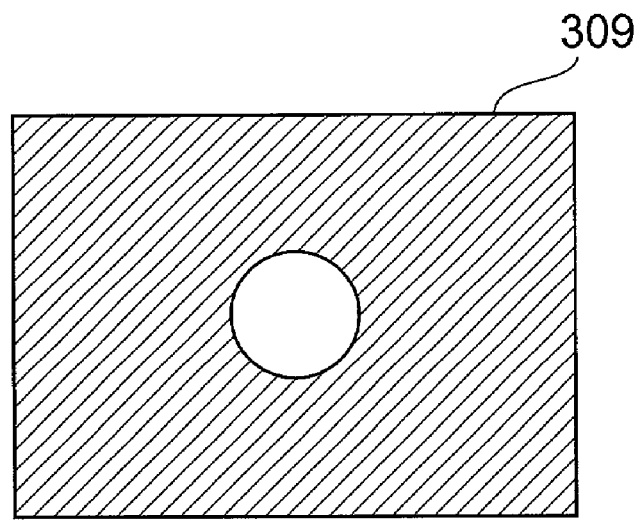
FIG. 59 is a plan view showing a spatial filter 309.

At a position on or near the diffraction image plane 308, a spatial filter 309 is disposed parallel to the diffraction image plane 308. FIG. 59 is a plan view of the spatial filter 309, in which a circular opening having a diameter of several hundreds of microns, for example, is formed at the center of a light-shielding plate. The spatial filter 309 is movable in directions orthogonal to the optical axis 307, whereby the observation field of view of a diffraction image formed on the diffraction image plane 308 can be selected. Also, the spatial filter 309 is easily detachable even during the observation.

The opening formed in the spatial filter 309, i.e., observation field of view, may not always be circular. Square forms, semicircular forms, sector forms, and the like can be selected as appropriate depending on the aimed object.

Disposed further above the spatial filter 309 is a lens barrel 313 comprising an objective lens 310, an imaging lens 311, and an eyepiece 312. The inner configuration of the lens barrel 313 itself has-conventionally been known in general, and the lens barrel 313 enables focusing when moved in the direction of optical axis 307.

The movable range of lens barrel for focusing is required to be sufficiently longer than that in a conventional typical microscope. Namely, this lens barrel is adapted to be focused on at least both of the sample 306 and diffraction image plane 308.

The objective lens 310 has such a working distance length that its position is behind (above) the spatial filter 309 when focused on the sample 306. Therefore, the spatial filter 309 does not hinder focusing operations.

Figure 60:
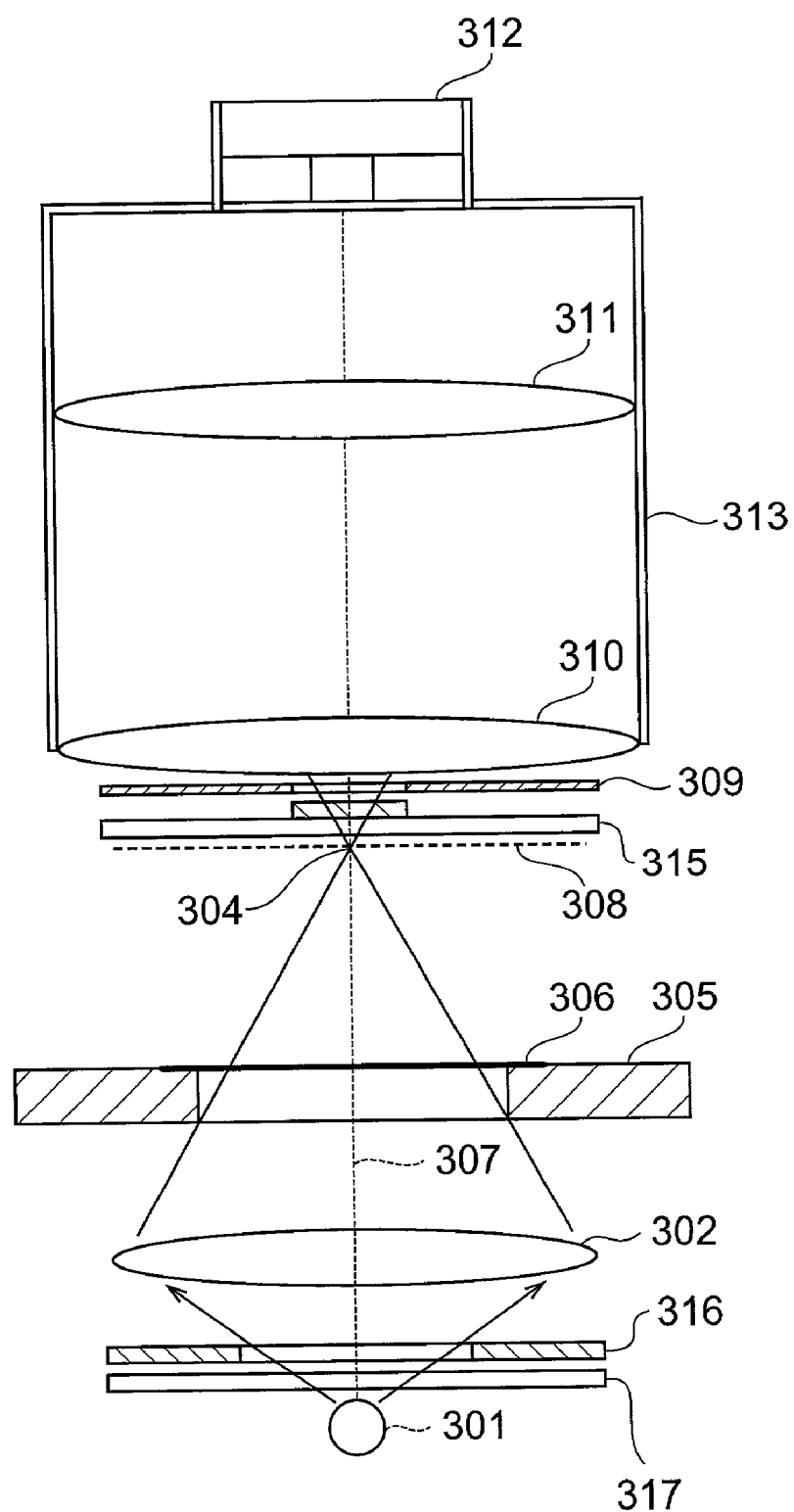
FIG. 60 is a view showing the convergent beam phase contrast microscope apparatus in a state where an objective lens 310 is disposed close to the spatial filter 309.

If the position of diffraction image plane 308 is adjusted such that the objective lens 310 is focused on the sample 306 when located closest to the spatial filter 209 as shown in FIG. 60, then the brightest image can be obtained.

The image captured by the objective lens 310 is formed at an intermediate image position 314 behind the imaging lens 311, whereas the eyepiece 312 has a focus adjusted such that this image can be observed.

In one of observing methods by microscope of this embodiment using such a convergent beam phase contrast microscope apparatus, a sample is observed while the objective lens is focused on the sample. Since a convergent beam is used as illumination light, an observation image having a very high contrast and a great focal depth can be obtained.

In another observing method by convergent beam phase contrast microscope, the objective lens is focused on the diffraction image plane, orthogonal to the optical axis of the objective lens, including the converging point, so as to observe the diffraction image of sample formed on the diffraction image plane by the illumination light.

If the relationship between the diffraction image and texture concerning a sample is acquired beforehand, then the texture of sample can be seen from a characteristic of the pattern of diffraction image when the diffraction image is directly observed.

In still another observing method by convergent beam phase contrast microscope, the sample is initially observed with the objective lens being focused on the sample and then the diffraction image is observed with the objective lens being focused on the diffraction image formed on the diffraction image plane, or the diffraction image is initially observed with the objective lens being focused on the diffraction image formed on the diffraction image plane and then the sample is observed with the objective lens being focused on the sample.

As a consequence, an overall characteristic of a texture which has been hard to discern upon the observation of optical image alone can be grasped, and details of a texture yielding the diffraction image which has been hard to discern upon the observation of diffraction image alone can be seen.

In still another observing method by convergent beam phase contrast microscope, a spatial filter is used for transmitting therethrough only light of a desirable region on the diffraction image plane, and the sample is observed while the objective lens is focused on the sample for the light transmitted through the spatial filter.

As a result, a phase contrast image of the sample which is formed by interference between the diffracted light selected by the spatial filter and the direct light can be observed. Since the diffracted light can be selected freely, various images corresponding to desirable diffracted lights can be observed for the same sample. As a consequence, the texture of sample can be seen in more detail.

In still another observing method by convergent beam phase contrast microscope, the objective lens is focused on the diffraction image plane, so as to observe the diffraction image of sample formed on the diffraction image plane by the illumination light; and, after the spatial filter is adjusted so as to transmit therethrough both of a desirable region of the diffraction image and the direct light, the objective lens is focused on the sample, so as to observe the sample with the light transmitted through the spatial filter.

Since the image observation is carried out after diffracted light is selected according to the diffraction image, it can be seen which diffracted light the optical image is based on. As a consequence, the texture of sample can be seen in more detail.

Preferably, in the observing methods by convergent beam phase contrast microscope of this embodiment, the sample is observed while the position of diffraction image plane is adjusted such that the objective lens is focused on the sample when positioned near the diffraction image plane. It is because of the fact that, since the diffraction image plane is a position where the illumination light converges, the image becomes brightest with no loss in diffracted light when the objective lens is positioned there.

By either the form of the spatial filter, the position thereof on the diffraction image plane, or the angle of optical axis of illumination light with respect to the optical axis of objective lens changed, diffracted light can be selected with which the optical image of the sample which was to be seen is formed.

Preferably, in the observing methods by microscope of this embodiment, the sample is observed with the direction of light transmitted through the spatial filter and the optical axis of objective lens substantially aligning with each other. Though the quantity of light is reduced by the spatial filter, a bright image with less distortion can be obtained when the two optical axes are substantially aligned with each other.

Preferably, in the observing methods by microscope of this embodiment, the size of diffraction image is adjustable by changing the position of converging point of illumination light in the direction of the optical axis of objective lens. As the distance is longer, the diffraction image can be made greater, whereby the diffraction image can be observed in more detail.

The observing methods by microscope of this embodiment are suitably usable for polymer materials. For important textures of polymer materials, detailed findings which have been unavailable with observing methods by conventional microscope can be obtained.

While examples of the sample in the present invention include polymer materials (e.g., polymer films such as polyethylene and polypropylene), biological materials, ceramics, and metals, polymer films are the most typical target materials in that their textures can be observed.

As in the foregoing, since illumination light converging at a point in front of the objective lens is used while a phase plate is disposed near the converging point, a phase contrast microscopic image of a sample and its diffraction image can be observed selectively by the objective lens simply moved in the direction of the optical axis in the convergent beam phase contrast optical microscope apparatus in accordance with the present invention and the observing method by the convergent beam phase contrast microscope using the same. Also, when the spatial filter is inserted or moved as appropriate, the phase contrast microscopic image and diffraction image of sample formed by desirable diffracted light can be obtained. Therefore, detailed findings concerning a structure of a sample having only a minute refractive index contrast which have not been available with the conventional optical microscope apparatus can be obtained.

Figure 61:
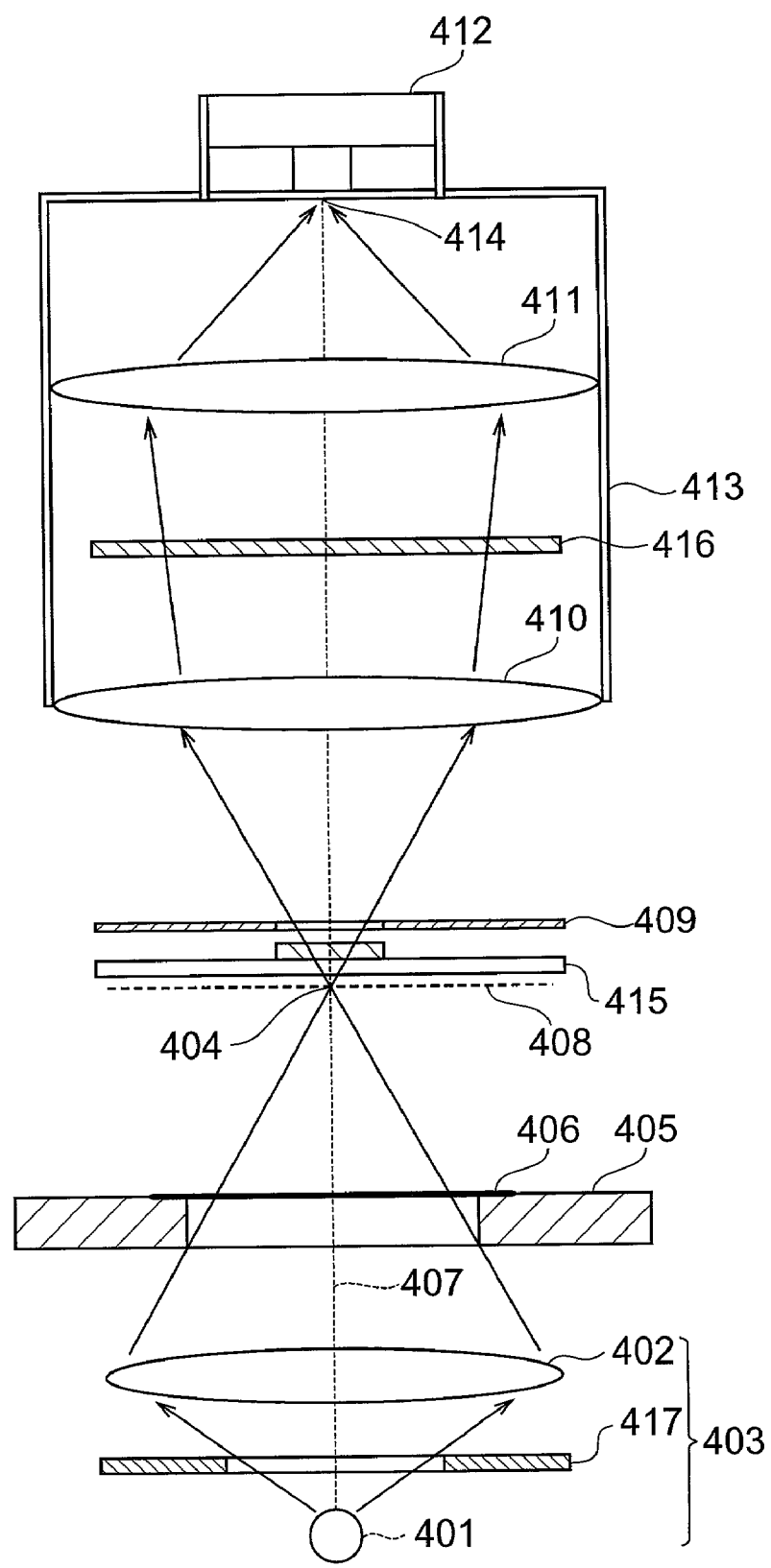
FIG. 61 is a view showing the configuration of a convergent beam bright- and dark-field microscope apparatus which is an embodiment of the present invention.

FIG. 61 is a view showing the basic configuration of a convergent beam bright- and dark-field microscope apparatus which is an embodiment of the present invention. A light source 401 and a condenser lens 402 constitute an illuminating means 403 which emits as illumination light a convergent beam converging at a point 404 in the space. The light emitted from the light source 401 may be either white light or monochromatic light.

Disposed above the illuminating means 403 is a sample mounting table (stage) 405 for mounting a sample (specimen) 406. Formed at the center of stage 405 is an opening for transmitting therethrough the illumination light from the illuminating means 403, whereas the illumination light passes through the opening and converges at the converging point 404 thereabove. As a consequence, a Fourier-transformed image of the sample 406, i.e., diffraction image of the sample 406, is formed at a plane 408, perpendicular to the optical axis 407 of illumination light, including the converging point 404. This plane 408 will be referred to as diffraction image plane here.

Figure 62:
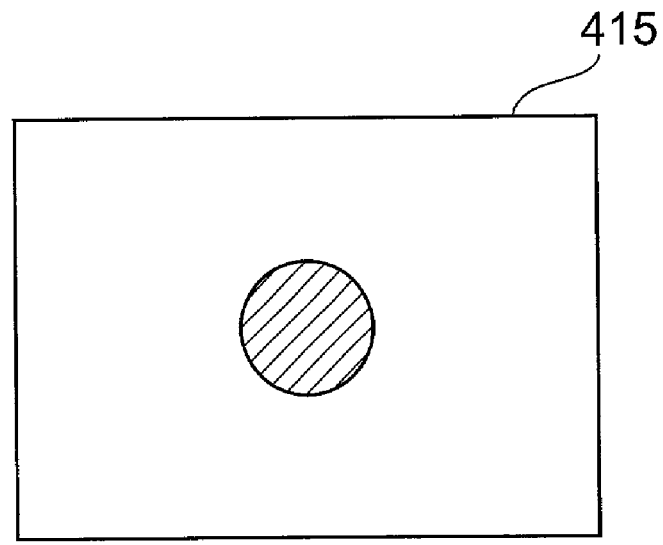
FIG. 62 is a plan view showing a linearly polarizing device 415.

Disposed near the center of diffraction image plane 408 is a linearly polarizing device 415. This device converts only the direct light into linearly polarized light. FIG. 62 is a plan view of the linearly polarizing device 415, in which a disk-shaped material with a diameter of 45 to 50 μm for converting natural light into linearly polarized light, for example, is attached to the center of a silica plate or the like which transmits diffracted light therethrough. This linearly polarizing device 415 is easily detachable even during the observation.

The material for converting natural light into linearly polarized light on the linearly polarizing device 415 may not always be shaped like a disk. As a stop plate 417 is inserted near the position at which image of the light source 401 is formed between the light source 401 and condenser lens 402, square forms, semicircular forms, sector forms, ring-like forms, and the like can be selected as appropriate corresponding to the form of a hole in the stop plate 417.

The condenser lens 402 is movable in the direction of optical axis 407 against the position of the stage 405. By the condenser lens 402 moved in the direction of optical axis 407, the distance between the sample 406 mounted on the stage 405 and the converging point 404, i.e., the distance between the sample 406 and the diffraction image plane 408, can be changed.

Figure 63:
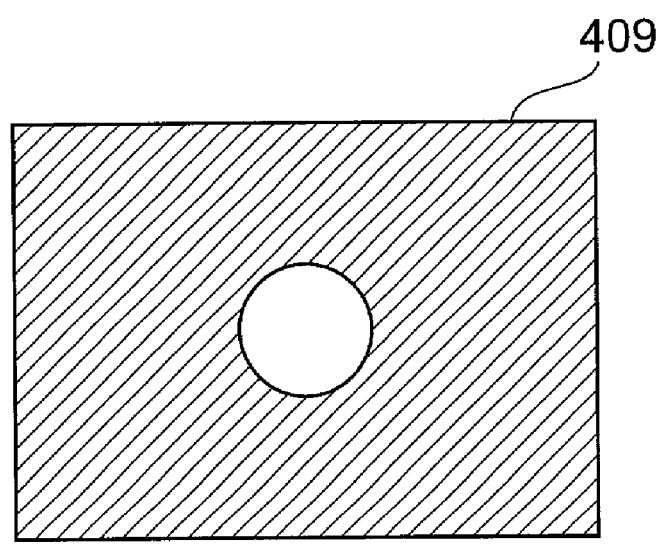
FIG. 63 is a plan view showing a spatial filter 409.

At a position on or near the diffraction image plane 408, a spatial filter 409 is disposed parallel to the diffraction image plane 408. FIG. 63 is a plan view of the spatial filter 409, in which a circular opening having a diameter of several hundreds of microns, for example, is formed at the center of a light-shielding plate. The spatial filter 409 is movable in directions orthogonal to the optical axis 407, whereby the observation field of view of a diffraction image formed on the diffraction image plane 408 can be selected. Also, the spatial filter 409 is easily detachable even during the observation.

The opening formed in the spatial filter 409, i.e., observation field of view, may not always be circular. Square forms, semicircular forms, sector forms, and the like can be selected as appropriate depending on the aimed object.

Disposed further above the spatial filter 409 is a lens barrel 413 comprising an objective lens 410, an analyzer 416, an imaging lens 411, and an eyepiece 412. The inner configuration of the lens barrel 413 itself has conventionally been known in general, and the lens barrel 413 enables focusing when moved in the direction of optical axis 407.

The movable range of lens barrel for focusing is required to be sufficiently longer than that in a conventional typical microscope. Namely, this lens barrel is adapted to be focused on at least both of the sample 406 and diffraction image plane 408.

The objective lens 410 has such a working distance that its position is behind (above) the spatial filter 409 when focused on the sample 406. Therefore, the spatial filter 409 does not hinder focusing operations.

Figure 64:
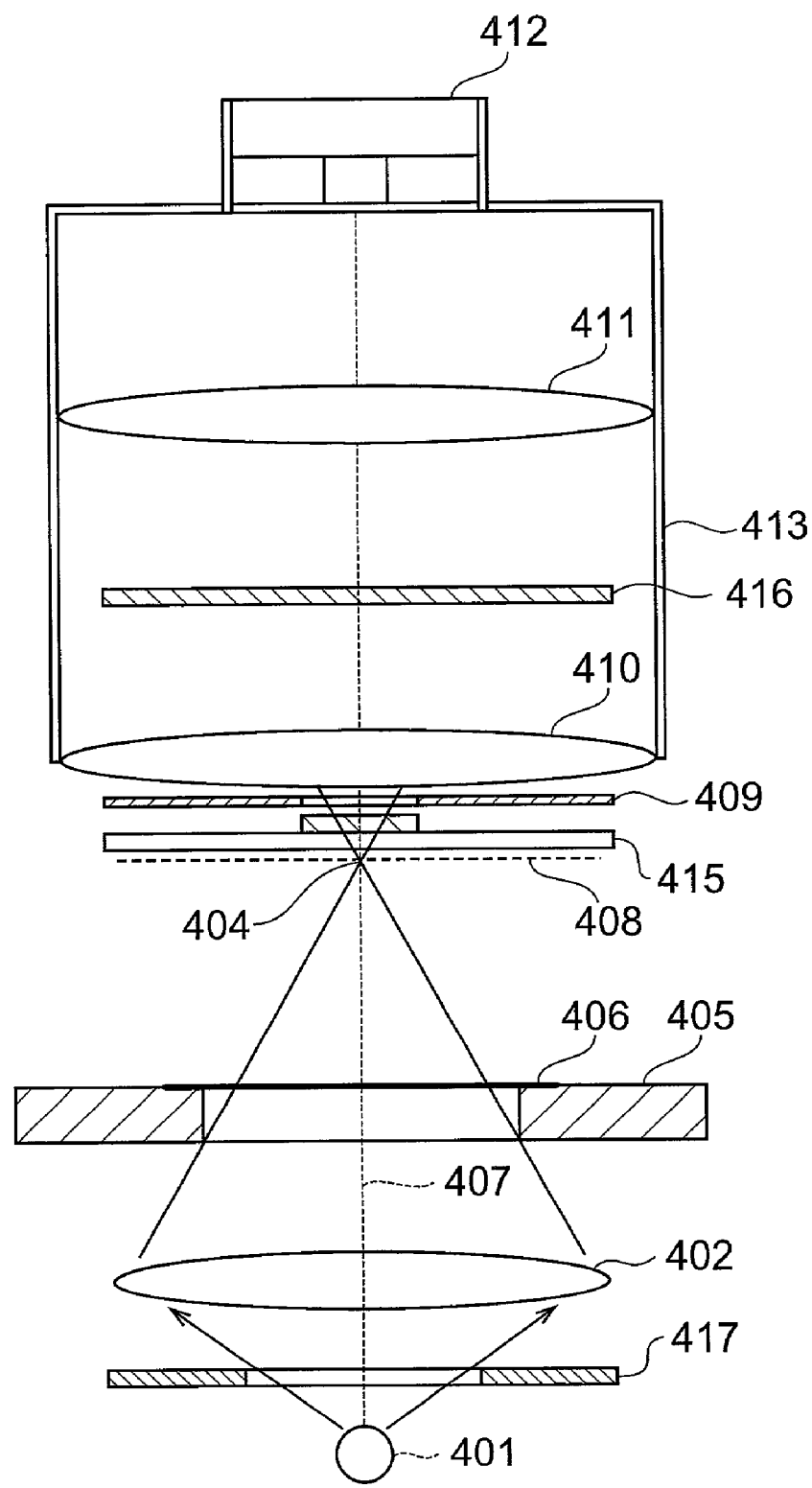
FIG. 64 is a view showing the convergent beam bright- and dark-field microscope apparatus in a state where an objective lens 410 is disposed close to the spatial filter 409.

If the position of diffraction image plane 408 is adjusted such that the objective lens 410 is focused on the sample 406 when located closest to the spatial filter 409 as shown in FIG. 64, then the brightest image can be obtained.

The image captured by the objective lens 410 is formed at an intermediate image position 414 behind the imaging lens 411 after being transmitted through the analyzer 416, whereas the eyepiece 412 has a focus adjusted such that this image can be observed.

In one of observing methods by microscope of this embodiment using such a convergent beam phase bright- and dark-field microscope apparatus, a sample is observed while the objective lens is focused on the sample. Since a convergent beam is used as illumination light, an observation image having a very high contrast and a great focal depth can be obtained. In addition, a bright field to a dark field can continuously be observed when the analyzer is rotated.

In another observing method by microscope, the objective lens is focused on the diffraction image plane, orthogonal to the optical axis of the objective lens, including the converging point, so as to observe the diffraction image of sample formed on the diffraction image plane by the illumination light.

If the relationship between the diffraction image and texture concerning a sample is acquired beforehand, then the texture of sample can be seen from a characteristic of the pattern of diffraction image when the diffraction image is directly observed.

In still another observing method by microscope, the sample is initially observed with the objective lens being focused on the sample and then the diffraction image is observed with the objective lens being focused on the diffraction image formed on the diffraction image plane, or the diffraction image is initially observed with the objective lens being focused on the diffraction image formed on the diffraction image plane and then the sample is observed with the objective lens being focused on the sample.

As a consequence, an overall characteristic of a texture which has been hard to discern upon the observation of optical image alone can be grasped, and details of a texture yielding the diffraction image which has been hard to discern upon the observation of diffraction image alone can be seen.

In still another observing method by convergent beam bright and dark-field microscope, a spatial filter is used for transmitting therethrough only light of a desirable region on the diffraction image plane, and the sample is observed while the objective lens is focused on the sample for the light transmitted through the spatial filter.

The spatial filter is used for observing a bright-field image of the sample which is based on the selected diffracted light. Since the diffracted light can be selected freely, various bright- and dark-field images corresponding to desirable diffracted lights can be observed for the same sample. As a consequence, the texture of sample can be seen in more detail.

In still another observing method by convergent beam bright and dark-field microscope, the objective lens is focused on the diffraction image plane, so as to observe the diffraction image of sample formed on the diffraction image plane by the illumination light; and, after the spatial filter is adjusted so as to transmit therethrough only the light of a desirable region of the diffraction image, the objective lens is focused on the sample, so as to observe the sample with the light transmitted through the spatial filter.

Since the diffracted light used for observation is selected according to the diffraction image, which diffracted light the bright- or dark-field image is based on can be seen. As a consequence, the texture of sample can be seen further in detail.

Preferably, in the observing methods by microscope of this embodiment, the sample is observed while the position of diffraction image plane is adjusted such that the objective lens is focused on the sample when positioned near the diffraction image plane. It is because of the fact that, since the diffraction image plane is a position where the illumination light converges, the image becomes brightest with no loss in diffracted light when the objective lens is positioned there.

By either the form of the spatial filter, the position thereof on the diffraction image plane, or the angle of optical axis of illumination light with respect to the optical axis of objective lens changed, diffracted light can be selected with which the optical image of the sample which was to be seen is formed.

Preferably, in the observing methods by microscope of this embodiment, the sample is observed with the direction of light transmitted through the spatial filter and the optical axis of objective lens substantially aligning with each other. Though the quantity of light is reduced by the spatial filter, a bright image with less distortion can be obtained when the two optical axes are substantially aligned with each other.

Preferably, in the observing methods by microscope of this embodiment, the size of diffraction image is adjustable by changing the position of converging point of illumination light in the direction of the optical axis of objective lens. As the distance is longer, the diffraction image can be made greater, whereby the diffraction image can be observed in more detail.

In the observing methods by microscope of this embodiment, monochromatic light may be used as the illumination light. When monochromatic light is used, images important for studying a texture, which have been unavailable with white light, can be obtained.

In a observing method by microscope using the bright- and dark-field microscope apparatus of this embodiment, a sample is observed while the plane of linear polarization of linearly polarizing device and the plane of linear polarization of analyzer are parallel or perpendicular to each other. The bright- and dark-field images can easily be switched therebetween without using condensers.

In another observing method by microscope, the sample is observed while the plane of linear polarization of analyzer is continuously changed from a parallel arrangement to a perpendicular arrangement or vice versa with respect to the plane of linear polarization of linearly polarizing device. Images ranging from a completely-dark-field image (in the image, direct light is completely shielded) to a completely-bright-field image (in the image, direct light is transmitted at the maximum) can be observed continuously.

Still another observing method by microscope is suitably usable for polymer materials. For important textures of polymer materials, detailed findings which have been unavailable with observing methods by conventional microscope can be obtained.

While examples of the sample in the present invention include polymer materials (e.g., polymer films such as polyethylene and polypropylene), biological materials, ceramics, and metals, polymer films are the most typical target materials in that their textures can be observed.

As in the foregoing, since a convergent beam converging at a point in front of the objective lens is used as illumination light, a sample and its diffraction image can be observed selectively by the objective lens simply moved in the direction of optical axis in the convergent beam bright- and dark-field microscope apparatus in accordance with the present invention and the contrast microscope observing method using the same. Also, when the spatial filter is inserted or moved as appropriate, the optical image of sample formed by desirable diffracted light can be obtained. Further, images ranging from a dark-field image to a bright-field image can be observed continuously when the arrangement of planes of linear polarization of linearly polarizing device and analyzer is continuously changed from one in which they are parallel to each other to one in which they are perpendicular to each other. Therefore, texture information and orientation information, which have not been available with the conventional optical microscope apparatus, can be obtained as an optical image or diffraction image. Also, relationships between minute defects/foreign matters and large textures which have not been available with the conventional optical microscope apparatus can be seen accurately.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical microscope apparatus comprising:
   illuminating means having a single point light source;
   an optical converging system which focuses a single beam of illumination light from the illuminating means, at a converging point;
   a sample mounting table for mounting a sample between said illuminating means and said converging point;
   an objective lens positioned after said converging point in an optical path, such that said illumination light is incident thereon; wherein the illumination light is transmitted through the sample mounted on the sample mounting table and then converges at the converging point in said optical path; and
   a spatial filter, disposed at a position of a diffraction image plane which is orthogonal to an optical axis of said illumination light, including said converging point in said optical path, which selectively blocks a part of said illumination light transmitted through said sample,
   wherein said objective lens is adapted to be focused on either one of said diffraction image plane and said sample.

2. An optical microscope apparatus according to claim 1, further comprising an adjusting mechanism adapted to arbitrarily change a distance between said diffraction image plane and said sample.

3. An optical microscope apparatus according to claim 2, further comprising an adjusting mechanism for substantially aligning a direction of light transmitted through said spatial filter and an optical axis of said objective lens with each other.

4. An optical microscope apparatus comprising:
   illuminating means having a single point light source;
   an optical converging system which focuses a single beam of illumination light from the illuminating means, at a converging point;
   a sample mounting table for mounting a sample between said illuminating means and said converging point;
   an objective lens positioned after said converging point in an optical path, such that said illumination light is incident thereon; wherein the illumination light is transmitted through the sample mounted on the sample mounting table and then converges at the converging point in said optical path;
   a spatial filter, disposed at a position of a diffraction image plane which is orthogonal to an optical axis of said illumination light, including said converging point in said optical path, for selectively blocking a part of the illumination light transmitted through said sample;
   a polarizer disposed between said illuminating means and sample mounting table; and
   an analyzer disposed after said sample mounting table in said optical path,
   wherein said objective lens is adapted to be focused on either one of said diffraction image plane, and said sample.

5. An optical microscope apparatus according to claim 4, further comprising an adjusting mechanism adapted to arbitrarily change a distance between said diffraction image plane and said sample.

6. An optical microscope apparatus according to claim 5, further comprising an adjusting mechanism for substantially aligning a direction of light transmitted through said spatial filter and an optical axis of said objective lens with each other.

7. An optical microscope apparatus according to claim 6, wherein said illumination light is monochromatic light.

8. An optical microscope apparatus, comprising:
   illuminating means having a single point light source;
   an optical converging system which focuses a single beam of illumination light from the illuminating means, at a converging point;
   a sample mounting table for mounting a sample between said illuminating means and said converging point; and
   an objective lens positioned after said converging point in an optical path, such that said illumination light is incident thereon; and
   a phase plate, disposed on a diffraction image plane, which causes light incident thereon to shift its optical phase, wherein said diffraction image plane is orthogonal to an optical axis of said illumination light and includes said converging point in said optical path;
   wherein said illuminating means emits monochromatic light; the illumination light is transmitted through the sample mounted on the sample mounting table and then converges at the converging point in said optical path; and said objective lens is adapted to be focused on either one of said diffraction image plane and said sample.

9. An optical microscope apparatus according to claim 8, further comprising a polarizer disposed between said illuminating means and sample mounting table, and an analyzer disposed after said sample mounting table in said optical path.

10. An optical microscope apparatus according to claim 9, wherein said polarizer and said analyzer are rotatable about an optical axis of incident light.

11. An optical microscope apparatus according to claim 9, wherein said sample mounting table is rotatable about an optical axis of incident light.

12. An optical microscope apparatus according to claim 9, wherein each of said polarizer and analyzer is a linearly polarizing device.

13. An optical microscope apparatus according to claim 9, wherein one of said polarizer and analyzer is a circularly polarizing device, whereas the other is a linearly polarizing device.

14. An optical microscope apparatus according to claim 9, wherein each of said polarizer and analyzer is a circularly polarizing device.

15. An optical apparatus according to claim 8, wherein said illuminating means comprises a light source for emitting white light, and a monochromating device, which converts said white light to monochromatic light, disposed behind said light source.

16. An optical microscope apparatus to claim 8, wherein said phase plate causes light incident thereon at and near said converging point to have a first optical phase and causes all other light incident thereon to have a second optical phase, wherein the first optical phase and the second optical phase are different from each other by about $\pi/2$.

17. An optical microscope apparatus according to claim 16, wherein said phase plate also has a function of attenuating an intensity of light incident on and near said converging point in said optical path.

18. An optical microscope apparatus according to claim 8, wherein said objective lens is adapted to be focused on each of said diffraction image plane and said sample.

19. An optical microscope apparatus according to claim 18, further comprising a spatial filter, disposed nearly at a position of said diffraction image plane, for selectively blocking a part of said illumination light transmitted through said sample.

20. An optical microscope apparatus according to claim 19, further comprising an adjusting mechanism adapted to arbitrarily change a distance between said diffraction image plane and said sample.

21. An optical microscope apparatus according to claim 20, further comprising an adjusting mechanism for substantially aligning a direction of light transmitted through said spatial filter and an optical axis of said objective lens with each other.

22. An optical microscope apparatus, comprising:
illuminating means having a single point light source;
an optical converging system which focuses a single beam of illumination light from the illuminating means, at a converging point;
a sample mounting table for mounting a sample between said illuminating means and said converging point;
an objective lens positioned after said converging point in an optical path, such that said illumination light is incident thereon; and
a linearly polarizing device disposed on a diffraction image plane, wherein the diffraction image plane is orthogonal to an optical axis of said illumination light, and includes said converging point; and
a linear polarization analyzer, disposed after said diffraction image plane in said optical path, wherein the linear polarization analyzer is rotatable about an optical axis of the incident light;
wherein the illumination light is transmitted through the sample mounted on the sample mounted table and then converges at the converging point in said optical path; and said objective lens is adapted to be focused on either one of said diffraction image plane and said sample.

23. An optical microscope apparatus according to claim 22, wherein said objective lens is adapted to be focused on each of said diffraction image plane and said sample.

24. An optical microscope apparatus according to claim 23, further comprising a spatial filter, disposed nearly at a position of said diffraction image plane, for selectively blocking a part of said illumination light transmitted through said sample.

25. An optical microscope apparatus according to claim 24, further comprising an adjusting mechanism adapted to arbitrarily change a distance between said diffraction image plane and said sample.

26. An optical microscope apparatus according to claim 25, further comprising an adjusting mechanism for substantially aligning a direction of light transmitted through said spatial filter and an optical axis of said objective lens with each other.

27. An optical microscope apparatus according to claim 26, wherein said illumination light is monochromatic light.

28. A microscope observing method using an optical microscope apparatus comprising:
illuminating means having a single point light source;
an optical converging system which focuses a single beam of illumination light from the illuminating means at a converging point;
a sample mounting table for mounting a sample between said illuminating means and said converging point;
an objective lens positioned after said converging point in an optical path, such that said illumination light is incident thereon; wherein said illumination light is transmitted through said sample mounted on the sample mounting table and then converges at the converging point in said optical path; and a spatial filter, disposed at a diffraction image plane, which selectively blocks a part of said illumination light transmitted through said sample, wherein the diffraction image plane is orthogonal to an optical axis of the illumination light and includes said converging point; and wherein said objective lens is adapted to be focused on either one of said diffraction image plane and said sample;
said method comprising:
focusing said objective lens onto said diffraction image plane, and observing therewith a diffraction image of said sample formed on said diffraction image plane by said illumination light;
adjusting said spatial filter such that only light from a desirable region of said diffraction image is transmitted therethrough; and
focusing said objective lens onto said sample, and observing therewith said sample with said light transmitted through said spatial filter.

29. A microscope observing method using an optical microscope apparatus comprising:
illuminating means having a single point light source:
an optical converging system which focuses a single beam of illumination light from the illuminating means at a converging point;
a sample mounting table for mounting a sample between said illuminating means and said converging point;
an objective lens positioned after said converging point in said optical path such that said illumination light is incident thereon, wherein said illumination light is transmitted through said sample mounted on the sample mounting table and then converges at the converging point in said optical path;
a polarizer disposed between said illuminating means and said sample mounting table;
an analyzer disposed after said sample mounting table in said optical path; and
a spatial filter, disposed at a diffraction image plane, which selectively blocks a part of said illumination light transmitted through said sample, wherein said diffraction image plane is orthogonal to an optical axis of said illumination light an includes said converging point;
wherein said objective lens is adapted to be focused on either of said diffraction image plane and said sample;
said method comprising:
focusing said objective lens onto said diffraction image plane, and observing therewith a diffraction image of said sample formed on said diffraction image plane by said illumination light and
adjusting said spatial filter such that only light from a desirable region of said diffraction image in transmitted therethrough; and
focusing said objective lens onto said sample and observing said sample with said light transmitted through said spatial filter.

30. A microscope observing method using an optical microscope apparatus comprising:
illuminating means having a single point light source;
an optical converging system which focuses a single beam of illumination light from the illumination means at a converging point;
a sample mounting table for mounting a sample between said illuminating means and said converging point;
an objective lens positioned after said converging point in said optical path, such that said illumination light is incident thereon; wherein said illumination light is transmitted through said sample mounted on the sample mounting table and then converges at the converging point in said optical path; and a spatial filter, disposed at a diffraction image plane, which selectively blocks a part of said illumination light transmitted through said sample, wherein the diffraction image plane is orthogonal to an optical axis of the illumination light and includes said converging point; and therein said objective lens is adapted to be focused on either one of said diffraction image plane and said sample;

said method comprising:

emitting a single beam of illumination light from the illuminating means and focusing the illumination light at said converging point;

mounting a sample on the sample mounting table between said illuminating means and said converging point;

converging said illumination light at said converging point;

selectively blocking a part of said illumination light transmitted through said sample; and changing the position of the converging point to be in or out of said optical path of the illumination light in the direction of the optical axis of said objective lens to adjust the size of the diffraction image.

31. A microscope observing method using an optical microscope apparatus comprising:

illuminating means having a single point light source;

an optical converging system which focuses a single beam of illumination light from the illuminating means at a converging point;

a sample mounting table for mounting a sample between said illuminating means and said converging point;

an objective lens positioned after said converging point in an optical path, such that said illumination light is incident thereon; wherein said illumination light is transmitted through said sample mounted on the sample mounting table and then converges at the converging point in said optical path;

a polarizer disposed between said illuminating means and sample mounting table;

an analyzer disposed after said sample mounting table in said optical path; and a spatial filter disposed at a diffraction image plane, which selectively blocks a part of said illumination light transmitted through said sample, wherein said diffraction image plane is orthogonal to an optical axis of said sample, wherein said diffraction image plane is orthogonal to an optical axis of said illumination light and includes said converging point; and wherein said objective lens is adapted to be focused on either of said diffraction image plane and said sample;

said method comprising:

emitting and polarizing a single beam of illumination light from the illuminating means, and focusing the single beam at said converging point;

mounting a sample on the sample mounting table between said illuminating means and said converging point;

converging said illumination light at said converging point;

selectively blocking a part of said illumination light transmitted through said sample; and changing the position of the converging point to be in or out of said optical path of the illumination light in the direction of optical axis of said objective lens to adjust the size of the diffraction image.

* * * * *